US012058497B2

(12) United States Patent
Nyström et al.

(10) Patent No.: US 12,058,497 B2
(45) Date of Patent: Aug. 6, 2024

(54) TRANSDUCER WITH DUAL SUSPENSION

(71) Applicant: Cochlear Limited, Macquarie University (AU)

(72) Inventors: Dan Nyström, Macquarie University (AU); Tobias Good, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 18/241,879

(22) Filed: Sep. 3, 2023

(65) Prior Publication Data

US 2024/0064480 A1 Feb. 22, 2024

Related U.S. Application Data

(62) Division of application No. 16/759,545, filed as application No. PCT/IB2018/058412 on Oct. 26, 2018, now Pat. No. 11,765,529.

(60) Provisional application No. 62/577,774, filed on Oct. 27, 2017.

(51) Int. Cl.
*H04R 25/00* (2006.01)
*H04R 11/14* (2006.01)

(52) U.S. Cl.
CPC ........... *H04R 25/606* (2013.01); *H04R 11/14* (2013.01); *H04R 25/554* (2013.01); *H04R 25/70* (2013.01); *H04R 2460/13* (2013.01)

(58) Field of Classification Search
CPC .... H04R 25/606; H04R 11/14; H04R 25/554; H04R 25/70; H04R 2460/13
USPC .......................................................... 381/151
See application file for complete search history.

(56) References Cited

U.S. PATENT DOCUMENTS

| | | | | |
|---|---|---|---|---|
| 2011/0158443 A1* | 6/2011 | snes | H04R 25/606 | 381/326 |
| 2016/0112813 A1* | 4/2016 | Hillbratt | H04R 25/603 | 381/326 |
| 2016/0192092 A1* | 6/2016 | Westerkull | A61N 1/36038 | 600/25 |
| 2018/0035219 A1* | 2/2018 | Gustafsson | H04R 25/606 | |

* cited by examiner

*Primary Examiner* — Sean H Nguyen
(74) *Attorney, Agent, or Firm* — Pilloff Passino & Cosenza LLP; Martin J. Cosenza

(57) ABSTRACT

A bone conduction device, including a transducer and a housing, wherein the housing is directly flexibly connected to the transducer at a dynamic component of the bone conduction device and directly flexibly connected to a static component of the bone conduction device. In an exemplary embodiment, the bone conduction device is a percutaneous bone conduction device.

21 Claims, 34 Drawing Sheets

TRANSDUCER WITH DUAL SUSPENSION

CROSS-REFERENCE TO RELATED APPLICATIONS

This application is a Divisional of U.S. patent application Ser. No. 16/759,545, filed Apr. 27, 2020, which is a National Stage of PCT/IB2018/058412, filed Oct. 26, 2018, which claims priority from U.S. Provisional Application No. 62/577,774, entitled TRANSDUCER WITH DUAL SUSPENSION, filed on Oct. 27, 2017, naming Dan NYSTRÖM of Mölnlycke, Sweden as an inventor, the entire contents of each application being incorporated herein by reference in their entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems.

SUMMARY

In an exemplary embodiment, there is a conduction device, comprising a vibrator and a housing encompassing the vibrator, wherein the housing is flexibly supported by at least a first suspension system and a second suspension system, wherein the first system has a resonant frequency that is different than the second system.

In another exemplary embodiment, there is a method, comprising operating a vibrator of a bone conduction device including a microphone supported by a housing of the bone conduction device to evoke a bone conduction hearing percept, wherein the vibrator is supported in the housing via a suspension system, and the operation of the vibrator results in simultaneous opposite forces transmitted to the housing via the suspension system.

In another exemplary embodiment, there is a bone conduction device, comprising a transducer, and a housing, wherein the housing is directly flexibly connected to the transducer at a dynamic component of the bone conduction device and directly flexibly connected to a static component of the bone conduction device.

BRIEF DESCRIPTION OF THE DRAWINGS

Some embodiments are described below with reference to the attached drawings, in which.

DETAILED DESCRIPTION

Figure 1A:
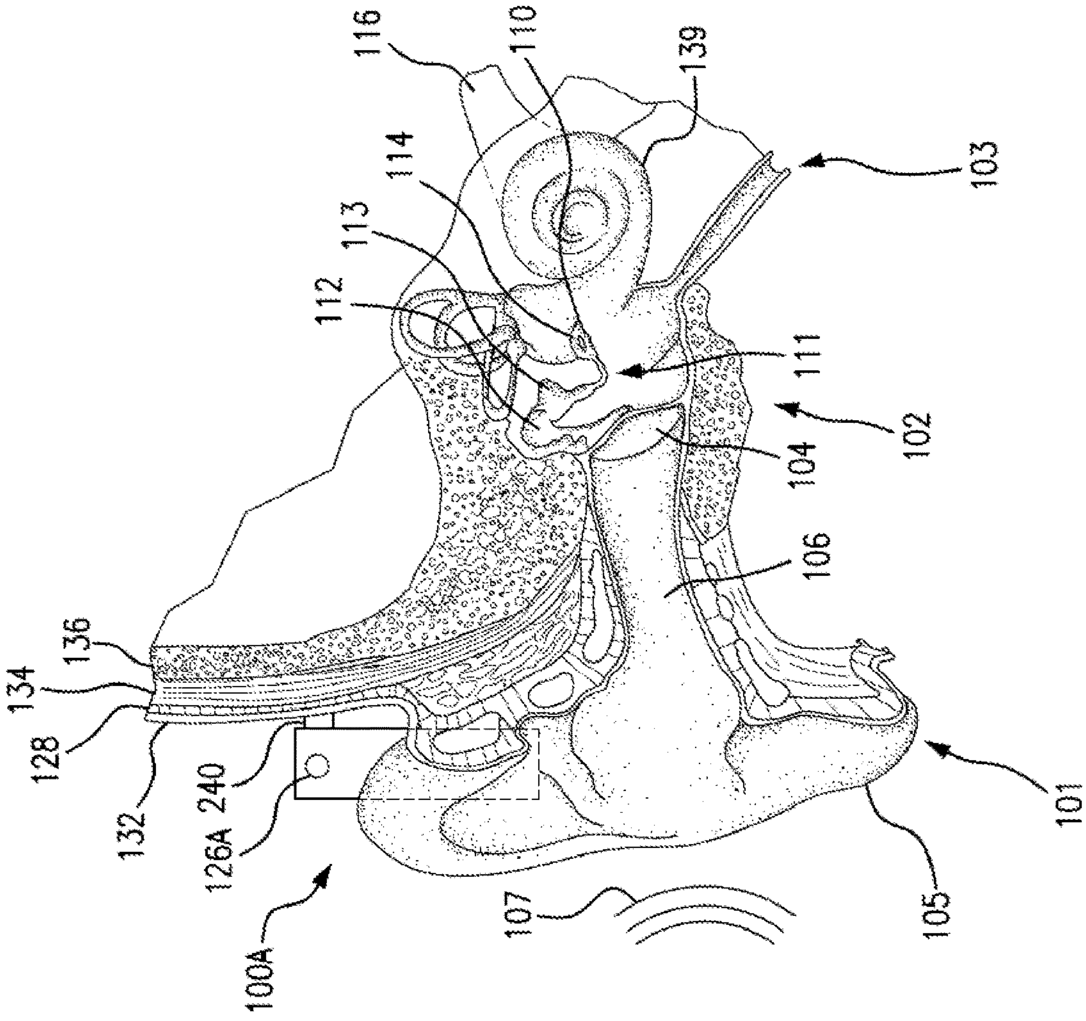
FIG. 1A is a perspective view of an exemplary bone conduction device in which at least some embodiments can be implemented.

FIG. 1A is a perspective view of a bone conduction device 100A in which embodiments may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibratory electromagnetic actuator and/or a vibratory piezoelectric actuator and/or other type of actuator (not shown—which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibratory electromagnetic actuator. For example, embodiments include active transcutaneous bone conduction systems utilizing the electromagnetic actuators disclosed herein and variations thereof where at least one active component (e.g. the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device)

containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

Figure 1B:
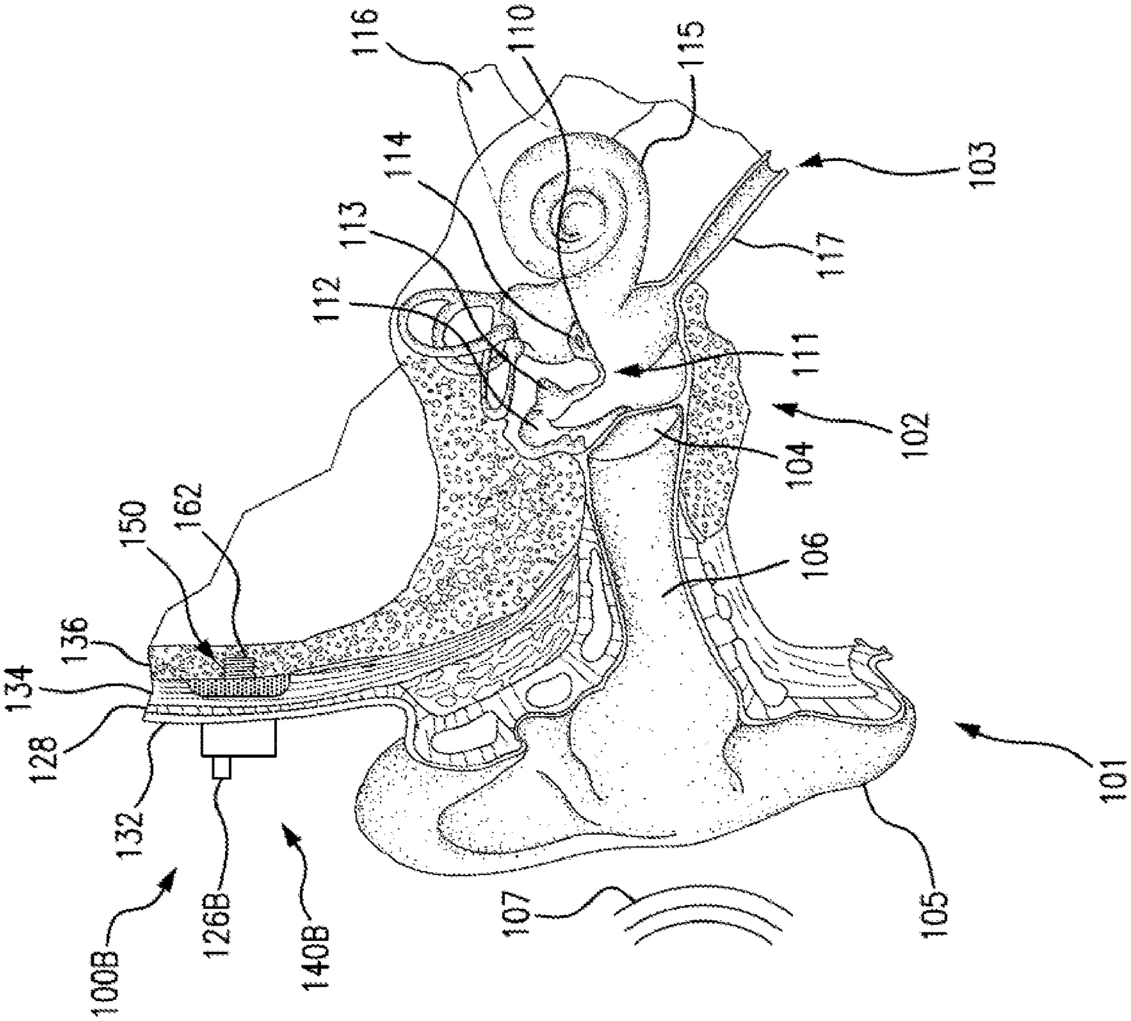
FIG. 1B is a perspective view of an alternate exemplary bone conduction device in which at least some embodiments can be implemented.

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100 is positioned behind outer ear 101 of the recipient. Bone conduction device 100B comprises an external component 140B and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B is a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B is an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 2:
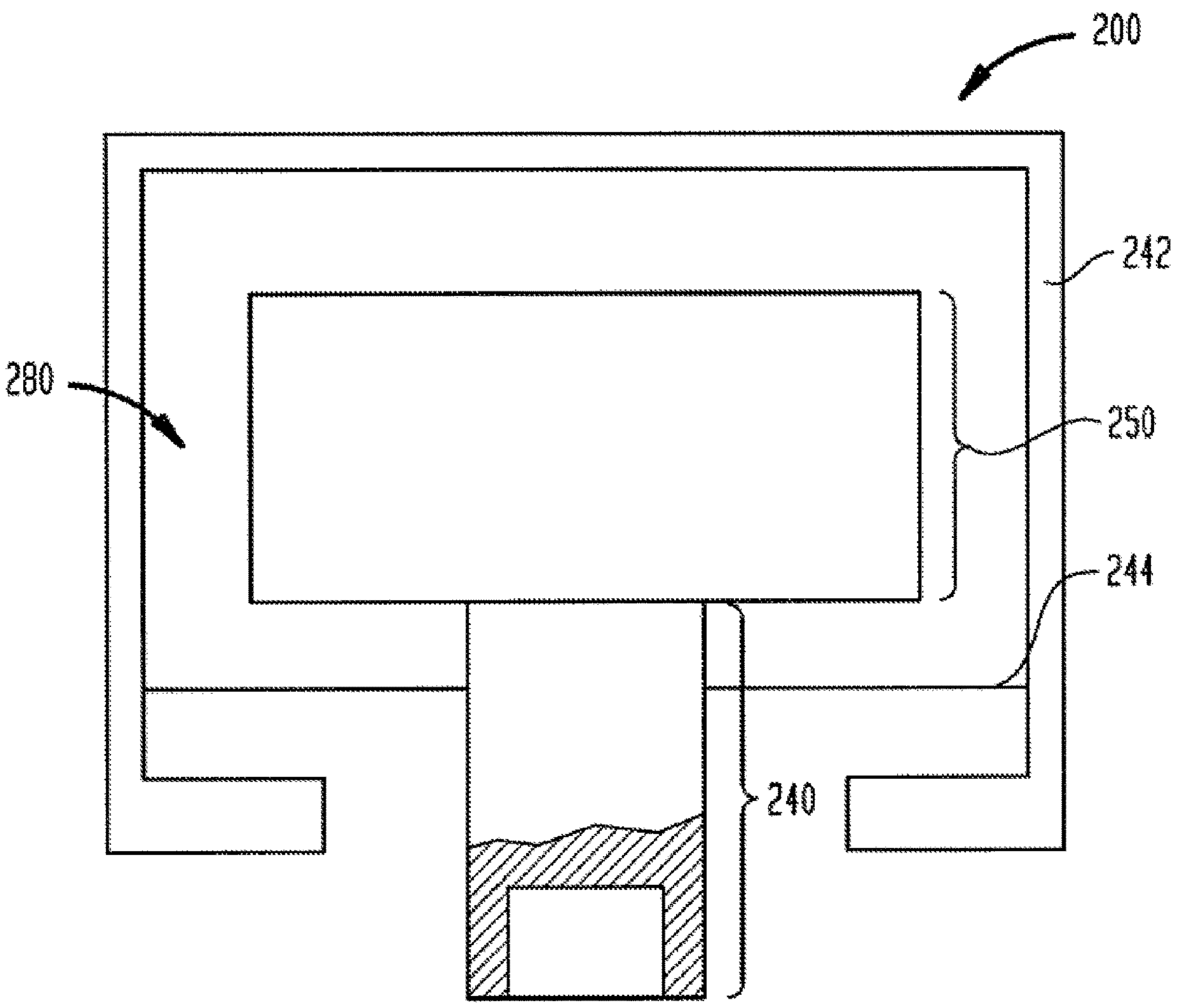
FIG. 2 is a schematic diagram conceptually illustrating a removable component of a percutaneous bone conduction device in accordance with at least some exemplary embodiments.

FIG. 2 is an embodiment of a bone conduction device 200 in accordance with an embodiment corresponding to that of FIG. 1A, illustrating use of a percutaneous bone conduction device. Bone conduction device 200, corresponding to, for example, element 100A of FIG. 1A, includes a housing 242, a vibratory electromagnetic actuator 250, a coupling assembly 240 that extends from housing 242 and is mechanically linked to vibratory electromagnetic actuator 250. Collectively, vibratory electromagnetic actuator 250 and coupling assembly 240 form a vibratory actuator-coupling assembly 280. Vibratory actuator-coupling assembly 280 is suspended in housing 242 by spring 244. In an exemplary embodiment, spring 244 is connected to coupling assembly 240, and vibratory electromagnetic actuator 250 is supported by coupling assembly 240.

Figure 3:
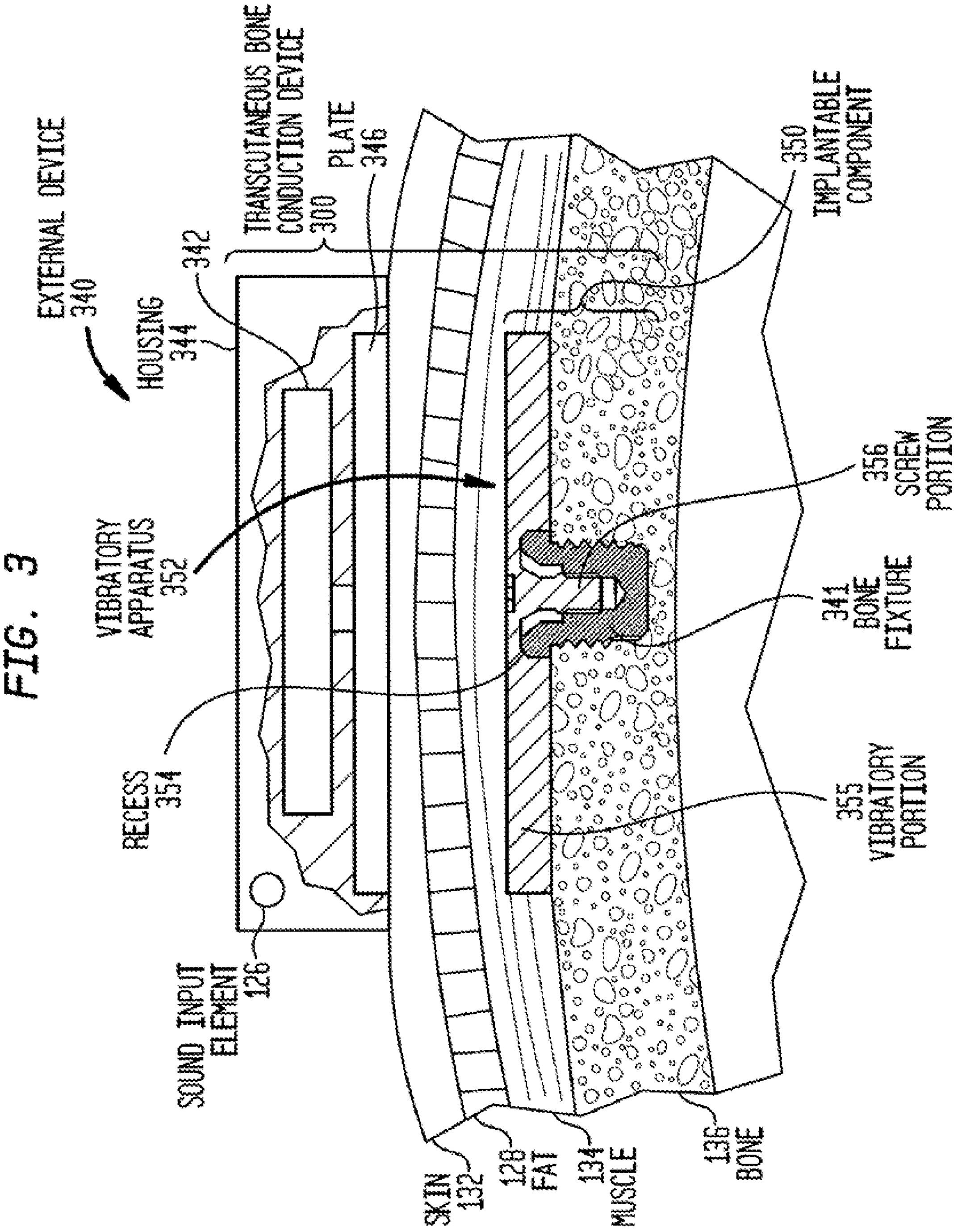
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibratory electromagnetic actuator 342 is located in the external device 340. Vibratory electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibratory electromagnetic actuator 342 is a device that converts electrical signals into vibration. In operation, sound input element 126 converts sound into electrical signals. Specifically, the transcutaneous bone conduction device 300 provides these electrical signals to vibratory actuator 342, or to a sound processor (not shown) that processes the electrical signals, and then provides those processed signals to vibratory electromagnetic actuator 342. The vibratory electromagnetic actuator 342 converts the electrical signals (processed or unprocessed) into vibrations. Because vibratory electromagnetic actuator 342 is mechanically coupled to plate 346, the vibrations are transferred from the vibratory actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibratory electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 4:
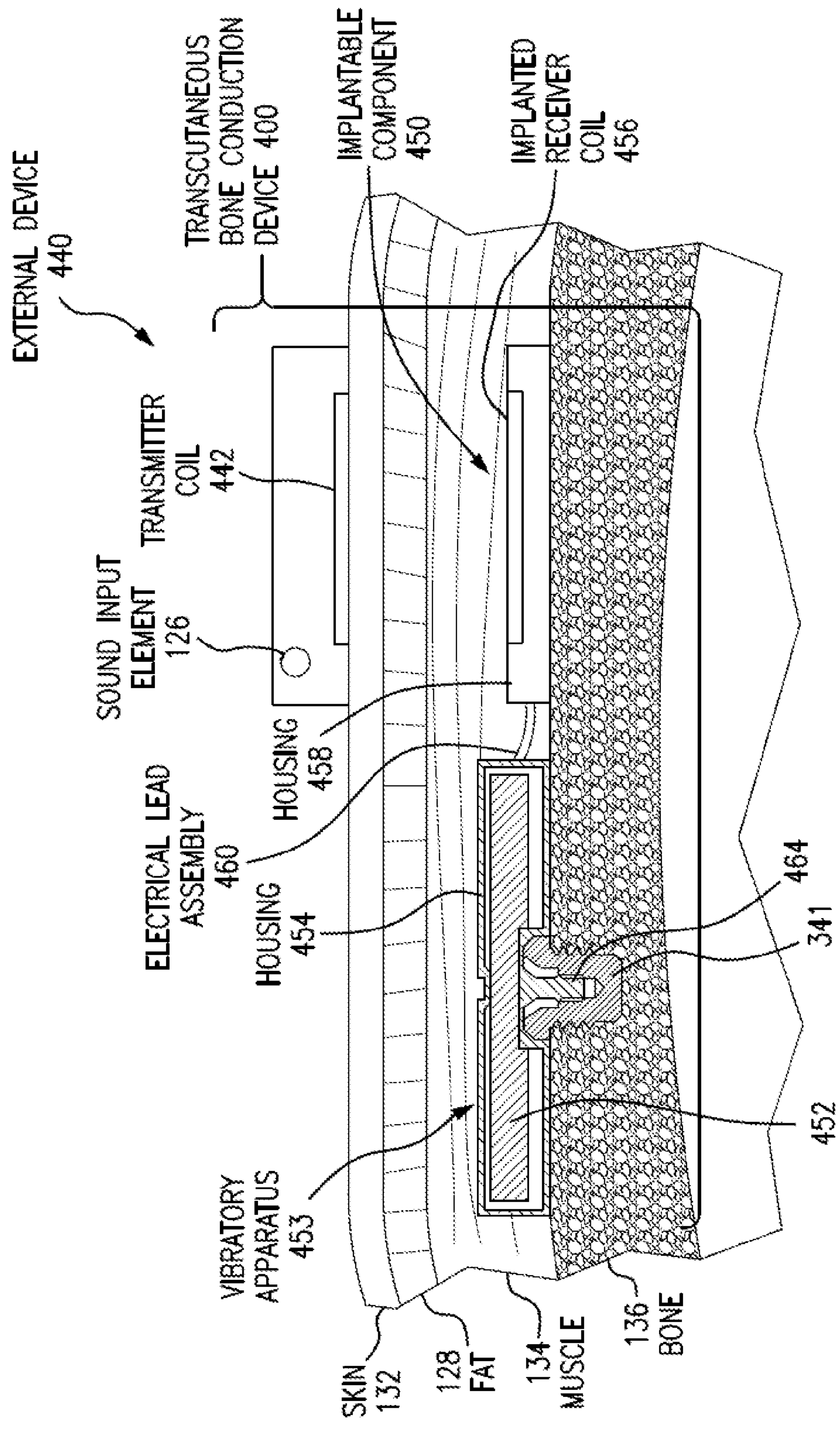
FIG. 4 is a schematic diagram conceptually illustrating an active transcutaneous bone conduction device in accordance with at least some exemplary embodiments.

FIG. 4 depicts an exemplary embodiment of a transcutaneous bone conduction device 400 according to another embodiment that includes an external device 440 (corresponding to, for example, element 140B of FIG. 1B) and an implantable component 450 (corresponding to, for example, element 150 of FIG. 1B). The transcutaneous bone conduction device 400 of FIG. 4 is an active transcutaneous bone conduction device in that the vibratory actuator 452 is located in the implantable component 450. Specifically, a vibratory element in the form of vibratory actuator 452 is located in housing 454 of the implantable component 450. In an exemplary embodiment, much like the vibratory actuator 342 described above with respect to transcutaneous bone conduction device 300, the vibratory actuator 452 is a device that converts electrical signals into vibration.

External component 440 includes a sound input element 126 that converts sound into electrical signals. Specifically, the transcutaneous bone conduction device 400 provides these electrical signals to vibratory electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibratory actuator 452 via electrical lead assembly 460. The vibratory electromagnetic actuator 452 converts the electrical signals into vibrations.

The vibratory electromagnetic actuator 452 is mechanically coupled to the housing 454. Housing 454 and vibratory actuator 452 collectively form a vibratory element 453. The housing 454 is substantially rigidly attached to bone fixture 341.

Some exemplary features of the vibratory electromagnetic actuator usable in some embodiments of the bone conduction devices detailed herein and/or variations thereof will now be described in terms of a vibratory electromagnetic actuator used in the context of the percutaneous bone conduction device of FIG. 1A. It is noted that any and/or all of these features and/or variations thereof may be utilized in transcutaneous bone conduction devices such as those of FIGS. 1B, 3 and 4 and/or other types of prostheses and/or medical devices and/or other devices, at least with respect to enabling utilitarian performance thereof. It is also noted that while the embodiments detailed herein are detailed with respect to an electromagnetic actuator, the teachings associated therewith are equally applicable to electromagnetic transducers that receive vibrations and output a signal indicative of the vibrations, at least unless otherwise noted. In this regard, it is noted that use of the term actuator herein also corresponds to transducer, and vice-versa, unless otherwise noted.

Figure 5:
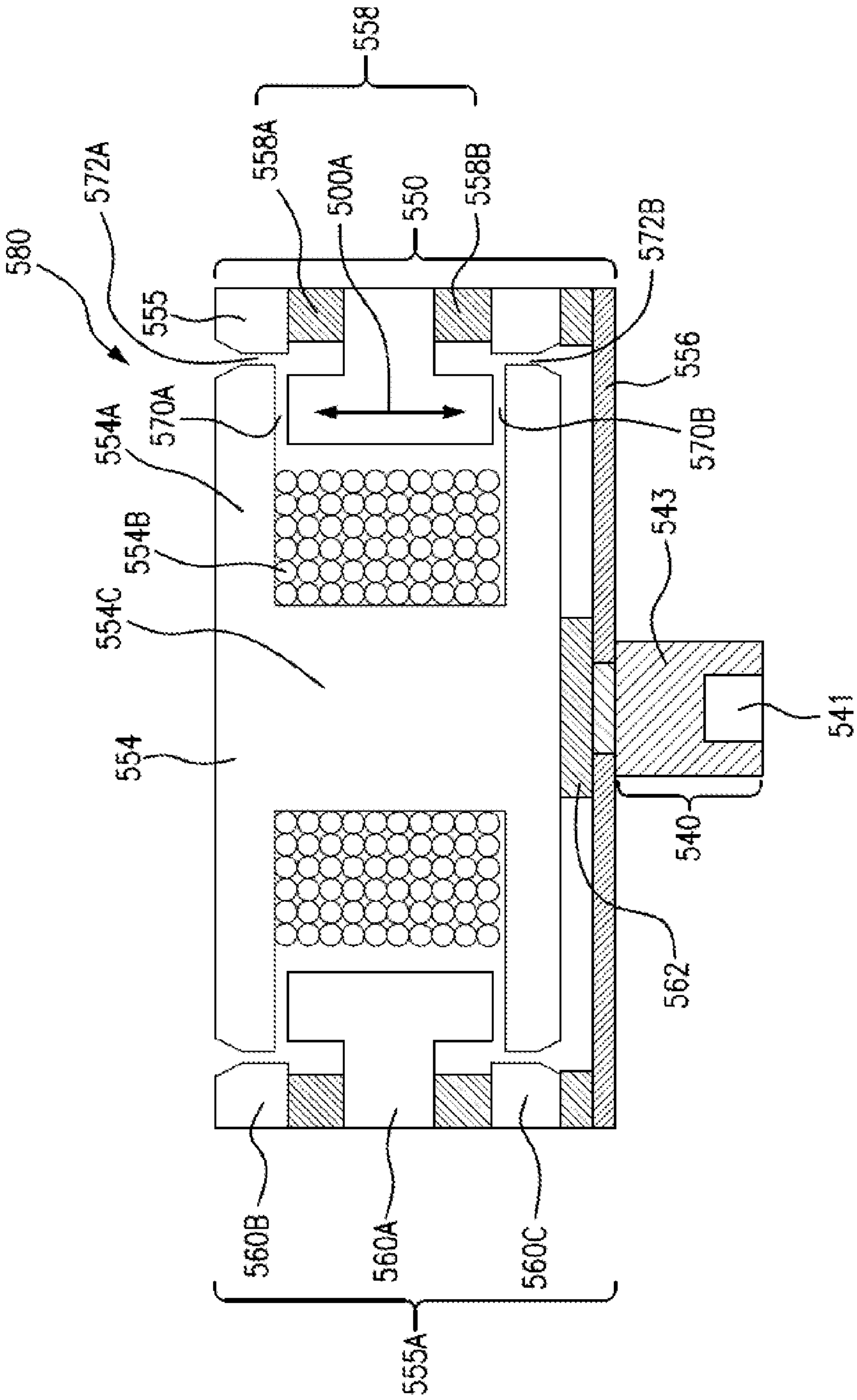
FIG. 5 is a cross-sectional view of an example of a vibratory actuator-coupling assembly of the bone conduction device of FIG. 2.

FIG. 5 is a cross-sectional view of a vibratory actuator-coupling assembly 580, which can correspond to vibratory actuator-coupling assembly 280 detailed above. The vibratory actuator-coupling assembly 580 includes a vibratory electromagnetic actuator 550 and a coupling assembly 540. Coupling assembly 540 includes a coupling 541 mounted on coupling shaft 543. Additional details pertaining to the coupling assembly are described further below with respect to the design of FIG. 6A.

As illustrated in FIG. 5, vibratory electromagnetic actuator 550 includes a bobbin assembly 554 and a counterweight assembly 555. As illustrated, bobbin assembly 554 includes a bobbin 554A and a coil 554B that is wrapped around a core 554C of bobbin 554A. In the illustrated design, bobbin assembly 554 is radially symmetrical.

Counterweight assembly 555 includes spring 556, permanent magnets 558A and 558B, yokes 560A, 560B and 560C, and spacer 562. Spacer 562 provides a connective support between spring 556 and the other elements of counterweight assembly 555 just detailed. Spring 556 connects bobbin assembly 554 via spacer 524 to the rest of counterweight assembly 555, and permits counterweight assembly 555 to move relative to bobbin assembly 554 upon interaction of a dynamic magnetic flux, produced by bobbin assembly 554.

Coil 554B, in particular, may be energized with an alternating current to create the dynamic magnetic flux about coil 554B. Conversely, permanent magnets 558A and 558B generate a static magnetic flux. These permanent magnets 558A and 558B are part of counterweight assembly 555, which also includes yokes 560A, 560B and 560C. The yokes 560A, 560B and 560C can be made of a soft iron in some designs.

As may be seen, vibratory electromagnetic actuator 550 includes two axial air gaps 570A and 570B that are located between bobbin assembly 554 and counterweight assembly 555. With respect to a radially symmetrical bobbin assembly 554 and counterweight assembly 555, such as that detailed in FIG. 5, air gaps 570A and 570B extend in the direction of relative movement between bobbin assembly 554 and counterweight assembly 555, indicated by arrow 500A.

Further as may be seen in FIG. 5, the vibratory electromagnetic actuator 550 includes two radial air gaps 572A and 572B that are located between bobbin assembly 554 and counterweight assembly 555. With respect to a radially symmetrical bobbin assembly 554 and counterweight assembly 555, the air gap extends about the direction of relative movement between bobbin assembly 554 and counterweight assembly 555. As may be seen in FIG. 5, the permanent magnets 558A and 558B are arranged such that their respective south poles face each other and their respective north poles face away from each other. It is noted that in an alternate design, the reverse can be the case (respective north poles face towards each other and respective south poles face away from each other).

In the electromagnetic actuator of FIG. 5, the radial air gaps 572A and 572B close static magnetic flux between the bobbin 554A and the yokes 560B and 560C, respectively. Further, axial air gaps 570A and 570B close the static and dynamic magnetic flux between the bobbin 554A and the yoke 560A. Accordingly, in the radially symmetrical device of FIG. 5, there are a total of four (4) air gaps.

It is noted that the electromagnetic actuator of FIG. 5 is a balanced actuator. In alternate configuration a balanced actuator can be achieved by adding additional axial air gaps above and below the outside of bobbin 554B (and in some variations thereof, the radial air gaps are not present due to the addition of the additional axial air gaps). In such an alternate configuration, the yokes 560B and 560C are reconfigured to extend up and over the outside of bobbin 554B (the geometry of the permanent magnets 558A and 558B and/or the yoke 560A might also be reconfigured to achieve utility of the actuator). Collectively magnets 558B and 558A make up the static magnetic flux assembly 558C (see FIG. 22).

Some designs of a balanced electromagnetic transducer will now be described that utilize fewer air gaps than the configuration of FIG. 5 and the alternate variations as described above. In some exemplary designs, the electromagnetic actuator (balanced and/or unbalanced, as detailed below) is achieved by providing functionality to a resilient element, such as by way of example and not by way of limitation, a spring, beyond that which is normally associated therewith. Designs detailed herein are detailed with respect to a spring. It is noted, however, that in alternate designs of these designs and/or variations thereof, the disclosure of spring also corresponds to the disclosure of a resilient element. More particularly, not only does the spring provide resilient elasticity concomitant with the traditional use of the spring, but the spring also provides a conduit for magnetic flux (static and/or dynamic). In an exemplary design utilizing a spring having such functionality, one or more of the above mentioned air gaps with respect to the design of FIG. 5 (e.g. the radial air gaps) are eliminated and/or one or more of the soft iron parts utilized in that design are not utilized in this exemplary design.

More particularly, it is noted that the balance electromagnetic actuator of FIG. 5 relies on at least four air gaps (while the design of FIG. 5 is depicted as including two axial air gaps and two radial air gaps, other balance electromagnetic actuators utilize four axial air gaps). An exemplary design includes a spring having dual functionality as a traditional spring, on the one hand, and a conduit for magnetic flux, on the other hand, such that at least one or two of the air gaps of the design of FIG. 5 can eliminated. Functionality according to a "traditional spring" includes, for example, an device that elastically deforms/moves from its unloaded position when pushed or pulled or pressed (i.e., subjected to load) and then returns to its original shape/returns to is unloaded position when the pushing, pulling or pressing is removed (load is removed).

In this regard, in some designs, there is an electromagnetic actuator that is balanced that has only two air gaps (both axial air gaps) owing to the fact that the spring(s) replaces two of the radial air gaps. That is, the magnetic flux is conducted through spring(s) instead of through air gaps. An exemplary design of such will now be described, followed by some exemplary descriptions of some alternate designs.

Figure 6A:
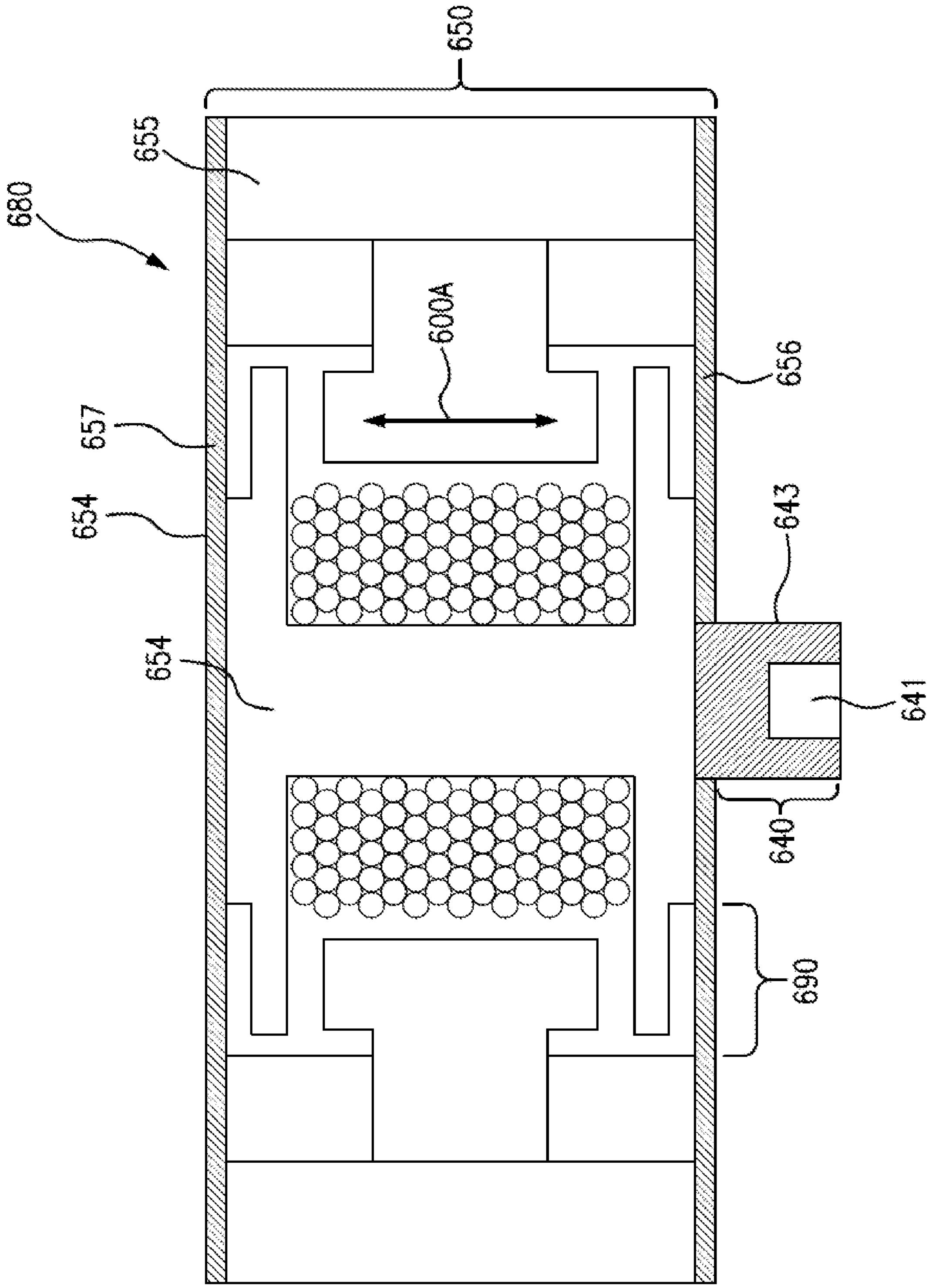
FIG. 6A is a cross-sectional view of a vibratory actuator-coupling assembly of the bone conduction device of FIG. 2.

FIG. 6A is a cross-sectional view of a vibratory actuator-coupling assembly 680, which can correspond to vibratory actuator-coupling assembly 280 detailed above.

Coupling assembly 640 includes a coupling 641 in the form of a snap coupling configured to "snap couple" to an anchor system on the recipient. As noted above with reference to FIG. 1, the anchor system may include an abutment that is attached to a fixture screw implanted into the recipient's skull and extending percutaneously through the skin so that snap coupling 341 can snap couple to a coupling of the abutment of the anchor system. In the design depicted in FIG. 6A, coupling 641 is located at a distal end—relative to housing 242 if vibratory actuator-coupling assembly 680 were installed in bone conduction device 200 of FIG. 2 (i.e., element 680 being substituted for element 280 of FIG. 2)—of a coupling shaft 643 of coupling assembly 640. In an design, coupling 641 corresponds to coupling described in U.S. patent application Ser. No. 12/177,091 assigned to Cochlear Limited. In yet other designs, alternate couplings can be used.

Coupling assembly 640 is mechanically coupled to vibratory electromagnetic actuator 650 configured to convert electrical signals into vibrations. In an exemplary design, vibratory electromagnetic actuator 650 (and/or any vibratory electromagnetic actuator detailed herein and/or variations thereof) corresponds to vibratory electromagnetic actuator 250 or vibratory electromechanical actuator 342 or vibratory electromechanical actuator 452 detailed above, and, accordingly, in some designs, the teachings detailed above and/or variations thereof with respect to such actuators are included in the genus of devices, genus of systems and/or genus of methods of utilizing the vibratory electromagnetic actuator 650 and/or any vibratory electromagnetic actuator detailed herein and/or variations thereof. This is further detailed below.

In operation, sound input element 126A (FIG. 1A) converts sound into electrical signals. As noted above, the bone conduction device provides these electrical signals to a sound processor which processes the signals and provides the processed signals to the vibratory electromagnetic actuator 650 (and/or any other electromagnetic actuator detailed herein and/or variations thereof—it is noted that unless otherwise specified, any teaching herein concerning a given design is applicable to any variation thereof and/or any other design and/or variations thereof), which then converts the electrical signals (processed or unprocessed) into vibrations. Because vibratory electromagnetic actuator 650 is mechanically coupled to coupling assembly 640, the vibrations are transferred from vibratory electromagnetic actuator 650 to coupling assembly 640 and then to the recipient via the anchor system (not shown).

As noted, the teachings detailed herein and/or variations thereof with respect to any given electromagnetic transducer are not only applicable to a percutaneous bone conduction device such as that according to the design of FIG. 2, but also to a transcutaneous bone conduction device such as those according to designs of FIG. 3 and FIG. 4. In this regard, the electromagnetic transducers detailed herein and/or variations thereof can be substituted for the vibratory actuator 342 of the design of FIG. 3 and the vibratory actuator 452 of the design of FIG. 4. Accordingly, some designs include an active transcutaneous bone conduction device having the electromagnetic transducers detailed herein and/or variations thereof. Also, some designs include a passive transcutaneous bone conduction device having the electromagnetic transducers detailed herein and/or variations thereof. It is further again noted that other medical devices and/or other devices can utilize the electromagnetic transducers detailed herein and/or variations thereof.

Figure 6B:
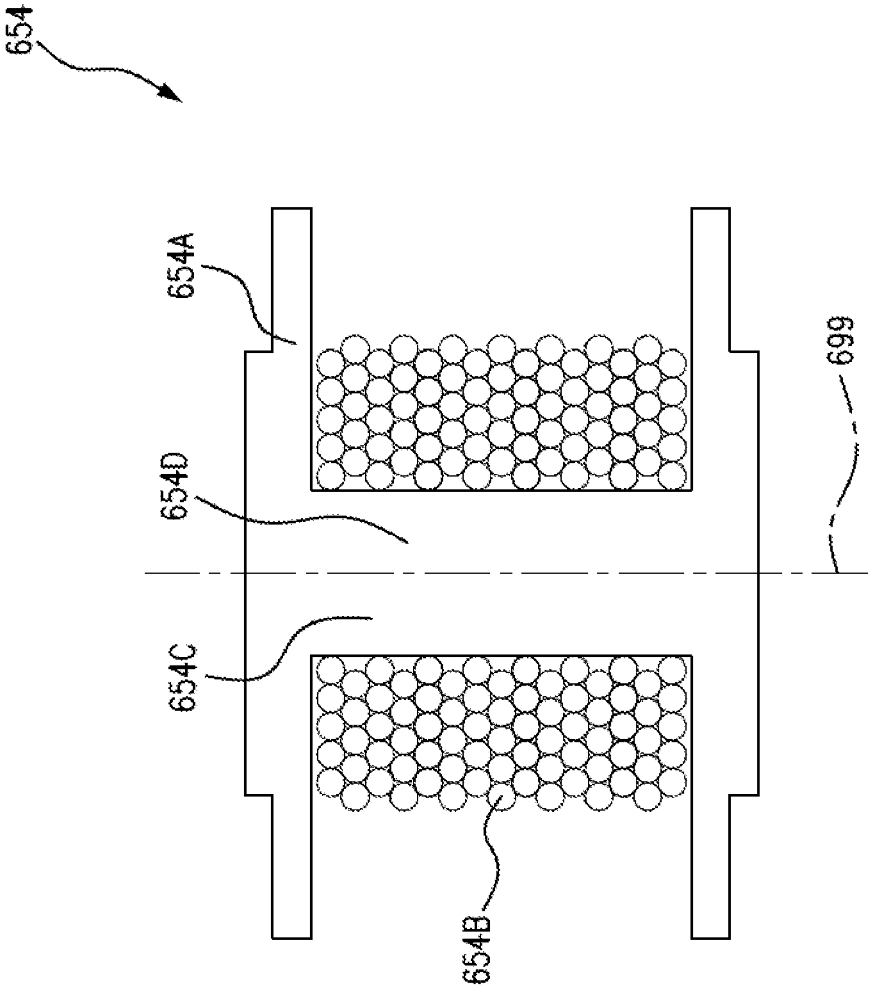
FIG. 6B is a cross-sectional view of the bobbin assembly of the vibratory actuator-coupling assembly of FIG. 3A.

As illustrated in FIG. 6A, vibratory electromagnetic actuator 650 includes a bobbin assembly 654, a counterweight assembly 655 and coupling assembly 640. For ease of visualization, FIG. 6B depicts bobbin assembly 654 separately. As illustrated, bobbin assembly 654 includes a bobbin 654A and a coil 654B that is wrapped around a core 654C of bobbin 654A. In the illustrated design, bobbin assembly 654 is radially symmetrical (i.e., symmetrical about the longitudinal axis 699.

Figure 6C:
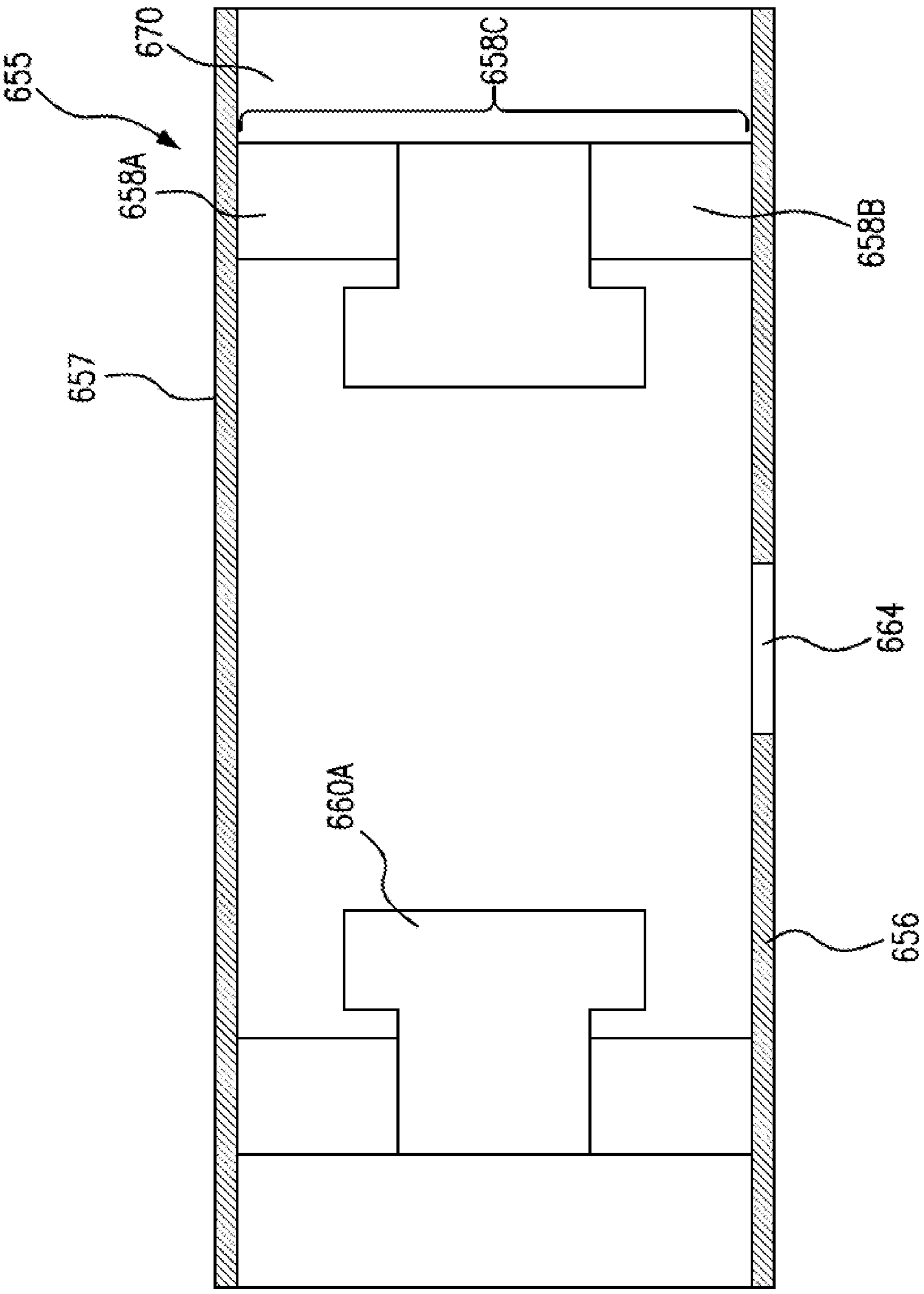
FIG. 6C is a cross-sectional view of the counterweight assembly of the vibratory actuator-coupling assembly of FIG. 3A.

FIG. 6C illustrates counterweight assembly 655 separately, for ease of visualization. As illustrated, counterweight assembly 655 includes springs 656 and 657, permanent magnets 658A and 658B, yoke 660A, and counterweight mass 670. Springs 656 and 657 connect bobbin assembly 654 to the rest of counterweight assembly 655, and permit counterweight assembly 655 to move relative to bobbin assembly 654 upon interaction of a dynamic magnetic flux, produced by bobbin assembly 654. In this regard, with reference back to FIG. 6A, spring 656 includes a flexible section 690 that is not directly connected to any component of the bobbin assembly 654 or to any component of the counterweight assembly 655 that flexes, as will be further detailed below. Along these lines, spring 656 can be directly adhesively bonded, riveted, bolted, welded, etc., directly to the bobbin assembly 654 and/or to any component of the counterweight assembly 655 so as to hold the components together/in contact with one another such that designs detailed herein and/or variations thereof can be practiced. Any device, system or method that can be utilized to connect the components of the vibratory actuator-coupling assembly can be utilized in at least some of the designs detailed herein and/or variations thereof.

As can be seen, the two permanent magnets 658A and 658B respectively directly contact the springs 656 and 657. That is, there is no yoke or other component (e.g., in the form of a ring) interposed between the magnets and the springs. Accordingly, the magnetic flux generated by the magnets flows directly into the springs without passing through an intermediary component or without passing through a gap. However, it is noted that in an alternate design, there can be an intermediary component, such as a yoke or the like. Further, in some designs, there can be a gap between the magnets and the springs.

The dynamic magnetic flux is produced by energizing coil 654B with an alternating current. The static magnetic flux is produced by permanent magnets 658A and 658B of counterweight assembly 655, as will be described in greater detail below. In this regard, counterweight assembly 655 is a static magnetic field generator and bobbin assembly 654 is a dynamic magnetic field generator. As may be seen in FIGS. 6A and 6C, hole 664 in spring 656 provides a feature that permits coupling assembly 641 to be rigidly connected to bobbin assembly 654.

It is noted that while designs presented herein are described with respect to a bone conduction device where counterweight assembly 655 includes permanent magnets 658A and 658B that surround coil 654*b* and moves relative to coupling assembly 640 during vibration of vibratory electromagnetic actuator 650, in other designs, the coil may be located on the counterweight assembly 655 as well, thus adding weight to the counterweight assembly 655 (the additional weight being the weight of the coil).

As noted, bobbin assembly 654 is configured to generate a dynamic magnetic flux when energized by an electric current. In this exemplary design, bobbin 654A is made of a soft iron. Coil 654B may be energized with an alternating current to create the dynamic magnetic flux about coil 654B. The iron of bobbin 654A is conducive to the establishment of a magnetic conduction path for the dynamic magnetic flux. Conversely, counterweight assembly 655, as a result of permanent magnets 658A and 658B, in combination with yoke 660A and springs 656 (this feature being described in greater detail below), at least the yoke, in some designs, being made from soft iron, generate, due to the permanent magnets, a static magnetic flux. The soft iron of the bobbin and yokes may be of a type that increases the magnetic coupling of the respective magnetic fields, thereby providing a magnetic conduction path for the respective magnetic fields.

Figure 7:
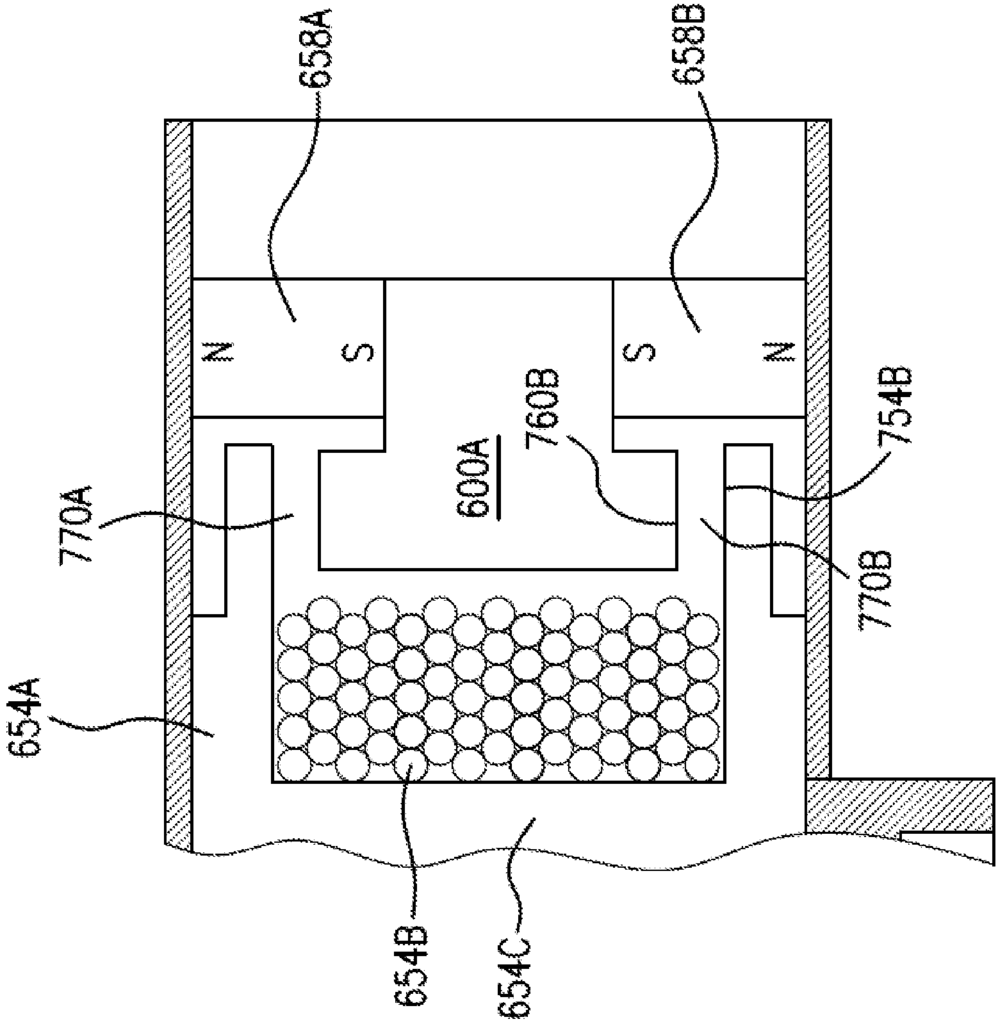
FIG. 7 is a schematic diagram of a portion of the vibratory actuator-coupling assembly of FIG. 6A.

FIG. 7 depicts a portion of FIG. 6A. As may be seen, vibratory electromagnetic actuator 650 includes two axial air gaps 770A and 770B that are located between bobbin assembly 654 and counterweight assembly 655. As used herein, the phrase "axial air gap" refers to an air gap that has at least a component that extends on a plane normal to the direction of primary relative movement (represented by arrow 600A in FIG. 6A—more on this below) between bobbin assembly 654 and counterweight assembly 655 such that the air gap is bounded by the bobbin assembly 654 and counterweight assembly 655 in the direction of relative movement between the two.

Accordingly, the phrase "axial air gap" is not limited to an annular air gap, and encompasses air gaps that are formed by straight walls of the components (which may be present in designs utilizing bar magnets and bobbins that have a non-circular (e.g. square) core surface). With respect to a radially symmetrical bobbin assembly 654 and counterweight assembly 655, cross-sections of which are depicted in FIGS. 6A-7, air gaps 770A and 770B extend in the direction of relative movement between bobbin assembly 654 and counterweight assembly 655, air gaps 770A and 770B are bounded as detailed above in the "axial" direction. With respect to FIG. 7, the boundaries of axial air gap 770B are defined by surface 754B of bobbin 654A and surface 760B of yoke 660A.

It is noted that the primary direction of relative motion of the counterweight assembly of the electromagnetic transducer is parallel to the longitudinal direction of the electromagnetic transducer, and with respect to utilization of the transducers in a bone conduction device, normal to the tangent of the surface of the bone 136 (or, more accurately, an extrapolated surface of the bone 136) local to the bone fixtures. It is noted that by "primary direction of relative motion," it is recognized that the counterweight assembly may move inward towards the longitudinal axis of the electromagnetic actuator owing to the flexing of the springs (providing, at least, that the spring does not stretch outward, in which case it may move outward or not move in this dimension at all), but that most of the movement is normal to this direction.

Further as may be seen in FIG. 7, in contrast to the device of FIG. 5, the vibratory electromagnetic actuator 650 includes no radial air gaps located, for example, between bobbin assembly 654 and counterweight assembly 655. As used herein, the phrase "radial air gap" refers to an air gap that has at least a component that extends on a plane normal to the direction of relative movement between bobbin assembly 654 and counterweight assembly 655 such that the air gap is bounded by bobbin assembly 654 and counterweight assembly 655 in a direction normal to the primary direction of relative movement between the two (represented by arrow 600A in FIG. 6A). Accordingly, in some exemplary designs, due to the feature of the conductive springs 656 and 657, the radial air gaps of the configuration of FIG. 5 are not utilized in the design of FIG. 6A and variations thereof, and, in some designs and variations thereof, there are no additional axial air gaps than those depicted in FIG. 6A.

As can be seen in FIG. 7, the permanent magnets 658A and 658B are arranged such that their respective south poles face each other and their respective north poles face away from each other. It is noted that in other designs, the respective south poles may face away from each other and the respective north poles may face each other.

Figure 8A:
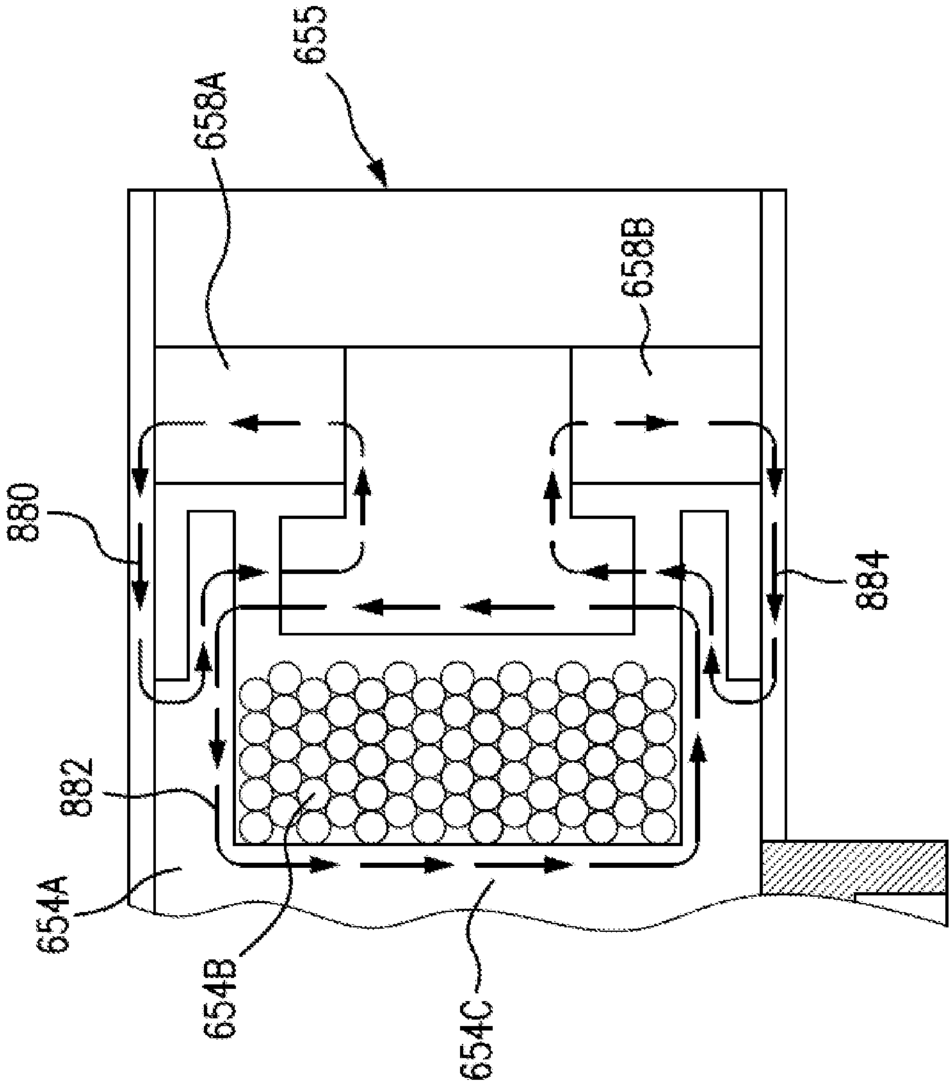
FIGS. 8A and 8B are schematic diagrams detailing static and dynamic magnetic flux in the vibratory actuator-coupling assembly at the moment that the coils are energized when the bobbin assembly and the counterweight assembly are at a balance point with respect to magnetically induced relative movement between the two.

FIG. 8A is a schematic diagram detailing the respective static magnetic flux 880 and static magnetic flux 884 of permanent magnets 658A and 658B, and dynamic magnetic flux 882 of coil 654B in vibratory actuator-coupling assembly 680 when coil 654B is energized according to a first current direction and when bobbin assembly 654 and counterweight assembly 655 are at a balance point with respect to magnetically induced relative movement between the two (hereinafter, the "balance point"). That is, while it is to be understood that the counterweight assembly 655 moves in an oscillatory manner relative to the bobbin assembly 654 when the coil 654B is energized, there is an equilibrium point at the fixed location corresponding to the balance point at which the counterweight assembly 654 returns to relative to the bobbin assembly 654 when the coil 654B is not energized.

Figure 8B:
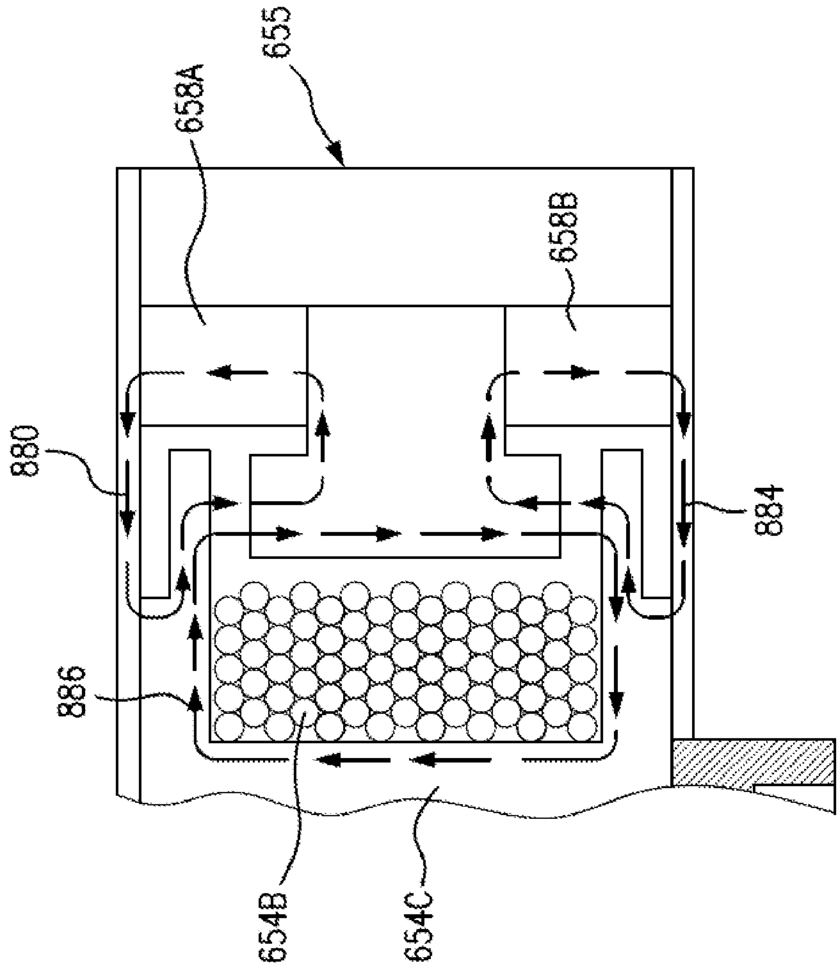

FIG. 8B is a schematic diagram detailing the respective static magnetic flux 880 and static magnetic flux 884 of permanent magnets 658A and 658B, and dynamic magnetic flux 886 of coil 654B in vibratory actuator-coupling assembly 680 when coil 654B is energized according to a second current direction (a direction opposite the first current direction) and when bobbin assembly 654 and counterweight assembly 655 are at a balance point with respect to magnetically induced relative movement between the two.

It is noted that FIGS. 8A and 8B do not depict the magnitude/scale of the magnetic fluxes. In this regard, it is noted that in some designs, at the moment that coil 654B is energized and when bobbin assembly 654 and counterweight assembly 655 are at the balance point, relatively little, if any, static magnetic flux flows through the core 654C of the bobbin 654A/the space 654D (see FIG. 6B) in the coil 654B (the space 654D being formed as a result of the coil 654B being wound about, and at least partially filled by, the core 654C of the bobbin 654A). Accordingly, FIGS. 8A and 8B depict this fact. However, during operation, the amount of static magnetic flux that flows through the core increases as the bobbin assembly 654 travels away from the balance point (both downward and upward away from the balance point) and decreases as the bobbin assembly 654 travels towards the balance point (both downward and upward towards the balance point). Still, the amount that travels through the core is minimal compared to the amount the travels through the respective air gaps. In this regard, static magnetic flux circuits 880 and 884 as depicted in FIG. 8A represent an ideal static magnetic flux path, where it is to be understood that magnetic flux, albeit relatively limited quantities, can also travel outside this ideal path.

As can be seen from FIGS. 8A and 8B, the static magnetic flux and the dynamic magnetic flux all cross the same air gaps, and there are no air gaps crossed by the static magnetic flux that are not cross by the dynamic magnetic flux, at least with respect to the ideal paths of the static magnetic flux and the dynamic magnetic flux.

It is noted that the directions and paths of the static magnetic flux and dynamic magnetic flux are representative of some exemplary designs, and in other designs, the directions and/or paths of the fluxes can vary from those depicted.

As may be seen from FIGS. 8A and 8B, axial air gaps 770A and 770B close static magnetic flux circuits 880 and 884. It is noted that the phrase "air gap" refers to a gap between the component that produces a static magnetic field and a component that produces a dynamic magnetic field where there is a relatively high reluctance but magnetic flux still flows through the gap. The air gap closes the magnetic field. In an exemplary design, the air gaps are gaps in which little to no material having substantial magnetic aspects is located in the air gap. Accordingly, an air gap is not limited to a gap that is filled by air.

Still with reference to FIGS. 8A and 8B, it is noted that static magnetic flux circuits 880 and 884 each constitute closed flux paths/closed circuits. These paths/circuits are considered herein to be "local circuits" in that they are local to the individual permanent magnets that generate the circuit. As can be seen, each closed static magnetic flux path depicted in FIGS. 8A and 8B travels across no more than one air gap. That said, it is noted that in some designs or in potentially all designs, there is a static magnetic flux that travels across both air gaps. Such a scenario can exist in the case of trace flux and/or in the case of movement of the counterweight assembly 655 from the balance point, where some of the flux from one magnet travels through one air gap and some flux travels through another air gap. Without being bound by theory, such can exist in the scenario where the static magnetic flux also travels through the core of the bobbin. Still, even in such a scenario, there is a closed static magnetic flux path that travels across only one air gap. The path, however, is considered herein to be a "global" circuit as it extends outside the local circuit owing to, for example, its travels through the core of the bobbin.

FIGS. 8A and 8B clearly depict that the static magnetic flux generated by the counterweight assembly 655 travels across only two air gaps. This is as contrasted to the design of FIG. 5, where the generated static magnetic flux crosses four air gaps. In this regard, an exemplary design includes a balanced electromagnetic transducer where only two air gaps are present.

As can be seen from the figures, the dynamic magnetic flux also crosses both air gaps. In an exemplary design, neither the dynamic magnetic flux nor the static magnetic flux crosses an air gap at the other does not cross.

Figure 9A:
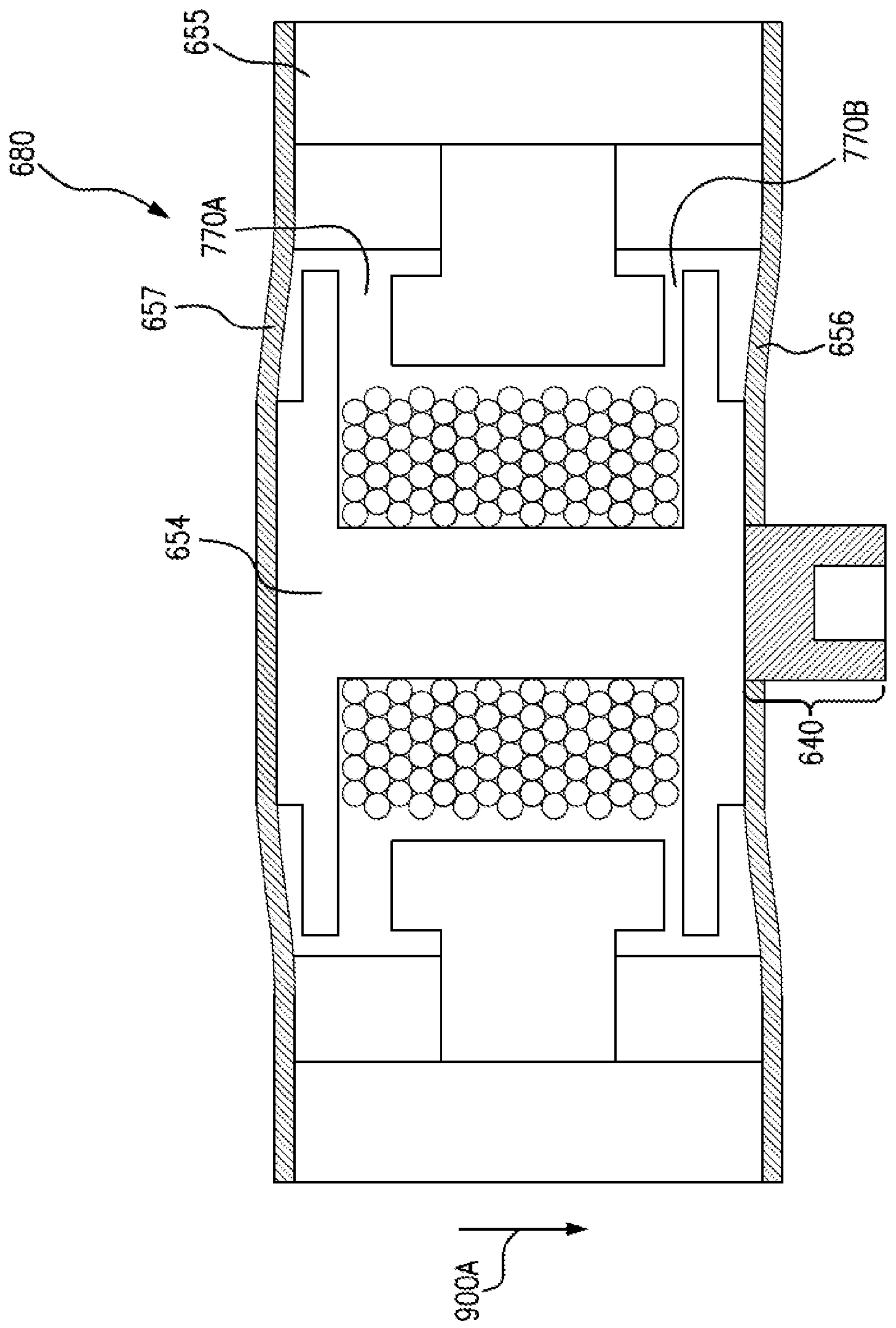
FIG. 9A is a schematic diagram depicting movement of the counterweight assembly relative to the bobbin assembly of the vibratory actuator-coupling assembly of FIG. 6A.

Referring now to FIG. 9A, the depicted magnetic fluxes 880, 882 and 884 of FIG. 8A will magnetically induce movement of counterweight assembly 655 downward (represented by the direction of arrow 900*a* in FIG. 9A) relative to bobbin assembly 654 so that vibratory actuator-coupling assembly 680 will ultimately correspond to the configuration depicted in FIG. 9A. More specifically, vibratory electromagnetic actuator 650 of FIG. 6A is configured such that during operation of vibratory electromagnetic actuator 650 (and thus operation of bone conduction device 200), an effective amount of the dynamic magnetic flux 882 and an effective amount of the static magnetic flux (flux 880, flux 884 and/or a combination of flux 880 and 884) flow through at least one of axial air gaps 770A and 770B sufficient to generate substantial relative movement between counterweight assembly 655 and bobbin assembly 654.

As used herein, the phrase "effective amount of flux" refers to a flux that produces a magnetic force that impacts the performance of vibratory electromagnetic actuator 650, as opposed to trace flux, which may be capable of detection by sensitive equipment but has no substantial impact (e.g., the efficiency is minimally impacted) on the performance of the vibratory electromagnetic actuator. That is, the trace flux will typically not result in vibrations being generated by the electromagnetic actuators detailed herein and/or typically will not result in the generation electrical signals in the absence of vibration inputted into the transducer.

Further, as may be seen in FIGS. 8A and 8B, the static magnetic fluxes enter bobbin 654A substantially only at locations lying on and parallel to a tangent line of the path of the dynamic magnetic fluxes 882.

As may be seen from FIGS. 8A and 8B, the dynamic magnetic flux is directed to flow within the area sandwiched by the springs 656 and 657. In particular, no substantial amount of the dynamic magnetic flux 882 or 886 passes through or into springs 656. Further, no substantial amount of the dynamic magnetic flux 882 or 886 passes through the two permanent magnets 658A and 658B of counterweight assembly 655. Moreover, as may be seen from the FIGS., the static magnetic fluxes (880, 884 and/or a combination of the two) is produced by no more than two permanent magnets 658A and 658B.

It is noted that the schematics of FIGS. 8A and 8B represent respective instantaneous snapshots while the counterweight assembly 655 is moving in opposite directions (FIG. 8A being downward movement, FIG. 8B being upward movement), but both when the bobbin assembly 654 and counterweight assembly 655 are at the balance point.

As counterweight assembly 655 moves downward relative to bobbin assembly 654, as depicted in FIG. 9A, the span of axial air gap 770A increases and the span of axial air gap 770B decreases. This has the effect of substantially reducing the amount of effective static magnetic flux through axial air gap 770A and increasing the amount of effective static magnetic flux through axial air gap 770B. However, in some designs, the amount of effective static magnetic flux through springs 656 and 657 collectively substantially remains about the same as compared to the flux when counterweight assembly 655 and bobbin assembly 654 are at the balance point. (Conversely, as detailed below, in other designs the amount is different.) Without being limited by theory, this is believed to be the case because the deflection of the springs 656 and 657 is within parameters that do not result in a significant change in spring orientation that substantially impacts the amount of effective static magnetic flux through the springs. That is, the springs do not substantially impact the flow of magnetic flux.

Upon reversal of the direction of the dynamic magnetic flux, the dynamic magnetic flux will flow in the opposite direction about coil 654B. However, the general directions of the static magnetic flux will not change. Accordingly, such reversal will magnetically induce movement of counterweight assembly 655 upward (represented by the direction of arrow 900B in FIG. 9B) relative to bobbin assembly 654 so that vibratory actuator-coupling assembly 680 will ultimately correspond to the configuration depicted in FIG. 9B. As counterweight assembly 655 moves upward relative to bobbin assembly 654, the span of axial air gap 770B increases and the span of axial air gap 770A decreases. This has the effect of reducing the amount of effective static magnetic flux through axial air gap 770B and increasing the amount of effective static magnetic flux through axial air gap 770A. However, the amount of effective static magnetic flux through the springs 656 does not change due to a change in the span of the axial air gaps as a result of the displacement of the counterweight assembly 655 relative to the bobbin assembly 654 for the reasons detailed above with respect to downward movement of counterweight assembly 655 relative to bobbin assembly 654.

Figure 9B:
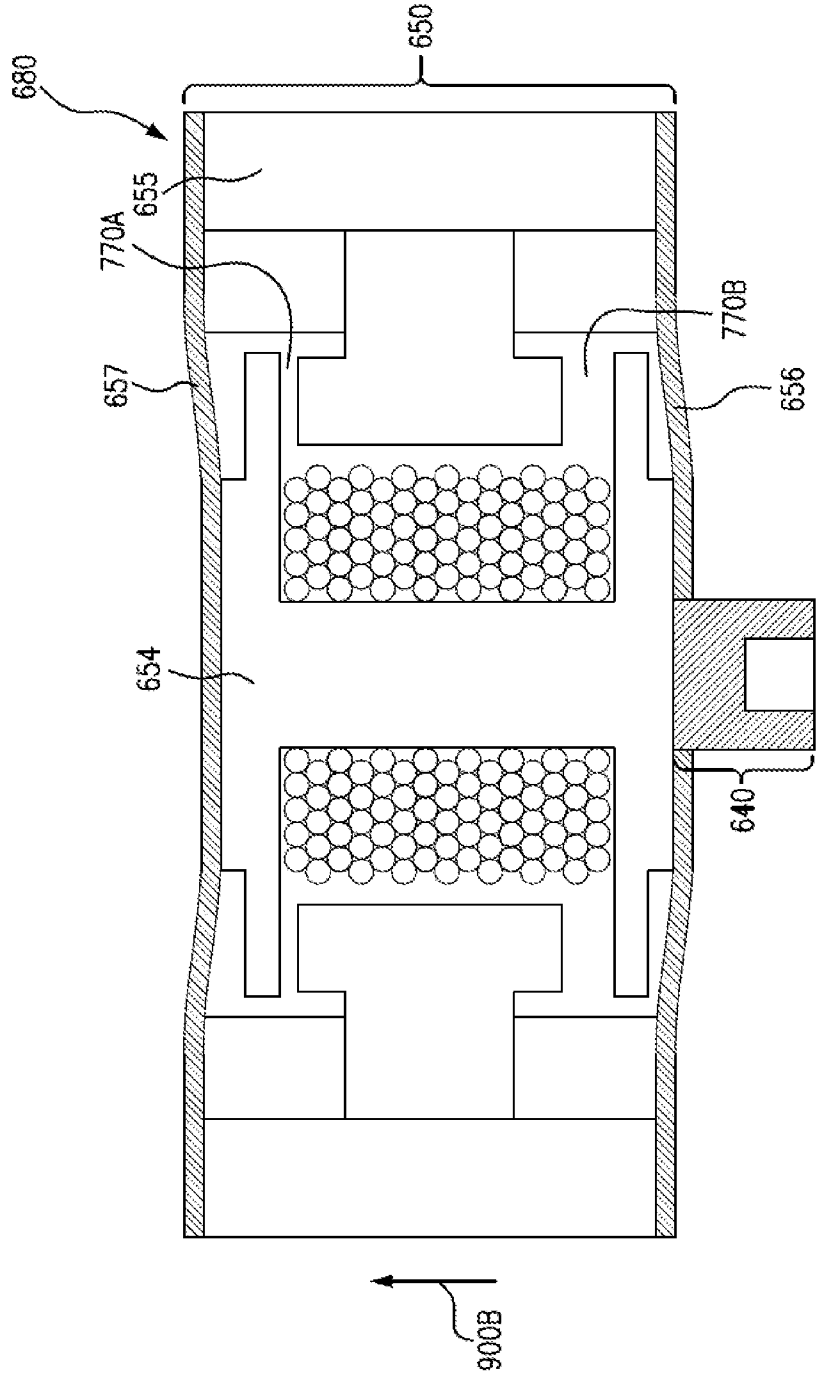
FIG. 9B is a schematic diagram depicting movement of the counterweight assembly relative to the bobbin assembly of the vibratory actuator-coupling assembly of FIG. 6A in the opposite direction of that depicted in FIG. 9A.

As can be seen from FIGS. 9A and 9B, the springs 656 and 657 deform with transduction of the transducer (e.g., actuation of the actuator). Accordingly, at least a portion of the static magnetic flux flows through solid material that deforms during transduction by the electromagnetic transducer. This as contrasted to the flow of static magnetic flux through, for example, the yokes of the design of FIG. 5, where the yokes do not deform during actuation (transduction).

Referring back to FIG. 5, it can be seen that the designs thereof utilizes yokes 560B and 560C to establish the radial air gaps between the yokes and the bobbin assembly 354. That is, the design of FIG. 5 utilizes three separate yokes (including yoke 560A). Conversely, the design of FIG. 6A utilizes only one yoke (it is noted that the depictions of FIGS. 6A to 6C are cross-sectional views of a rotationally symmetric vibratory electromagnetic actuator, and thus yoke 660A is in the form of a ring). Note further that in the case of a balanced actuator that utilizes only axial air gaps, it has been heretofore known to utilize yokes that extend above and below (with respect to the orientation of FIG. 5) the bobbin assembly. Accordingly, an exemplary design provides for a balance electromagnetic actuator having fewer yokes.

Note further that the reduction of such components can have utility in that manufacturing tolerance buildup is not as significant of a factor as it might otherwise have been. That is, in the design of FIG. 6A, tolerance buildup affecting the axial air gaps could be limited to the tolerances of the permanent magnet 658B (or permanent magnet 658A) and the yoke 600A. This can have utility in that the size of the axial air gaps can be reduced relative to that which would be utilized to account for tolerance buildup with respect to the design of FIG. 5. This is because there would be less tolerance uncertainty in the design of FIG. 6A.

In some designs of the design of FIG. 6A, it is relatively easier to align the various components of the actuator as compared to the implementation of designs according to FIG. 5. The potential for tilting of the counterweight assembly components relative to the bobbin assembly components and/or vice-versa is lower relative to that associated with designs according to FIG. 5. Such tilting can cause the air gaps, especially the radial air gaps, to collapse or otherwise be reduced in width, such that a deleterious effect on the performance of the actuator results. Along these lines, designs according to FIG. 6A need not account for as much tilt relative to one another as designs corresponding to FIG. 5 to avoid contact (such as contact while the actuators are vibrating). Still further, because of the reduced span of the flexible portion of the springs relative to designs corresponding to FIG. 5, the assemblies are less likely to tilt relative to one another/the assemblies are more resistant to tilting (i.e., for a given force that causes tilting, the design of FIG. 6A tilts less than the design of FIG. 5). Accordingly, the axial air gaps can be less wide in designs corresponding to FIG. 6A than in the designs corresponding to FIG. 5, all other things being equal. This can have utility in that the relative efficiency of the actuator can be greater than it otherwise might have been.

Accordingly, in an exemplary design, there is an electromagnetic transducer that is configured such that an angle of tilt between the bobbin assembly and the counterweight assembly is about 50%, 55%, 60%, 65%, 70%, 75%, 80%, 85%, 90% or 95% and/or any value or range of values therebetween in about 1% increments (e.g., about 56%, about 88% to about 94%, etc.) for a given tilt force, of that which would be present in an electromagnetic transducer according to the design of FIG. 5 and variations thereof, all other things being equal.

Still further, it is noted that the substitution of the springs for the air gaps also reduces or otherwise eliminates any need to control or otherwise adjusts the size of those air gaps during manufacturing, if only because those air gaps are no longer present. In this regard, with respect to FIG. 5, it is clear that a high degree of concentricity must exist with respect to the bobbin assembly and the counterweight assembly with respect to the radial air gaps. Tolerance buildups alone create difficulty in manufacturing the actuator. Further, there is a high degree of precision required to fit the bobbin assembly into the counterweight assembly. With respect to actuators that utilize four axial air gaps, the tolerance buildups create difficulty in manufacturing the actuator. Because of the reduction in the number of air gaps according to the design of FIG. 6 as compared to that of FIG. 5 and the variations thereof, the number of "controlled dimensions" that impact performance of the actuator are reduced, at least as compared to an actuator having four air gaps, all other things being equal.

Additionally, it is noted that in some designs utilizing a spring to close the static magnetic flux, larger axial air gaps can be utilized than those of the design of FIG. 5, all other things being equal. In an exemplary design, this can enable a larger tilt angle between the counterweight assembly and the bobbin assembly without having one component contact the other component as compared to that according to the design of FIG. 5, all other things being equal. More specifically, in an exemplary design, there is an electromagnetic transducer that is configured such that an angle of tilt between the bobbin assembly and the counterweight assembly resulting in contact between the two components, as referenced from the same relative positions (e.g., at the balance point, the top of the transduction motion, the bottom of the transduction motion, etc.) is about 105%, 110%, 115%, 120%, 125%, 130%, 135%, 140%, 145% or 150% and/or any value or range of values therebetween in about 1% increments (e.g., about 116%, about 121% to about 138%, etc.) of that which would be present in an electromagnetic transducer according to the design of FIG. 5 and variations thereof, all other things being equal.

The designs of FIGS. 6A-9B detailed above include the use of two separate springs 656 and 657 as conduits of the static magnetic flux and no radial air gaps. In an alternate design, only one spring is used (either the top or the bottom spring) as a conduit of static magnetic flux (but two or more springs may be present—the additional springs being utilized for their traditional resilient purposes), and in the place of the other spring, a radial air gap located between bobbin assembly 654 and counterweight assembly 655 is utilized to close the static magnetic flux. It is noted that in an alternate design, two or more springs can be utilized as conduits for static magnetic flux along with one or two or more radial air gaps.

Figure 10:
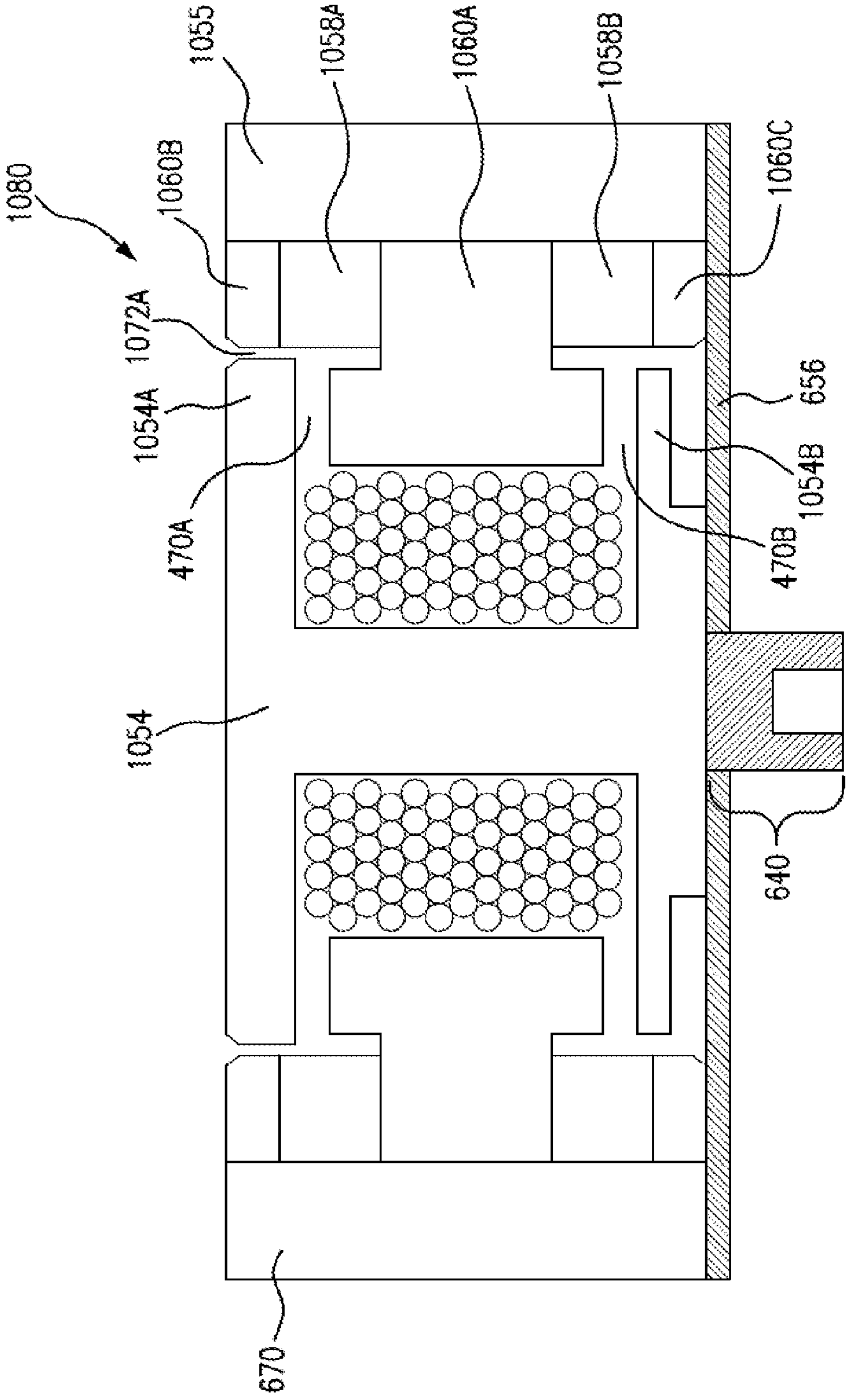
FIG. 10 is a cross-sectional view of an alternate design of a vibratory actuator-coupling assembly of the bone conduction device of FIG. 2.

More particularly, FIG. 10 depicts an alternate design of a vibratory actuator-coupling assembly 1080, that utilizes both a spring 656 and a radial air gap 1072A to close the static magnetic flux, where like reference numbers correspond to the components detailed above. As can be seen, bobbin assembly 1054 includes a bobbin that has arms 1054A and 1054B that are different from one another, with arm 1054B corresponding to the bottom arm of the bobbin 654A of FIG. 6A. However, arm 1054A extends further in the lateral direction than arm 1054B, and arm 1054A is "thicker" in the longitudinal direction than arm 1054B, at least with respect to the portions closest to counterweight assembly 1055.

As can be seen, permanent magnets 1058A and 1058B are of a different geometry than the permanent magnets of the design of FIG. 6A. More particularly, in the design depicted in FIG. 10, the permanent magnets 1058A and 1058A are shorter than the permanent magnets of FIG. 6A. Also, the permanent magnets 1058A and 1058B are of the same configuration, although in other designs, different configurations can be utilized. In this regard, depending on the path of the magnetic fluxes, different sized permanent magnets (i.e., magnets of different strength) can be utilized to obtain a balanced vibratory actuator.

Referring still to FIG. 10, it can be seen that yokes 1060B and 1060C have been added in addition to yoke 1060A (which corresponds to yoke 660A of FIG. 6A). The magnetic flux generated by permanent magnet 1058B flows through yoke 1060A and bobbin assembly 1054 and spring 656 in a manner substantially the same as that detailed above with respect to the design of FIGS. 6A-9B, with the exception that the flux also flows through yoke 1060C. With regard to the flow of flux through yoke 1060C, the flux flows in a substantially linear manner therethrough (i.e., vertically into and out of yoke 1060C). Conversely, the magnetic flux generated by permanent magnet 1058A flows through yoke 1060B and bobbin assembly 1054A in a manner more akin to the flux of permanent magnet 558A of FIG. 5. In at least general terms, the flux enters yoke 1060B in a vertical direction, and then arcs to a generally horizontal direction to leave the yoke 1060B and enter arm 1054A of bobbin assembly 1054 across radial air gap 1072A. In this regard, radial air gap 1072A generally corresponds to the radial air gap between yoke 560B and bobbin 554A of FIG. 5. The flux then arcs from the horizontal direction to the vertical direction to flow into yoke 1060A across axial air gap 470A. (It is noted that the just described flux flows would be reversed for magnets having an opposite polarity than that which would result in the just described flow. In some designs any direction of magnetic flux flow can be utilized, providing that the teachings detailed herein and/or variations thereof can be practiced.)

It is noted that in the design of FIG. 10, a number of the components are depicted as being symmetrical and/or are identical to one another (albeit some are reversed). However, in other designs the configurations of the components can be varied. By way of example only and not by way of limitation, because of the presence of radial air gap 1072A at the "top" of the actuator and the absence of such an air gap at the "bottom" of the actuator (while there is a gap, the gap is relatively much larger than the radial air gap 1072A at the top (although in other designs, this is not the case) and little to no magnetic flux flows through that gap (instead the flux flows through the spring), and thus it is not an air gap), there may be utilitarian value in utilizing a permanent magnet 1058A that is stronger than permanent magnet 1058B and/or utilizing a yoke 1060B that is different from yoke 1060C, etc., at least if such results in a balanced actuator. Indeed, in some designs, the bottom yoke 1060C might be eliminated, and an elongated permanent magnet 1058B and/or the geometry of yoke 1060A being substituted in its place. With regard to the latter scenario, while the design of yoke 1060A is depicted as being symmetrical, other designs can include a yoke that is not symmetrical, at least in order to compensate for any flux path discrepancies resulting from utilizing the spring 656 on the bottom and the radial air gap 1072A on the top.

It is noted that the distance spanning the radial air gap 1060B can be set during design so as to result in a utilitarian balanced actuator. Alternatively, or in addition to this, the properties of the spring 656 can be set during design to achieve such a balanced actuator. (Exemplary properties of the spring 656 that can be set during design are described below.) In this regard, owing to the fact that there is no corresponding radial air gap at the bottom of the actuator, in an exemplary design, there is a relationship between the distance of the air gap 1072A and the thickness of the spring 656 that exists such that with respect to other parameters, a balance actuator is achieved.

While the design of FIG. 10 includes a radial air gap located at the top but not at the bottom, in an alternative design the radial air gap and the corresponding componentry is located at the bottom instead of the top (and the spring and corresponding componentry is located at the top).

As noted above, the design of FIG. 10 utilizes yokes positioned at both the north and south Poles of the permanent magnets, as opposed to the design of FIGS. 6A, which utilizes a yoke only at the north or south poles of the permanent magnets. In an exemplary design, yokes can be positioned on both sides of the permanent magnets (i.e., interposed between the permanent magnets and the respective springs, along with a yoke (or more than one yoke) interposed between the two permanent magnets. Any configuration and/or flux path flow that can be utilized to practice designs detailed herein and/or variations thereof can be utilized in some designs.

Referring back to FIG. 6A, because of the elimination of corresponding air gaps via use of springs 656 and 657 to close the static magnetic flux, the tendency of such eliminated air gaps to collapse is correspondingly effectively eliminated, and, in an exemplary design, the spring constant need not be as high as might be the case in designs that utilize four axial air gaps, such as that detailed above with respect to FIG. 5 and variations thereof.

As can be seen from the designs illustrated in the figures, all permanent magnets of counterweight assembly 655 that are configured to generate the static magnetic fluxes 880 and 884 are located to the sides of the bobbin assembly 655. Along these lines, such permanent magnets may be annular permanent magnets with respective interior diameters that are greater than the maximum outer diameter of the bobbin 654A, when measured on the plane normal to the direction (represented by arrow 900A in FIG. 9A) of the generated substantial relative movement of the counterweight assembly 655 relative to the bobbin assembly 654, as illustrated in FIGS. 9A and 9B. Conversely, in an alternate design, some or all of the permanent magnets of counterweight assembly 655 that are configured to generate the static magnetic fluxes are located above and/or below the bobbin assembly 655.

In some designs, the configuration of the counterweight assembly 655 reduces or eliminates the inaccuracy of the distance (span) between faces of the components forming the air gaps that exists due to the permissible tolerances of the dimensions of the permanent magnets. In this regard, in some designs, the respective spans of the axial air gaps 770A and 770B, when measured when the bobbin assembly 654 and the counterweight assembly 655 are at the balance point, are not dependent on the thicknesses of the permanent magnets 658A and 658B as compared to the design of FIG. 5 and/or variations thereof, all other things being equal.

It is noted that while the surfaces creating the radial air gap of FIG. 10 are depicted as uniformly flat, in other designs, the surfaces may be partitioned into a number of smaller mating surfaces. It is further noted that the use of radial air gap 1072A permits relative ease of inspection of the radial air gaps from the outside of the vibratory electromagnetic actuator 650, in comparison to, for example absence of the radial air gap.

Figure 11:
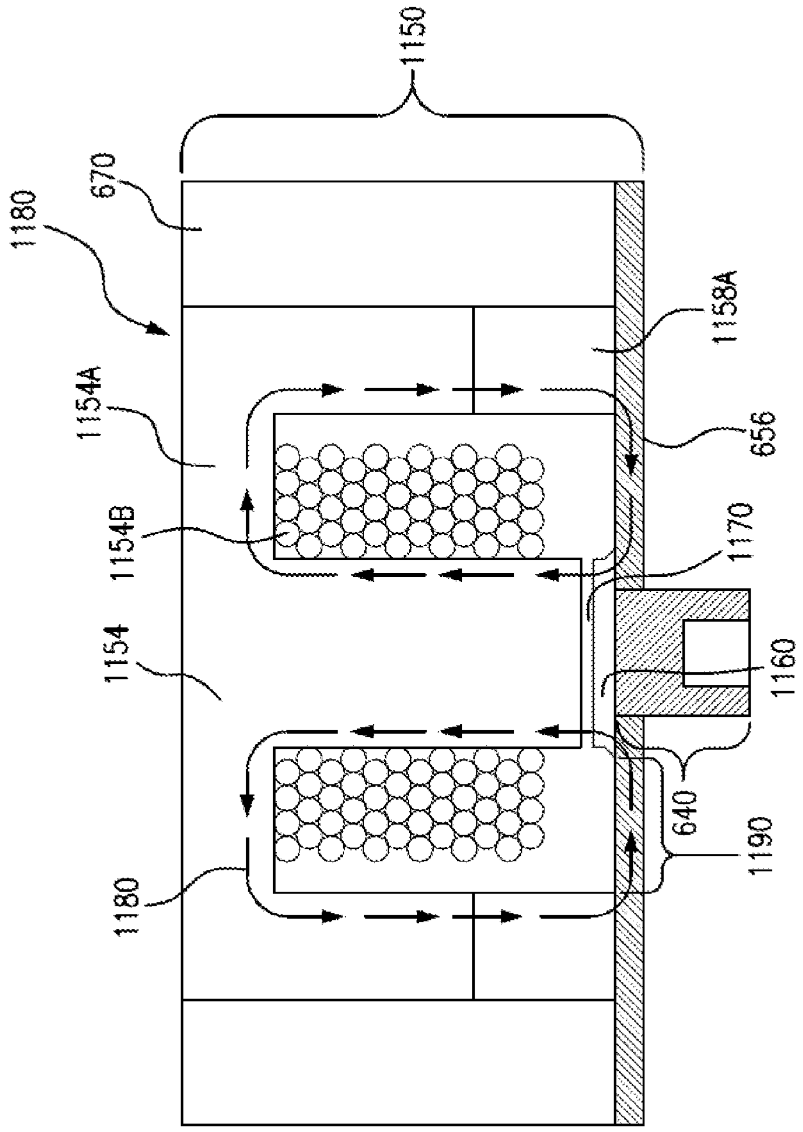
FIG. 11 is a cross-sectional view of an alternate design of t of a vibratory actuator-coupling assembly of the bone conduction device of FIG. 2.

FIG. 11 depicts an exemplary alternate design of a vibratory actuator, one that is unbalanced, as will now be described.

FIG. 11 is a cross-sectional view of a vibratory actuator-coupling assembly 1180, which can correspond to vibratory actuator-coupling assembly 280 detailed above. Like reference numbers corresponding to elements detailed above will not be addressed.

As illustrated in FIG. 11, vibratory electromagnetic actuator 1150 includes a bobbin assembly 1154 connected to coupling assembly 640 via spring 656. Reference numeral 1190 indicates the flexible section of the spring 656, a section of the spring which flexes because, in this design, it is not directly connected to any component of the bobbin assembly or to any component of the yoke 1160. It is noted that in some designs, yoke 1160 can flex to a certain degree, and thus those sections of spring 655 that are connected to the flexing portions of yoke 1160 also flex. Accordingly, section 1190 can extend into the section attached to yoke 1160 in some designs. It can be seen that mass 670 is attached to bobbin 1154A of bobbin assembly 1154. In the embedment of FIG. 11, the bobbin assembly 1154 also functionally serves as a counterweight assembly. (It is noted that the designs detailed above likewise can be configured in alternate variations such that the bobbin assembly, or at least portions thereof, functionally correspond to the counterweight.)

Spring 656 permits the bobbin assembly 1154 and mass 670 to move relative to yoke 1160 and coupling assembly 640, which is connected thereto, upon interaction of a dynamic magnetic flux, produced by bobbin assembly 1154 upon energizement of coils 1154B. More particularly, a dynamic magnetic flux is produced by energizing coil 1154B with an alternating current. The dynamic magnetic flux is not shown, but it parallels the static magnetic flux 1180 produced by permanent magnet 1158A of the bobbin assembly. That is, in an exemplary design, the dynamic magnetic flux, if depicted, would be located at the same place as the depicted static magnetic flux 1180, with the exception that the arrow heads would change direction depending on the alternation of the current.

In this regard, bobbin assembly 1154 is both a static magnetic field generator and a dynamic magnetic field generator.

The functionality and configuration of the elements of the design of FIG. 11 (and FIG. 12 detailed below) can correspond to that of the corresponding functional elements of one or more or all of the other designs detailed herein.

Vibratory electromagnetic actuator 1150 includes a single axial air gap 1170 that is located between bobbin assembly 1154 and yoke 1160. In this regard, the spring 656 is utilized to close both the static and dynamic magnetic flux, and both fluxes are closed through the same air gap 1170 (and thus a single air gap 1170).

It is noted that the directions and paths of the static magnetic fluxes (and thus by description above, the dynamic magnetic fluxes) are representative of some exemplary designs, and in other designs, the directions and/or paths of the fluxes can vary from those depicted.

As noted above, coupling assembly 640 is attached (either directly or indirectly) to yoke 1160. Without being bound by theory, yoke 1160, in some designs, channels the fluxes into and/or out of (depending on the alternation of the current and/or the polarity direction of the permanent magnet 1158A) the bobbin assembly so as to achieve utilitarian functionality of the vibratory electromagnetic actuator 1150. It is noted that in an alternate design, yoke 1160 is not present (i.e., the fluxes enter and/or exit or at least substantially enter and/or exit the spring 656 from/to the bobbin assembly 1154).

Figure 12:
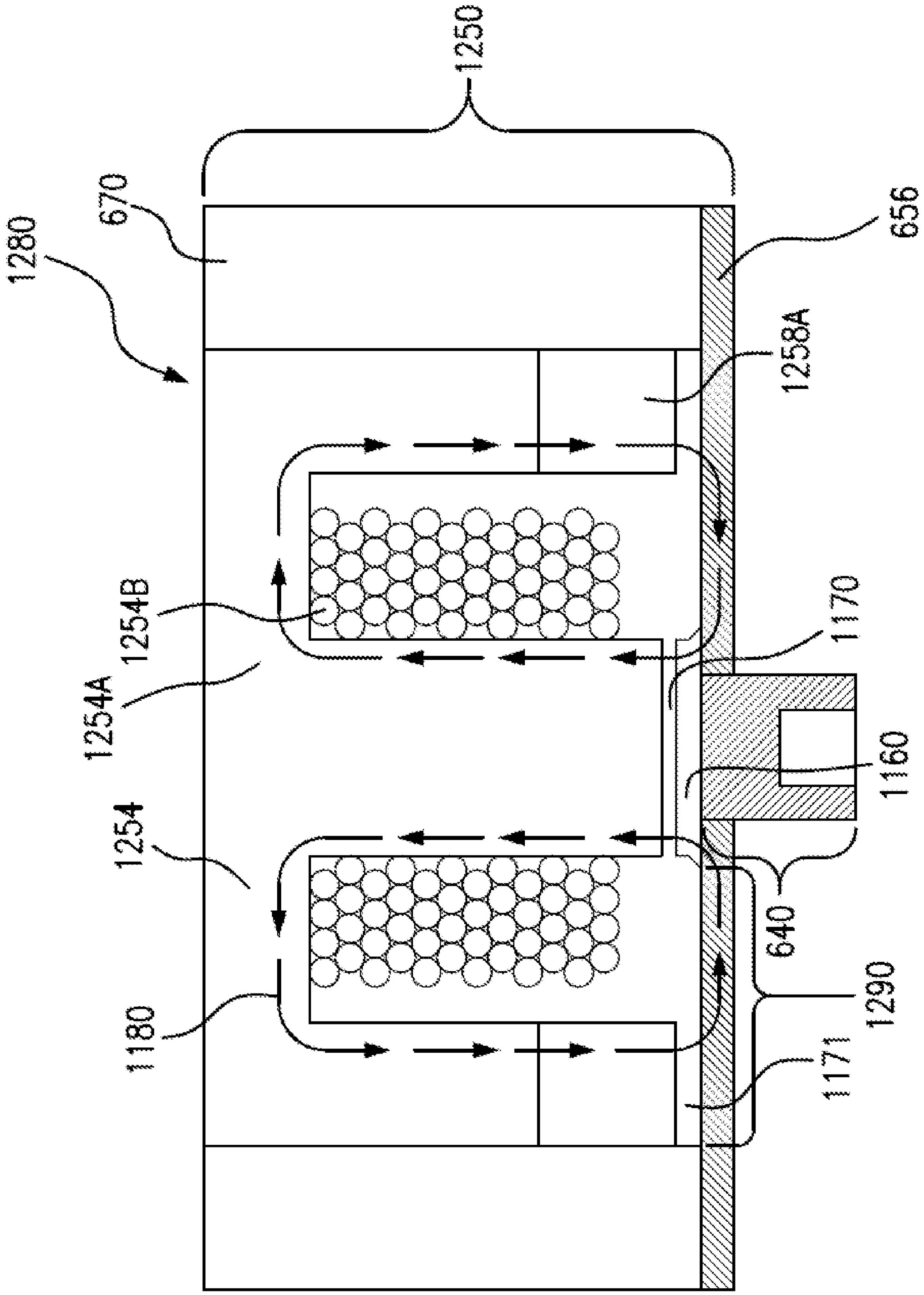
FIG. 12 is a cross-sectional view of an alternate vibratory actuator-coupling assembly of the bone conduction device of FIG. 2.

As can be seen, the flux enters and/or exits magnet 1158A directly from or to spring 656. Conversely in an alternate design this is not the case. In this regard, FIG. 12 depicts an alternate design of a vibratory electromagnetic actuator 1250 of a vibratory actuator-coupling assembly 1280, where the fluxes enter and/or exit a further axial air gap 1171. Reference numeral 1290 indicates the flexible section of the spring 655, corresponding to flexible section 1190 detailed above.

Still with reference to FIG. 12, it can be seen that the gap between the yoke 1160 and the bobbin 1254 is smaller than the gap between spring 656 and permanent magnet 1258A. This is done to account for tilting of the bobbin assembly/counterweight assembly relative to the coupling assembly 640. In this regard, the distance moved as a result of relative tilting between the assemblies of the vibratory actuator-coupling assembly 1280 will typically be greater with increasing distance away from the longitudinal axis. In this regard, the larger gap between the permanent magnet 1258A and spring 656 as compared to the gap between the yoke 1160 and the bobbin 1254 accounts for this phenomenon, thus reducing and/or eliminating the likelihood that these components contact each other during tilting. In some exemplary designs, in an un-energized actuator, the gap between the yoke 1160 and the bobbin 1254 is about 60 microns, and the gap between the spring 656 and the permanent magnet 1258A is about 250 microns. That said, in an alternate design, because of the resilient nature of the spring 656, in an exemplary design, the width of the gaps may be equal. Without being bound by theory, in an exemplary design, the resiliency of the spring 656 reduces and/or eliminates potential deleterious effects of contact between the spring and the permanent magnet. Of course, with respect to the design of FIG. 11, where the permanent magnet 1158A is secured to spring 656, there is no gap between these two components at all. Accordingly, in an exemplary design, there is a transducer where there is no meaningful discrepancy between the widths of the air gaps during operation thereof.

In view of the above, designs detailed herein and/or variations thereof can enable a method of transducing energy. In an exemplary design of this method there is the action of moving the counterweight assembly 655 relative to the bobbin assembly 654A in an oscillatory manner. This action is such that during the movement of the two assemblies relative to one another, there is interaction of a dynamic magnetic flux and a static magnetic flux (e.g. at the air gaps). An exemplary method further includes the action of directing the static magnetic flux along a closed circuit that in its totality extends across one or more air gaps. In an exemplary design, this action is such that all of the one or more air gaps have respective widths that vary while the static magnetic flux is so directed and interacting with the dynamic magnetic flux. This action is further qualified by the fact that if there is more than one air gap present in the closed-circuit (e.g., the design of FIG. 12, as compared to for example the design of FIG. 6A or the design of FIG. 11), a rate of change of variation of the width of one of the air gaps of the closed-circuit is different from that of at least one of the other air gaps of the closed-circuit. Along these lines, it can be seen from FIG. 12 that the air gap between the spring and the permanent magnet will vary in width at a different rate than that of the air gap between the yoke and the bobbin. This is in contrast to, for example, the design of FIG. 5, where the closed static magnetic flux crosses two air gaps, where the width of one of the air gaps (i.e. the radial air gap) does not vary while the static magnetic flux interacts with the dynamic magnetic flux. Further, in an exemplary design, the amount of width variation of the air gap between the spring and the permanent magnet will vary by a different amount than that of the air gap between the yoke and the bobbin.

At least some designs detailed herein and/or variations thereof enable a method to be practiced where static magnetic flux is directed along a path that extends through a solid body while the solid body flexes (e.g., the design of FIGS. 6A, 10, 11 and 12).

It is noted that some exemplary designs include any device, system and/or method where static and/or magnetic flux travels through a spring in a manner that eliminates an air gap due to the use of the spring in such a manner. Along these lines, it is noted that unless otherwise specified, any of the specific teachings detailed herein and/or variations thereof can be applicable to any of the designs detailed herein and/or variations thereof unless otherwise specified.

The elimination of some or all of the radial and/or axial air gaps via the use of, for example, a spring to close the magnetic flux, can make the actuator more efficient as compared to other actuators that instead utilize corresponding radial and/or axial air gaps. In this regard, air gaps can present substantial magnetic reluctances. The relative reduction and/or elimination of such magnetic reluctance to make the actuator more efficient relative to an actuator utilizing such air gaps. In an exemplary design, this can permit smaller permanent magnets to be used/weaker permanent magnets to be used while obtaining the same efficacy as an actuator utilizing such air gaps, all other things being equal. In an exemplary design, the mass of the permanent magnets and/or strength of the permanent magnets, all other things being equal, is about 50%, 55%, 60%, 65%, 70%, 75%, 80%, 85%, 90% or about 95%, and/or is about any value or range of values therebetween in about 1% increments (e.g., 61%, 66% to 94%, etc.) of that for an actuator utilizing such air gaps, all other things being equal.

Different performance parameters can be obtained by varying design parameters of a given actuator, and thus obtaining an actuator having such design parameters. For example, varying the mechanical stiffness of the springs (k) varies the resonance frequency of the actuator. Varying the magnetic flux conductive properties of the springs varying the amount of magnetic flux that can be conducted by the springs. In some exemplary designs of balance electromagnetic actuators detailed herein and/or variations thereof, one or more or all of the springs only effectively conduct static magnetic flux. That is, little to no dynamic magnetic flux is conducted by the spring(s) (any dynamic magnetic flux conducted by the springs only amounts to trace amounts of flux). In an exemplary design, the springs are made of a material that have a high saturation flux density, and the magnetic permeability of the material is generally unspecified (e.g. it can be within a range from and including low to high permeability, at least providing that the spring has a sufficiently high saturation flux density to accept the static magnetic flux, which does not vary, in contrast to the dynamic magnetic flux).

Without being bound by theory, it is believed that in at least some exemplary designs, designs of the electromagnetic transducers utilizing springs as flux conduits detailed herein and/or variations thereof can be designed based on an understanding that while the spring(s) constitute bottlenecks for the static magnetic flux, these are bottlenecks that do not change with performance of the transducer. That is, designing the actuators can be optimized and rendered more efficient than those of, for example, the design of FIG. 5 and variations thereof, provided that this understanding is taken into account. Along these lines, because a given flux saturation of the spring does not vary with movement of the counterweight assembly (i.e. changing widths of the axial air gaps), once the amount of expected static magnetic flux is determined, the spring can be designed to account for the static magnetic flux, with the knowledge that the expected static magnetic flux will not vary with respect to operational extremes of the transducer. Put another way, the static magnetic flux generated by the permanent magnets is constant. It is the fact that the path has variables that vary with operation of the transducer (i.e., the air gaps) that impart uncertainty into expected static magnetic flux values. By replacing at least some of the air gaps with the springs, this uncertainty is reduced. That is, the amount of static magnetic flux that a given spring of a given geometry can accept and still enable the transducer to operate in a utilitarian manner is fixed. It does not change with operation of the transducer. Accordingly, any need to address this "uncertainty" during the design process is not present with respect to transducers utilizing springs to close the static magnetic flux. Additionally, without being bound by theory, by saturating the springs with static magnetic flux, dynamic magnetic flux is less likely to travel therethrough, and this it is more likely to retained sandwiched between the springs.

Moreover, the use of springs as conduits of the static magnetic flux avoid the possibility of "air gap collapse" because there is no air gaps to collapse. In this regard, the magnetic reluctance through a spring is generally constant, and, in contrast, the reluctance across an air gap varies with the width of the air gap. Still further, with respect to radial air gaps that have widths that do not vary, there is still a change in the reluctance across such gaps (e.g., due to imperfections in the alignment of the counterweight assembly and the bobbin assembly, movement away from the alignment during movement of the counterweight assembly upward and/or downward relative to the bobbin assembly, etc.). Accordingly, the reluctance across a spring does not change as much as the change reluctance across even a radial air gap.

In some exemplary designs, the effective spring thickness and/or the effective spring radius are varied during design so as to obtain utilitarian spring stiffnesses and utilitarian spring magnetic flux property. By effective spring thickness, it is meant the thickness of a cross-section of the flexible portion of the spring lying on a plane parallel to and lying on the longitudinal axis of the actuator (i.e., the axis aligned with the direction of movement of the bobbin assembly (counterweight assembly) relative to the bobbin assembly). By effective spring radius, it is meant the distance from the longitudinal axis to the location at which the spring contacts structure of the bobbin/counterweight assembly (where it no longer flexes), adjusted for the fact that the area around the longitudinal axis does not flex (due to, for example, the coupling 640 and/or the yoke 1160). That is, the term "effective" addresses the fact that there are portions of the spring that are present but do not flex during energizement of the actuator. By varying the effective spring thickness and the effective spring radius, a wide range of spring stiffnesses can be achieved for a wide range of magnetic fluxes that travel through the spring. In this regard, if a spring thickness of, for example 0.3 mm is utilitarian to achieve a utilitarian magnetic flux therethrough, the effective radius of the spring can be varied (e.g., by varying the distance of the flexible section 1190 during design to obtain a utilitarian spring stiffness for that thickness without substantially impacting the utilitarian nature of the magnetic flux, and visa-versa.

It is noted at this time that in an exemplary design, the thicknesses of the springs of the designs detailed herein and/or variations thereof can be about 0.05 mm, 0.1 mm, 0.15 mm, 0.2 mm, 0.25 mm, 0.3 mm, 0.35 mm or about 0.4 mm or any value or range of values between these values in 0.01 mm increments (e.g., about 0.22 mm, about 0.17 mm to about 0.33 mm, etc.). Any spring thickness that can enable the teachings detailed herein and/or variations thereof to be practiced can be utilized in some designs. Further in this regard any spring geometry can be utilized as well. Along these lines, while a spring having a circular circumference has been the focus of the designs detailed herein, springs having a square circumference, a rectangular circumference, or an oval circumference etc., can be utilized in some designs.

It is noted that in an exemplary design, the diameters of the electromagnetic transducers according to the designs herein and/or variations thereof can be about 8 mm with respect to the balance transducers and about 11 mm with respect to the unbalanced transducers. In some exemplary designs, the diameters of the electromagnetic transducers can be about 6 mm, 7 mm, 8 mm, 9 mm, 10 mm, 11 mm, 12 mm or about 13 mm in length and/or a length of any value or range of values therebetween in about 0.1 mm increments (e.g., about 7.8 mm, 6.7 mm to about 11.2 mm, etc.).

It further noted that in an exemplary design, the seismic mass of the transducers detailed herein and/or variations thereof, totals about 6 g, and the amount of that mass made up by the permanent magnets corresponds to about 0.3 g. By seismic mass, it is meant the mass of the components that move relative to the portions of the transducer that are fixed to the much more massive object into which were from which the vibrations travel. Accordingly in an exemplary design, the ratio of the mass of the permanent magnets to the total seismic mass of the transducer is about 0.01, 0.02, 0.03, 0.04, 0.05, 0.06, 0.07, 0.08, 0.09, or about 0.10 or any value or range of values therebetween in about 0.002 increments (e.g., about 0.053, about 0.041 to about 0.064, etc.).

Without being bound by theory, in an exemplary design, utilization of the springs as a conduit for the magnetic flux enables the permanent magnets to be made smaller, as the flux generated by those permanent magnets is more efficiently conducted through the components of the transducer. In this regard, air gaps present a feature that frustrates, to an extent, the efficient conduction of the flux through the transducer. The elimination of the air gaps by replacement thereof by the springs enables smaller (e.g., less powerful magnets to be used) as compared to the transducer that utilizes air gaps instead of springs to close the magnetic field, all other things being.

An exemplary design includes placing holes through one or more or all of the springs of the actuator to "fine-tune" the stiffness and/or magnetic flux properties of the spring(s). Accordingly, an exemplary design includes springs having holes (circular, oval, arcuate etc.) therethrough. Some designs of these exemplary designs include through holes while other designs of these exemplary designs include tools that do not pass all the way through the spring. Accordingly by varying the depth of these holes, the stiffness and/or magnetic flux properties can be further fine-tuned. It is therefore noted that a method of manufacture of the actuators detailed herein and/or variations thereof includes fine-tuning the stiffness and/or magnetic flux properties of a spring along these lines.

In at least some exemplary designs, the actuators in general, and the springs in particular, are configured such that during all operating conditions (e.g., such as those conditions pertaining to the operation of a bone conduction device to talk a hearing percept), the springs remain magnetically saturated. In an exemplary design, this enables the magnetic flux passing through the springs to be substantially if not completely independent of the respective magnetic field. Accordingly, an exemplary design is such that the magnetic flux through the springs does not substantially vary with variations in the axial air gap size during operation (e.g., during utilization of the actuator in a bone conduction device to invoke a hearing percept). In an exemplary design, this provides utility in that the risk of air gap collapse is reduced as compared to actuators that do not have such features, where air gap collapse can occur when the magnetic force is stronger than the restoring mechanical spring force.

In an exemplary design, the spring is made out of materials that have a relatively high yield strength or otherwise can withstand the stresses exposed to the spring during normal operation of the vibratory actuators (e.g. such as utilization of the actuators in a bone conduction device to invoke a hearing percept), and also a relatively high magnetic induction. By way of example only and not by way of limitation, materials having yield stresses of about 400, 450, 475, 500, 515, 525, 530, 535, 540, 545, 550, 555, 560, 565, 570, 575, 580, 600, 625, 650 and/or about 700 MPa and/or any value or range of values therebetween in at least 0.1 MPa increments (e.g., 523.7 MPa, 515-585 MPa, etc.) can be used for the spring. Also by way of example only and not by way of limitation, materials having magnetic flux saturation of about 0.5T, 0.6T, 0.7T, 0.8T, 0.9T, 1.0T, 1.1T, 1.2T, 1.3T, 1.4T, 1.5T, 1.6T, 1.7T, 1.8T, 1.9T, 2.0T, 2.1T, 2.2T, 2.3T, 2.4T and/or 2.5T and/or any value or range of values therebetween in at least 0.01T increments can be used for the spring. An exemplary material is Hiperco® Alloy 27.

It is noted that in some designs, the static flux through the springs 656 and/or 657 is substantially constant (including constant) through the range of movements of the counterweight assembly 655 relative to the bobbin assembly 654. Without being bound by theory, it is believed that this is due to magnetic flux saturation, where by limiting the flux density, the magnetic force is correspondingly limited. This can prevent and/or otherwise reduce the risk of axial air gap collapse relative to a transducer utilizing air gaps to close the static magnetic flux, all other things being equal.

In an exemplary design, the springs are configured and dimensioned such that the reluctance across one spring is effectively the same as the reluctance across the other spring through the range of movements of the counterweight assembly relative to the bobbin assembly. In an exemplary design utilizing a spring and a radial air gap (e.g., according to the design of FIG. 10), the spring and the radial air gap are configured and dimensioned such that the reluctance across the spring is effectively the same as the reluctance across the air gap through the range of movements of the counterweight assembly relative to the bobbin assembly. Accordingly, to the extent that reluctance varies in some designs, in some designs, as reluctance varies in one spring, the reluctance will vary in the same way at the other spring. Also accordingly, to the extent that reluctance varies in some designs, in some designs, as reluctance varies in one spring, the reluctance will vary in the same way at the radial air gap, and vice versa.

Figure 13:
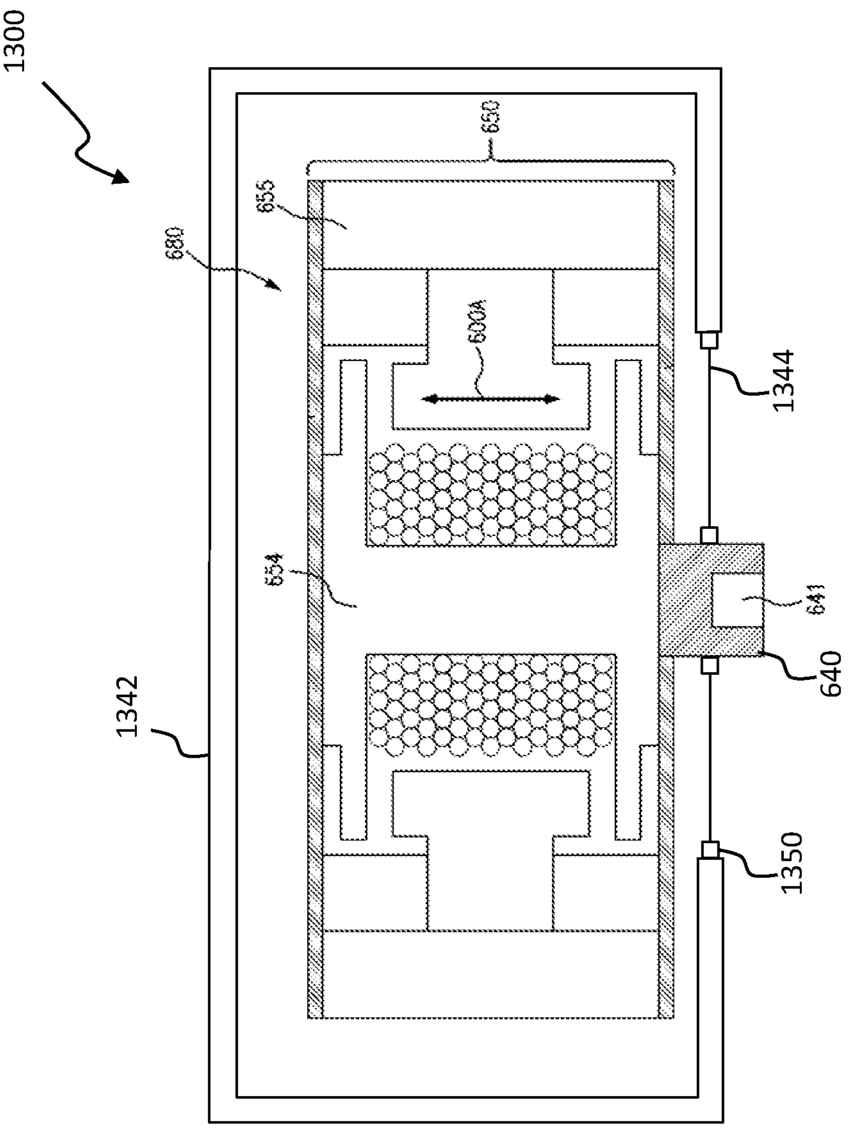
FIG. 13 is a cross-sectional view an alternate vibrator actuator-coupling assembly.

FIG. 13 depicts an exemplary design of a bone conduction device 1300 that utilizes the vibratory actuator-coupling assembly 680 which is suspended inside a housing 1342 via spring 1344 which is attached to the housing and the coupling assembly 640 via spring supports 1350. In an exemplary design, the opening in the housing 1342 in which the spring 1344 is located is a circular opening (some designs are not circular, more on this below) that is concentric with the coupling assembly 640. In an exemplary design, spring supports 1350 are annular rings with a slot therein which receives the interior and exterior edges of the spring 1344 (in this design, the spring 1344 is also a circular spring with a hole in the center thereof that is concentric with the coupling assembly 640). During manufacturing, the annular rings are crimped about the spring so as to grip the spring in the slot, thus holding the spring inside the slot. The annular rings are then secured to the housing 1342 and the coupling assembly 640, respectively, such as by welding and/or by the utilization of an adhesive such as an epoxy, or such as by snap coupling or such as by an interference fit or the like. In this regard, the design of FIG. 13 enables the housing to be directly flexibly supported by the coupling assembly 640. This enables the vibratory electromagnetic actuator 650 to a vibrate within the housing 1342. More specifically, the counterweight assembly 655 can move it inside the housing 1342 relative to the coupling assembly 640. The spring 1344 at least partially isolates the housing from the vibration.

By coupling assembly, it is meant the connection apparatus 541, the sleeve 544, and any other components that extend from the connection apparatus to the static component(s) of the transducer (e.g., to the bobbin). This is distinct from, for example, the connection apparatus 541 itself, which is a subcomponent of the overall coupling assembly.

It is noted that in at least some exemplary designs of the design of FIG. 13, spring 1344 is not a circular spring, but instead is a non-square rectangular spring, while in other designs, the spring is an oval shape while in other designs it is a truncated oval-shaped. Any arrangement of spring 1344 that can enable the teachings detailed herein can be utilized in at least some exemplary designs. Also, in an exemplary design, the opening through which the coupling assembly 640 extends may not be circular. In an alternate design, the opening can be square or rectangular or oval shaped, etc. Moreover, while the design depicted in FIG. 13 is depicted as their being a single spring 1344, which spring encompasses the coupling assembly 640, in an alternate design, there are a plurality of springs 1344. In an exemplary design, there are 2, 3, 4, 5, 6, 7, 8 or more springs 1344 that are arrayed about coupling assembly 640, in some designs, in a symmetrical manner. Moreover, while the design of FIG. 13 depicts spring 1344 extending from the inner surface of the opening of the housing, in an exemplary design, the spring 1344 can extend from the outside of the housing, while in other designs the spring can extend from the inside the housing. It is also noted that the spring supports can have shapes that generally correspond to the housing at the opening thereof and the outside of the spring, and the inside of the spring and the coupling assembly 640. In some designs, the spring supports need not be annular. Also, in some designs, there are no spring supports per se. Instead, for example, the housing 1342 can be molded about the outside of the spring in such a manner that the housing retains the spring. This can also be the case, by way of example only and not by way of limitation, with respect to the coupling assembly, at least with respect to the portion thereof that attaches to the spring 1344. Also, in an exemplary design, the spring can be surface mounted on to the housing via screws of the like or welding or adhesive. Any arrangement of coupling the spring to the housing and four to the coupling assembly can be utilized in at least some exemplary designs.

Figure 14:
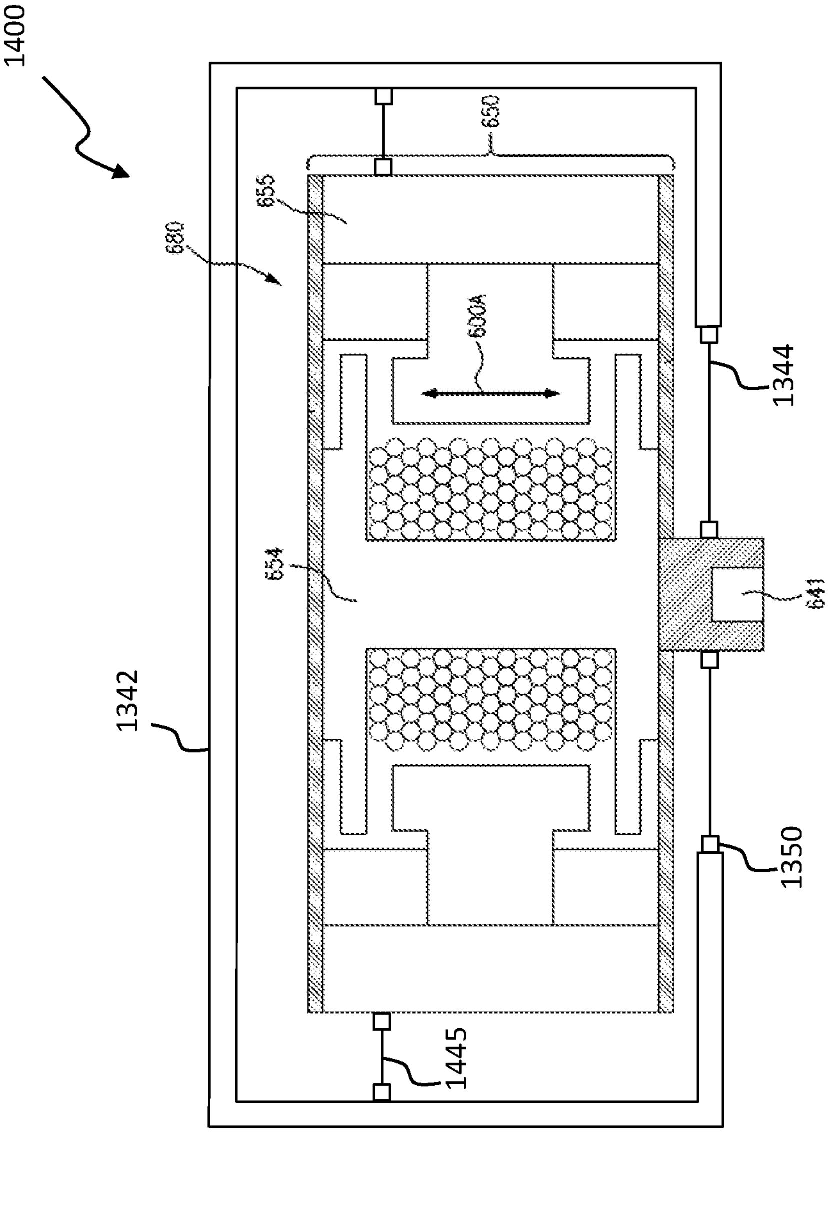
FIG. 14 is a cross-sectional view of an exemplary embodiment.

FIG. 14 presents an alternative embodiment of a bone conduction device 1400, where there is an additional spring 1445 which is coupled to the housing via a spring coupling in which is also coupled to the counterweight assembly 655 via another spring coupling. In an exemplary embodiment, spring 1445 has a structure that is analogous to spring 1344. In this embodiment, the spring can be a circular spring that has an opening through which the counterweight assembly 655 extends, and has an outer circular circumference that is attached to the circular interior of the housing. That said, in an alternate embodiment, the spring can be of a different shape, such as a rectangular shape or an oval shape or a truncated oval-shaped, with respect to the inside and/or the outside of the spring. In an exemplary embodiment, the spring 1445 has an inner shape that at least generally corresponds to the outside shape of the counterweight assembly 655, an outer shape that at least generally corresponds to the inside shape of the housing 1342. This is also the case with respect to the spring supports (if utilized—again, spring 1445 can be analogous to spring 1344, which, as detailed above, may or may not utilize spring supports.

In the embodiment seen in FIG. 14, it can be seen that not only is the housing 1342 directly connected to the coupling assembly via a spring, the housing 1342 is also directly connected to the counterweight assembly 655 via a spring.

In view of the above, in an exemplary embodiment, there is a bone conduction device, comprising an electromagnetic transducer, such as transducer 650, and a housing, such as housing 1342. In an exemplary embodiment, the housing is directly flexibly connected to the electromagnetic transducer at a dynamic component of the bone conduction device (e.g., via spring 1445, or more accurately, the spring assembly of spring 1445 and the spring support(s), and directly flexibly connected to a static component of the bone conduction device (e.g., via spring 1344/the spring assembly thereof. In this regard, the coupling assembly 640 is a static component, at least relative to the overall dynamics of the bone conduction device 1300. Again, there will be a modicum of movement of the coupling assembly as well as the bobbin 654 in at least some exemplary embodiments, but this amount of movement will be de minimus relative to the movements of the seismic mass/counterweight assembly 655.

It is noted that the word "fixed" and "static" as used herein is a relative term with respect to the fact that all things being equal, every part of the bone conduction device moves during actuation. In this regard, the coupling assembly will move, if only due to the fact that the material thereof will expand and contract. Indeed, the bone of the recipient will move up and down. Further, the coupling will move due to minor deformation of the teeth of the component that snap couples into the abutment. These teeth are flexible components, and thus when the seismic mass results in an upward and a downward force on the coupling, the coupling will flex, and because the coupling is connected to the bobbin 654, the bobbin 654 will move. Also, there can be a modicum of rocking of the entire system. Still, in relative terms, it is the counterweight 655 that moves, and the bobbin 654 that is fixed relative to the body. One way of considering the system is by analogizing the movements of the seismic mass relative to the bobbin 654 to the movement of a tidal body of water relative to land owing to the phases of the moon. The moon will move land and water, it is just that the water moves much less relative to the land, and thus the movement of water is measured relative to the land, which is considered fixed in the relative system, what which also moves.

Figure 15:
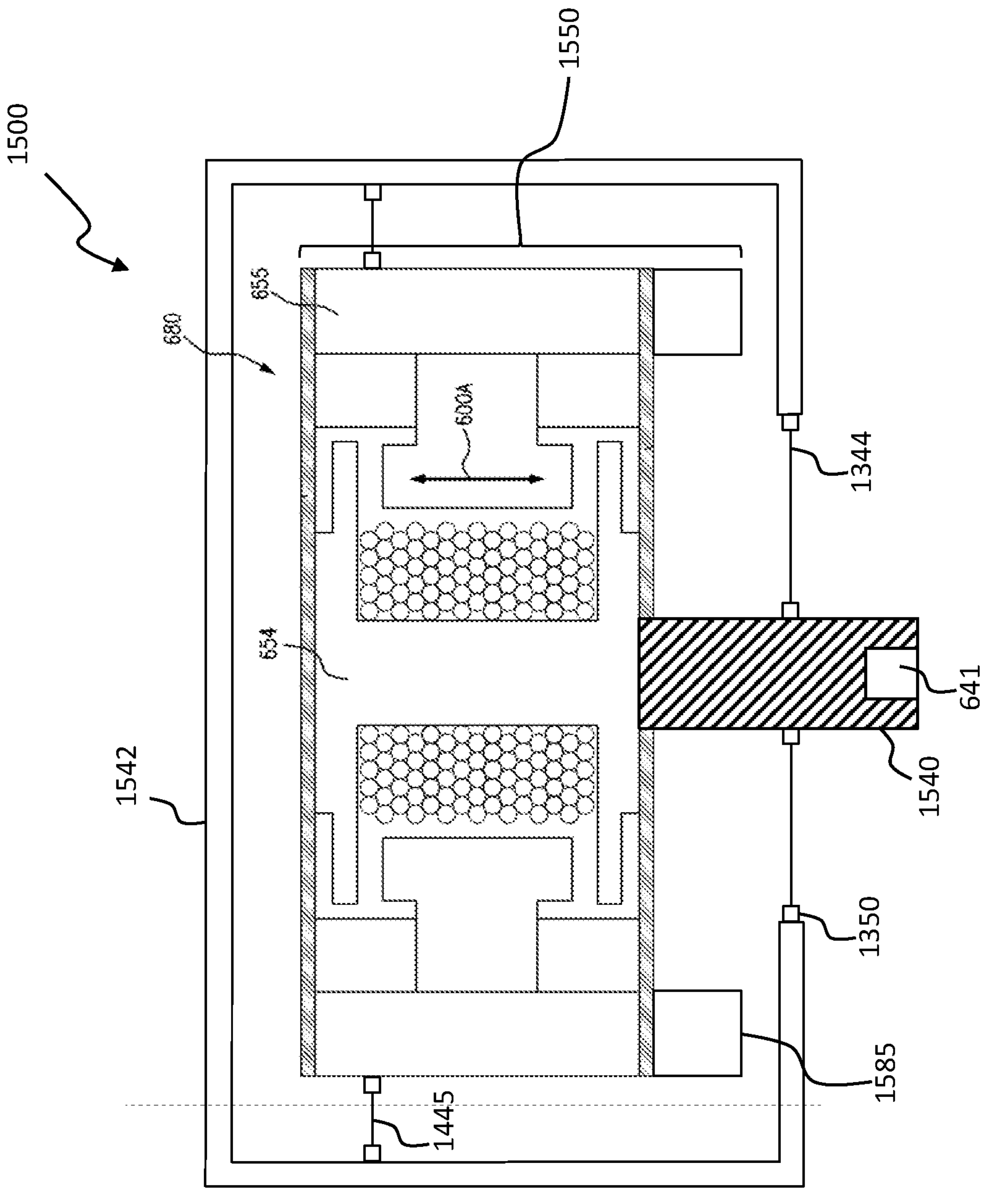
FIG. 15 is a cross-sectional view of another exemplary embodiment.
Figure 16:
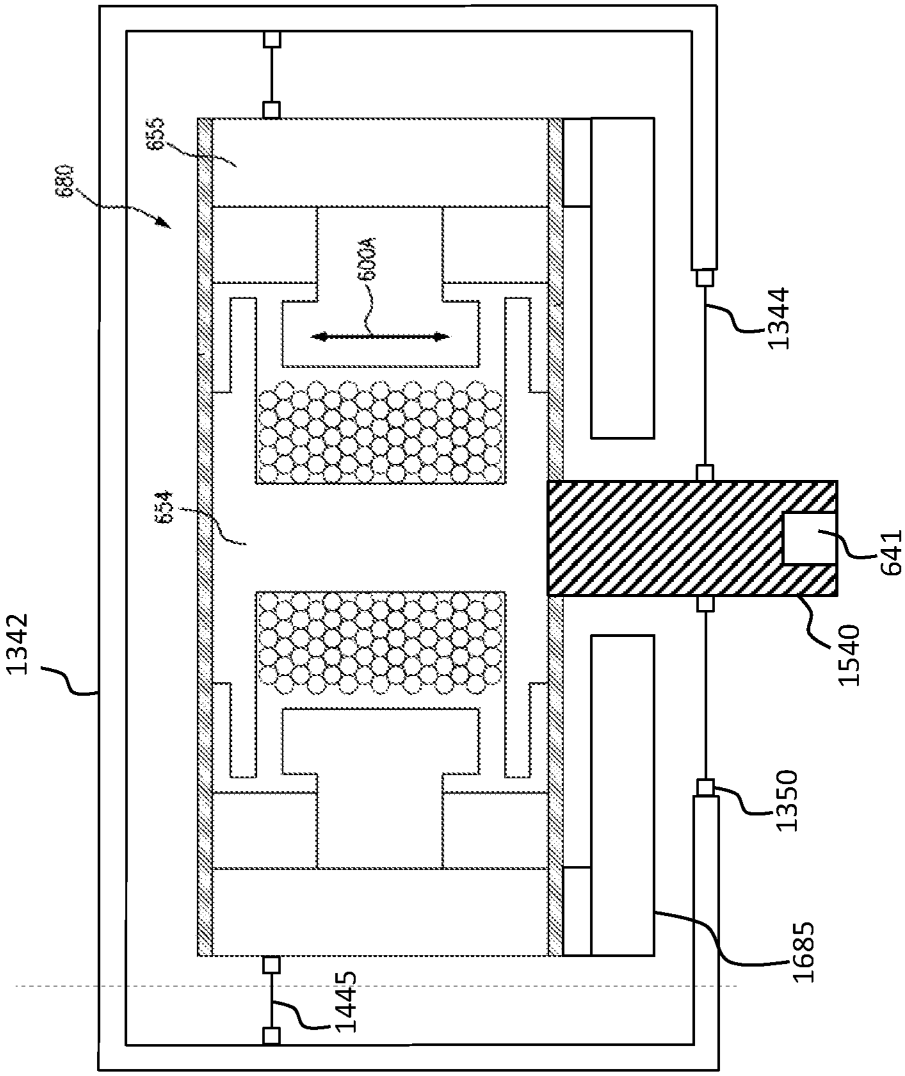
FIG. 16 is a cross-sectional view of another exemplary embodiment.

FIG. 15 presents an alternate embodiment of a bone conduction device 1500 that has a modified housing 1542 relative to housing 1342 above. In this regard, the housing extends in a direction that is further in the longitudinal axis than that which is the case of FIG. 13. In this exemplary embodiment, additional counterweight mass 1585 provided below spring 656 as can be seen. In this regard, in this exemplary embodiment, the counterweight is heavier than that which is the case for the embodiment of FIG. 13 owing to this additional component. Such can have utilitarian value with respect to evoking a bone conduction hearing percept in that the larger the mass of the seismic mass/counterweight assembly, the superior the performance of the bone conduction device vis-à-vis evoking a hearing percept. FIG. 16 provides an alternate embodiment of a bone conduction device, which is substantially identical to the embodiment of FIG. 15, except that the additional counterweight mass 1685 is provided. As can be seen, this additional counterweight mass provides even additional mass relative to the embodiment of FIG. 15.

Figure 17:
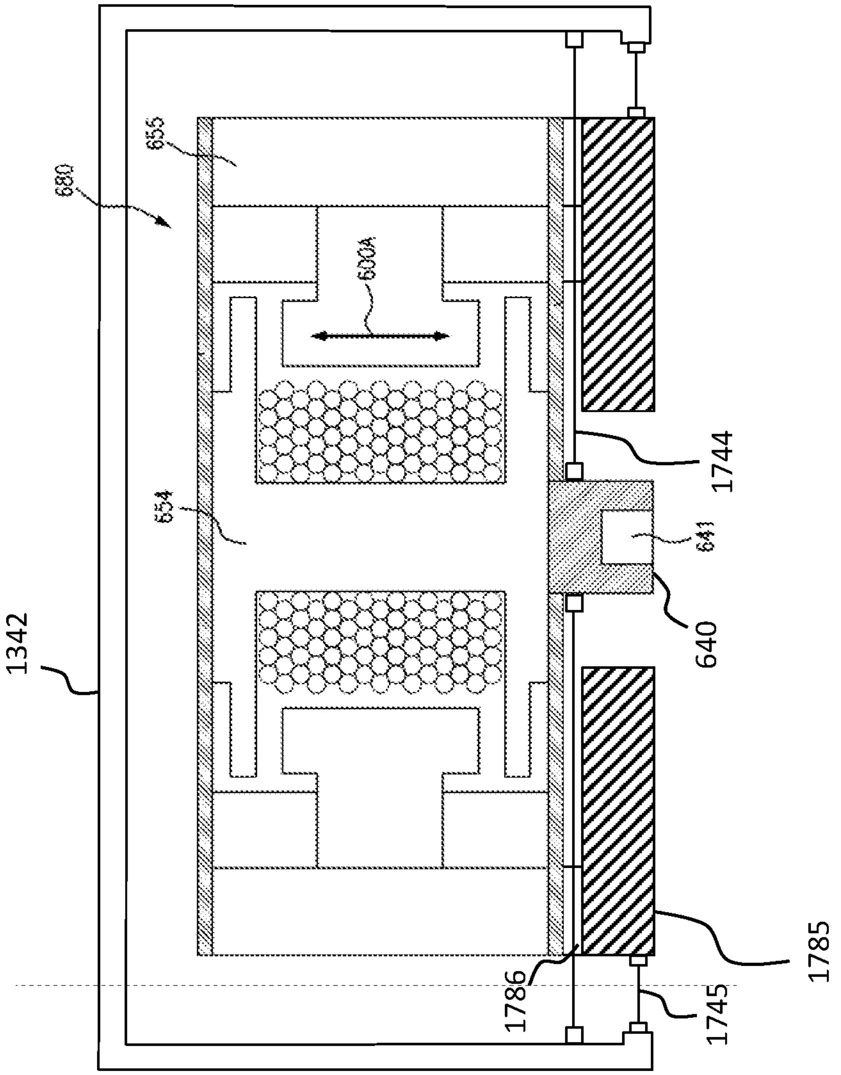
FIG. 17 is a cross-sectional view of another exemplary embodiment.
Figure 18:
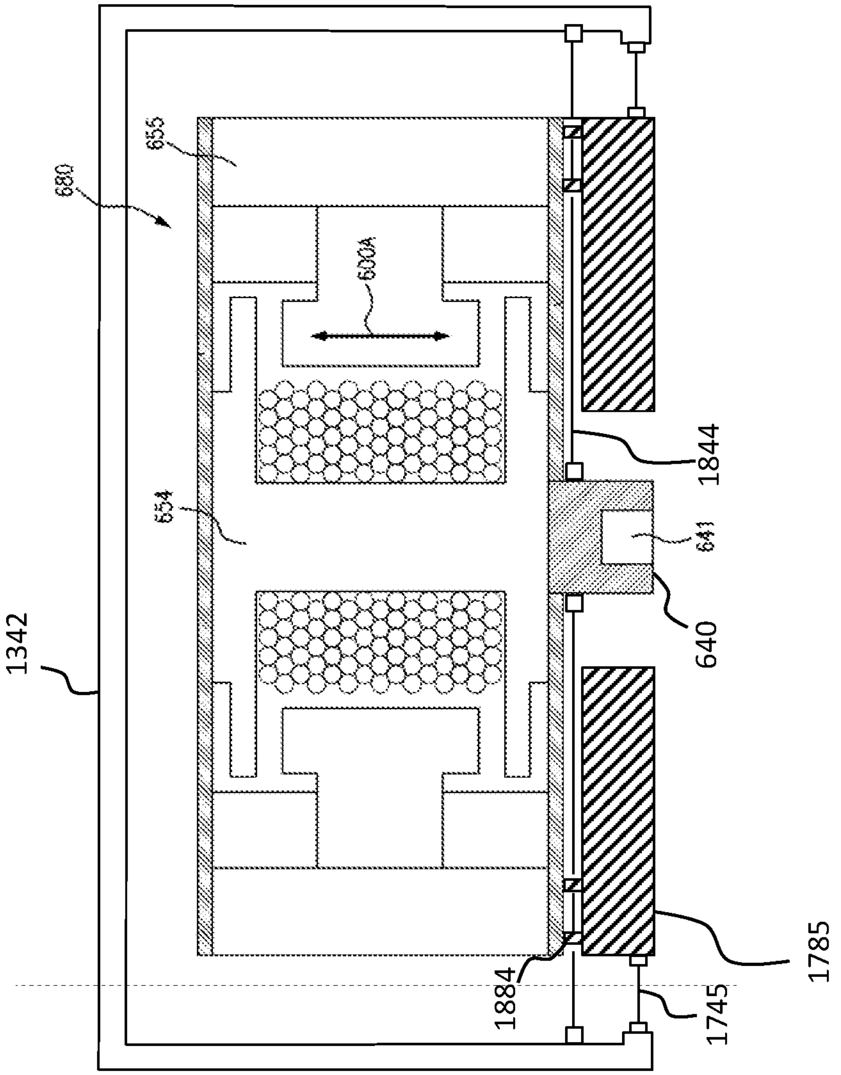
FIG. 18 is a cross-sectional view of another exemplary embodiment.
Figure 19:
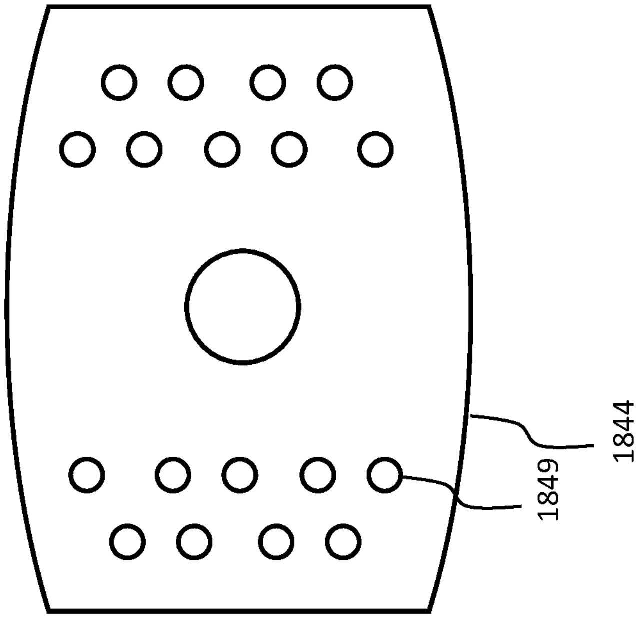
FIG. 19 is a top view of an exemplary spring according to an exemplary embodiment.

It is noted that the embodiment of FIG. 15 and the embodiment of FIG. 16 depict an elongated coupling assembly 1540 to accommodate the elongated housing 1542. It is noted that in some alternate embodiments, this elongated coupling assembly is utilized with the embodiments above. Indeed, in at least some exemplary embodiments, the depiction of the coupling assembly 240 above is not necessarily to scale in that in at least some exemplary embodiments, the coupling assembly 240 is longer as a matter of course. That said, FIG. 17 presents an exemplary embodiment where the same size housing 1342 and the same size coupling assembly 640 as that of FIG. 14 is utilized even though there is the additional mass 1785 of the dynamic component. In this regard, the additional seismic mass apparatus 1785 the hollow portion 1786 through which spring 1744 extends, as can be seen. In this regard, the seismic mass apparatus 1785 is depicted with cross-sectional hatching (technically, if this was an engineering drawing, everything in FIG. 17 as at least most of the other figures would be depicted with crosshatching). As can be seen, there is a location between spring 656 and the hatched portion of the apparatus 1785 that is not crosshatched. In an exemplary embodiment, passageway 1786 is a rectangular cross-sectional passageway that extends from the inboard portion of the seismic mass assembly to the outboard portion of the seismic mass assembly. In this embodiment, the rectangular leaf spring 1744 extends from the right side of the housing through a first passageway 1786, to the coupling assembly 640, which coupling assembly extends through a hole in the rectangular the spring 1744 and where coupling nuts are utilized to clamp about the spring, and then the leaf spring extends through a second passageway 1786 to the left side of the housing, as can be seen. In an exemplary embodiment, the mass apparatus 1785 envelops the spring 1744 at two locations. That said, in an alternate embodiment, spring 1744 can be a circular leaf spring or a leaf spring that takes up essentially the entire interior area respect to a cross-section of the housing 1342 normal to the longitudinal axis of the bone conduction device. FIG. 18 depicts such an embodiment, where the leaf spring 1844 is an oval shaped leaf spring that has holes therein, represented by the breaks in the line shown in the figure through which dowel pins 1884 extend to connect the mass 1785 below spring 656 to the mass above spring 656. FIG. 19 presents an exemplary leaf spring 1844 with holes 1849 therein through which the dowel pins 1884 can extend. The holes 1849 have sufficient clearance to enable the spring to flex without contacting the dowel pins.

In view of the above, in an exemplary embodiment, as noted above, the vibrator includes a seismic mass, and the second system is established by a spring extending from the housing directly to a static component of the bone conduction device, and, as seen in FIG. 17, the spring extends through the seismic mass and the seismic mass is spaced away from the spring.

Figure 20:
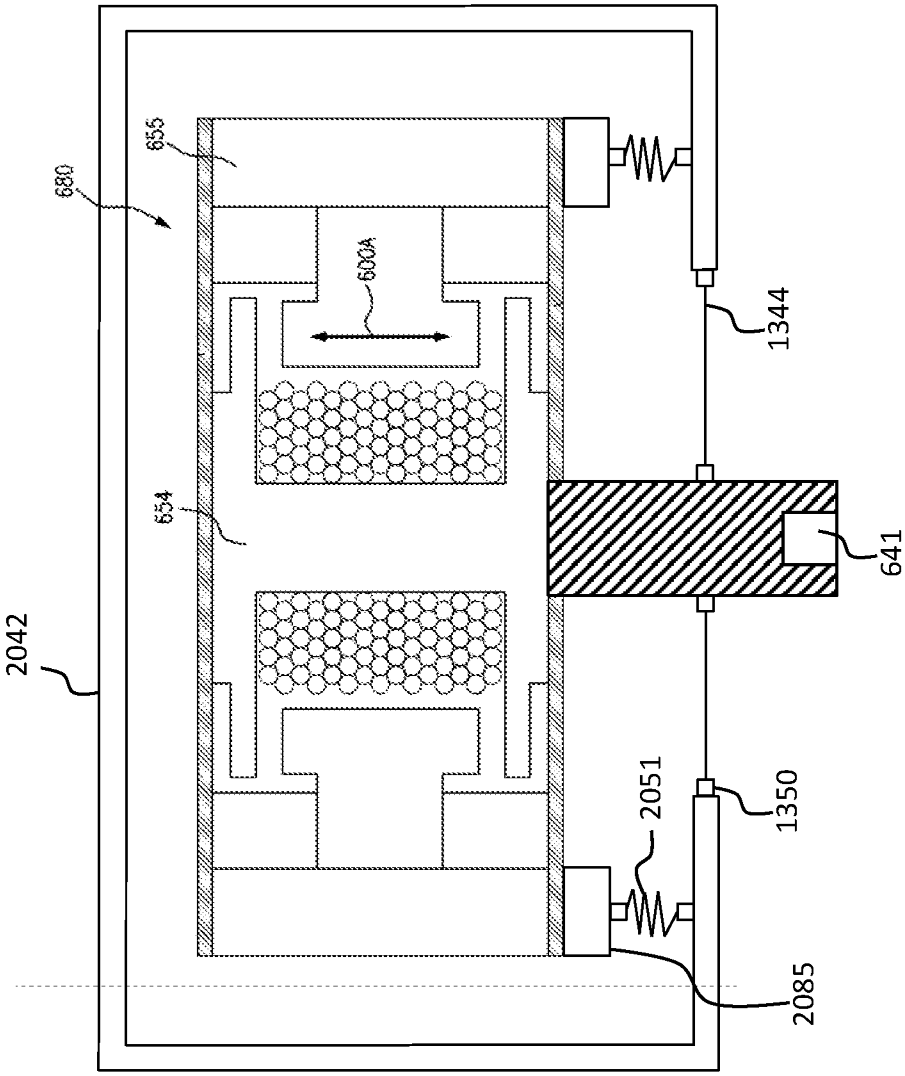
FIG. 20 is a cross-sectional view of another exemplary embodiment.
Figure 21:
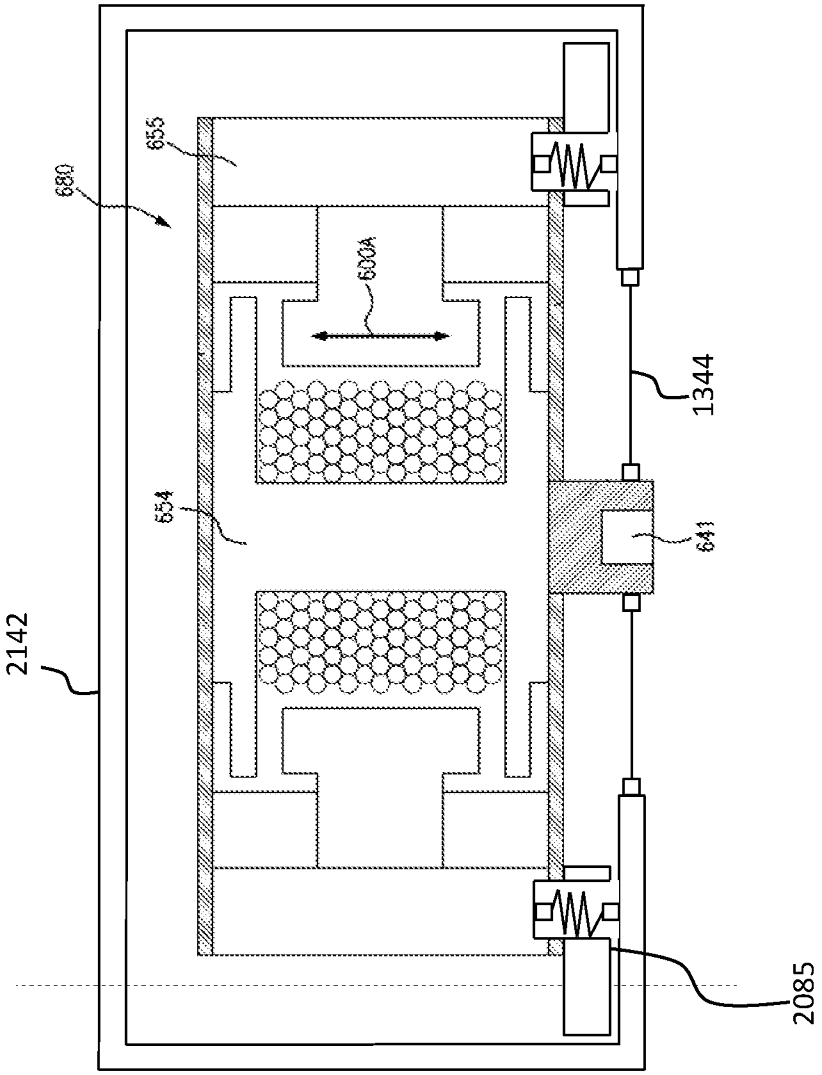
FIG. 21 is a cross-sectional view of another exemplary embodiment.

FIG. 20 presents an alternative embodiment that utilizes coiled springs 2051 to flexibly connect the counterweight assembly 655 to the housing 2042. Here, the additional mass 2085 is located beneath leaf spring 656, and the spring 2051 is connected thereto as can be seen. That said, in an alternate embodiment, spring 2051 is connected to the counterweight assembly 655 in a manner that avoids counterweight 2051. Indeed, in some embodiments, counterweight 2051 is not present. That said, in an alternate embodiment, counterweight 2051 and/or the mass/components above spring 656 as well as spring 656 can include hollow portions into which the spring 2051 extends, thus providing additional clearance for the system. FIG. 21 presents such an exemplary embodiment that utilizes a housing 2142 that is different than housing 2042, as can be seen, and also utilizes the coupling assembly 640 also as can be seen. Here, the mass 2185 includes a hollow portion, through which the spring can be seen extending. There is a hole in the spring 656 as well as a hole in the mass above spring 656 to accommodate the spring.

In view of the above, it can be seen that in an exemplary embodiment, the housing 1342 is directly flexibly connected to the seismic mass of the electromagnetic transducer, and at least indirectly flexibly connected to a static component of the electromagnetic transducer. Such an exemplary embodiment can exist by way of example only and not by way of limitation, in a scenario where there is no spring 1344, and the housing is connected to the seismic mass via spring 1445, and the seismic mass is connected by spring 657 and/or spring 656 to the static component, which can be the coupling assembly 240 (and/or can be the bobbin), while such an embodiment can also exist in the embodiment of FIG. 14, where the housing is at least indirectly connected to the coupling assembly 640 via springs 657 and 656.

In an exemplary embodiment, the housing is indirectly connected to the static component of the electromagnetic transducer. This is seen with respect to the embodiment of FIG. 14, where the housing is also directly connected to the static component of the electromagnetic transducer via spring 1344.

In the embodiment of FIG. 14, the housing is flexibly connected to the electromagnetic transducer at a dynamic component of the bone conduction device via a first spring and a static component of the bone conduction device by a second spring separate from the first spring. In this embodiment, the static component is the coupling assembly 640, while in some embodiments, it can be to the bobbin of the electromagnetic transducer, as will be described in greater detail below. In view of the embodiment of FIG. 14, it can be seen that the seismic mass of the electromagnetic transducer is directly flexibly connected to the static component of the bone conduction device.

As can be seen from the above, in an exemplary embodiment, there can be a bone conduction device, comprising a vibrator and a housing encompassing the vibrator, wherein the housing is flexibly supported by at least a first suspension system and a second suspension system. In some embodiments, the first system has a resonant frequency that is different than the second system. In an exemplary embodiment, the first resonant frequency can be any value within about X Hz of 200, 250, 300, 350, 400, 450, 500, 550, 600, 650, 700, 750, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2100, 2200, 2300, 2400, 2500, 2600, 2700, 2800, 2900, 3000, 3250, 3500, 3750, 4000, 4250, 4500, 4750, 5000, 6000, 7000, 8000, 9000, 10,000, 11,000, 12,000, 13,000, 14,000, 15,000, 16,000, 17,000, 18,000 Hz or more, where X can be 1, 2, 3, 4, 5, 6, 7, 8, 9, 10, 11, 12, 13, 14, 15, 16, 17, 18, 19, 20, 25, 30, 35, 40, 45, 50, 75, 100, 125, 150, 175, 200, 300, 400, 500, 750, or 1000 Hz. In an exemplary embodiment, the first resonant frequency can be any value within about Y Hz of any value in 1 Hz increment between (and inclusive) of 21 Hz to 18,000 Hz, where Y can be 1, 2, 3, 4, 5, 6, 7, 8, 9, 10, 11, 12, 13, 14, 15, 16, 17, 18, 19, or 20 Hz. In an exemplary embodiment, the second resonant frequency can be 1, 2, 3, 4, 5, 6, 7, 8, 9, 10, 11, 12, 13, 14, 15, 16, 17, 18, 19, 20, 25, 30, 35, 40, 45, 50, 75, 100, 125, 150, 175, 200, 250, 300, 350, 400, 450, 500, 550, 600, 650, 700, 750, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2100, 2200, 2300, 2400, 2500, 2600, 2700, 2800, 2900, 3000, 3250, 3500, 3750, 4000, 4250, 4500, 4750, 5000, 6000, 7000, 8000, 9000, 10,000, 11,000, 12,000, 13,000, 14,000, 15,000, 16,000, 17,000, or 18,000 Hz away from the first resonant frequency.

In an exemplary embodiment, as can be seen from the above, the vibrator (e.g., any of the vibratory electromagnetic actuators detailed above, as well as some others that will be detailed below), includes a seismic mass (e.g., any of seismic masses detailed above). In this exemplary embodiment, the first system is established by a spring extending from the housing directly to the seismic mass (which can include a spring support), and the second system is established by a spring extending from the housing directly to a static component of the bone conduction device. In an exemplary embodiment, the vibrator is an electromagnetic transducer including a static component and a dynamic component and the bone conduction device includes a connection apparatus in fixed relationship to the bobbin about which the wire is wound configured to transfer vibrational energy directly or indirectly from the electromagnetic transducer. In this regard, in an exemplary embodiment, the connection apparatus can be element 641 of the coupling assembly detailed above. In an exemplary embodiment, the dynamic component extends to a location adjacent the connection apparatus. This is seen, for example, in FIG. 17, but not in FIG. 16 or in FIG. 21, as the connection apparatus is not adjacent to the dynamic component(s). In this regard, in an exemplary embodiment, the bone conduction device is a removable component of a percutaneous bone conduction device, and the connection apparatus is a component configured to snap couple to a percutaneous abutment. Consistent with at least some exemplary embodiments, the housings according to the teachings detailed herein are ergonomically configured so as to enable a recipient to grip the housing by hand and manipulate the removal component of the bone conduction device by grasping the housing and otherwise supporting the removable component of the bone conduction device via the housing. The removable component of the bone conduction devices configured to snap couple onto and off of a percutaneous abutment.

It is noted that the connection apparatus is but a subcomponent of the coupling assembly 240 or 640 etc. That is, the coupling apparatus is the component that directly interfaces with the abutment. In an exemplary embodiment, this is a plastic component that is frustrated about a metallic component that extends to the bobbin.

Figure 22:
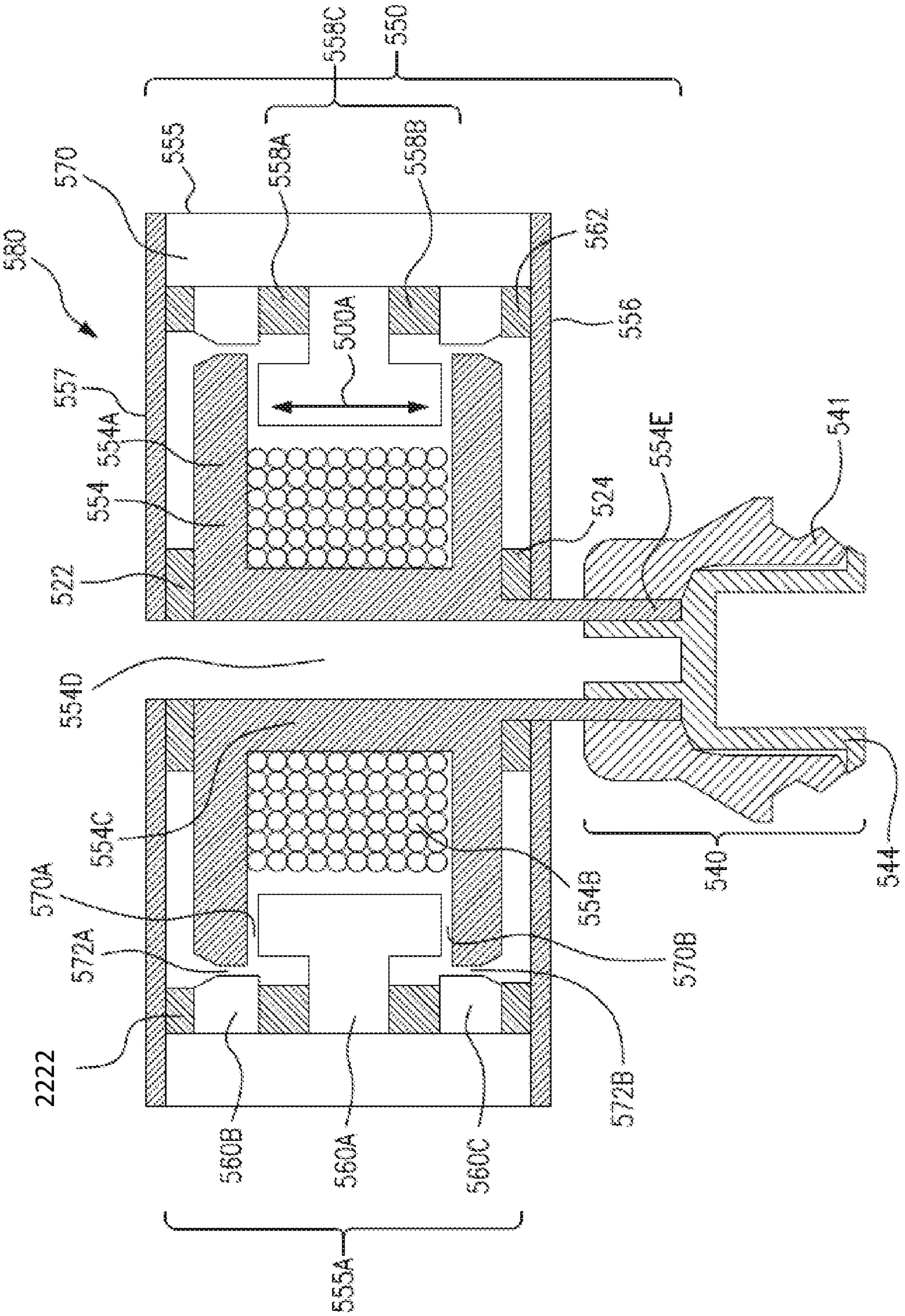
FIG. 22 is a cross-sectional view of another exemplary embodiment.

FIG. 22 presents a cross-sectional view that shows an exemplary relationship between the connection apparatus

541 and the rest of the vibrating actuator-coupling assembly. More particularly, the bobbin 554A includes space therein, in the form of bore 554D that passes all the way therethrough, including through bobbin extension 554E. This space constitutes a passage through the bobbin 554A. Also, spacers 522 and 524 and springs 556 and 557 have a space in the form of a bore that passes all the way therethrough. These spaces constitute a passage through the spacers and through the springs.

The space within the bobbin 554A constitutes, at least in part, in the embodiment depicted in FIG. 22, a hollow section within an integral bobbin component (bobbin 554A). As can be seen, it extends completely through the bobbin 554A. The coils 554B wound about the bobbin 554A, which are configured to generate dynamic magnetic flux, extend about the space within the bobbin.

Still with reference to FIG. 22, it can be seen that a connection apparatus in the form of coupling assembly 540, is in fixed relationship to the bobbin assembly 554 in general, and the bobbin 554A in particular. In the embodiment depicted in FIG. 22, the coupling assembly is configured to transfer vibrational energy from the vibrating electromagnetic actuator 550. As noted above, while embodiments detailed herein are directed towards an actuator, other embodiments are directed towards a transducer that receives vibrational energy, and transducers that vibrational energy into electrical output (e.g. the opposite of the actuator). Accordingly, exemplary embodiments include a connection apparatus in fixed relationship to the bobbin configured to transfer vibrational energy to and/or from an electromagnetic transducer. It is noted that in an exemplary embodiment, such a transducer can correspond exactly to or otherwise be similar to the embodiment of FIG. 22.

While the embodiment of FIG. 22 depicts the coupling assembly 540 is directly fixed to bobbin assembly 554, in an alternate embodiment, an intervening component between the two components can be present such that the coupling assembly 540 is indirectly fixed to the bobbin assembly 554. Accordingly, while the coupling assembly 540 transfers vibrational energy directly to or from the electromagnetic transducer 550, in other embodiments, the coupling assembly 540 may indirectly transfer vibrational energy to or from the electromagnetic transducer 550. Along these lines, while the bobbin extension 554E is depicted as being a part of a monolithic bobbin 554A, as noted above, bobbin extension 554E, or at least the portion of that component to which the coupling assembly 540 is attached, can be a separate component from the electromagnetic transducer 550. Any device, system, or method that can establish a fixed relationship between the bobbin assembly and/or a component of the bobbin assembly and the coupling assembly and/or a component of the coupling assembly can be utilized in at least some embodiments.

Figure 23:
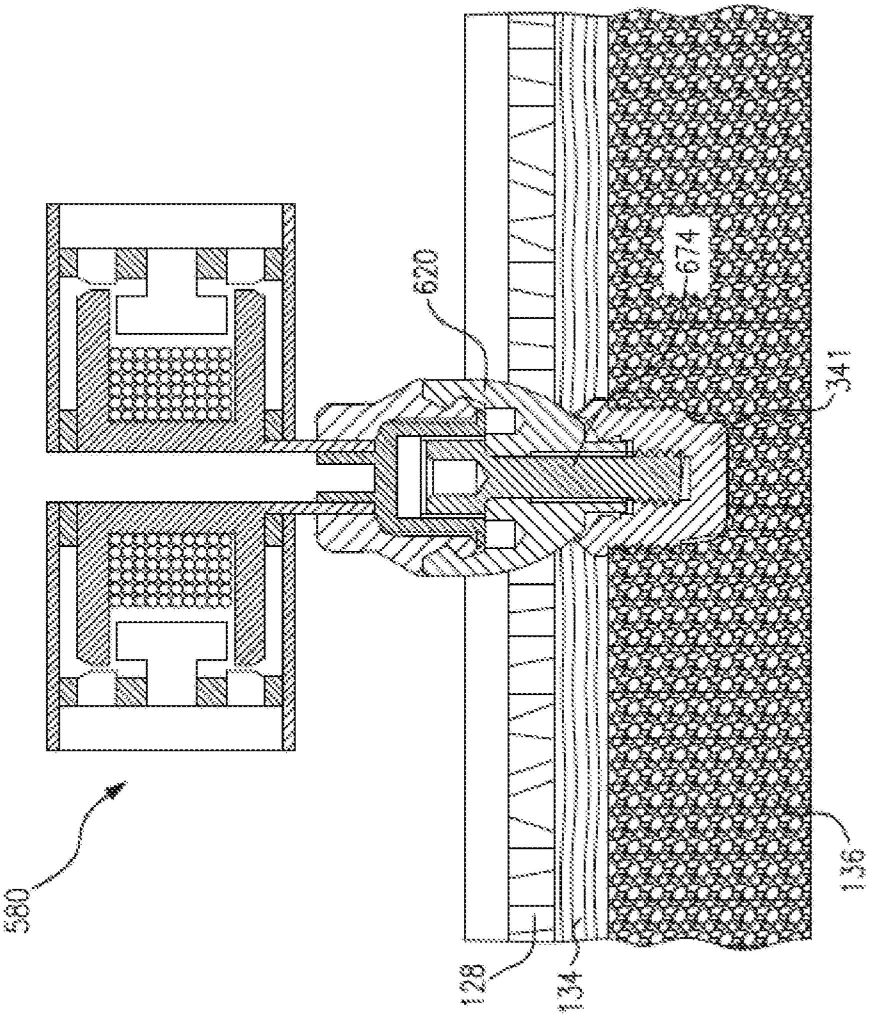
FIG. 23 is a cross-sectional view of another exemplary embodiment.

FIG. 23 depicts use of the embodiment of FIG. 22 to provide vibrational energy into bone 136 of a recipient via vibrating electromagnetic actuator-coupling assembly 580. More particularly, FIG. 23 shows the coupling assembly 540 snap-coupled to abutment 620, which is secured to bone fixture 341 via abutment screw 674. In operation, vibrational energy generated by the vibrating electromagnetic transducer 550 travels down bobbin extension 554E into the coupling assembly 540, and then from coupling assembly 540 to the abutment 620 and then into bone fixture 341 and then into bone 136. In an exemplary embodiment, the vibrational communication effectively evokes a hearing percept. As can be seen, the passageway through the bobbin 554A extends to coupling assembly 540, and thus extends to a connection apparatus configured to transfer vibrational energy from the electromagnetic transducer 550. Accordingly, the electromagnetic transducer 550 is an electromagnetic actuator. However, as noted above, in alternate embodiments, electromagnetic transducer 550 receives vibrations from a recipient or the like. Accordingly, in such an embodiment, the passageway through the bobbin 564A extends to a connection apparatus configured to transfer vibrational energy to the electromagnetic transducer 550.

In an exemplary embodiment, the abutment is a generally concave component having a hollow portion at a top thereof into which the coupling assembly 540 fits (teeth of the coupling assembly 540 fit into the hollow portion). The hollow portion has an overhanging portion at the end of the abutment around which teeth of the coupling extend to snap-fit to the abutment. While an exemplary embodiment of the abutment entails a challis shaped outer profile, other embodiments can be substantially cylindrical or hour-glass shaped, etc.

It is noted that while the embodiment of the coupling assembly 540 detailed herein is directed to a snap-fit arrangement, in an alternate embodiment, a magnetic coupling can be used. Alternatively, a screw fitting can be used. In some embodiments, the coupling assembly 540 corresponds to a female component and the abutment corresponds to a male component, in some alternate embodiments, this is reversed. (In some exemplary embodiments utilizing the teachings herein, there is no coupling, but instead a soft band or an arch arrangement or a transcutaneous magnetic field is used. It is to be understood that the teachings herein can be used with the embodiment of FIG. 2, 3 or 4.) Any device, system or method that can enable coupling of the removable component to an implanted prosthesis can be utilized in at least some embodiments providing that the teachings detailed herein and/or variations thereof can be practiced. As noted above, any vibrating electromagnetic transducer-coupling assembly 580 includes a protective sleeve 544 that is part of the coupling assembly 540. In this regard, coupling 541 is a male portion of a snap coupling that fits into the female portion of abutment 620, as can be seen in FIG. 23.

The outer circumference of coupling 541 has spaces at the bottom portion thereof (i.e. the side that faces the abutment 620) in a manner analogous to the spaces between human teeth, albeit the width of the spaces are larger in proportion to the width of the teeth as compared to that of a human. During attachment of the vibrating electromagnetic transducer-coupling assembly 580 to the abutment 620, the potential exists for misalignment between the abutment 620 and the coupling 541 such that the outer wall that establishes the female portion of the abutment 620 can enter the space between the teeth of the coupling 541 (analogous to the top of a paper cup (albeit a thin paper cup) passing into the space between two human teeth. In some embodiments, this could have a deleterious result (e.g., teeth might be broken off if the components are moved in a lateral direction during this misalignment (which is not an entirely implausible scenario, as percutaneous bone conduction devices are typically attached to a recipient behind the ear, and thus the recipient cannot see the attachment), etc.).

Sleeve 544 is a solid sleeve with a portion that juts out in the lateral direction such that it is positioned between the very bottom portion of coupling 541 and the abutment 620. The portion that juts out, because it is continuous about the radial axis (e.g., no spaces, unlike the teeth) prevents the wall forming the female portion of the abutment 620 from entering between the teeth of the coupling 541. (This is analogous to, for example, placing a soft plastic piece generally shaped in the form of a "U" against the tips of a set of human bottom or top teeth. Nothing moving in the longitudinal direction of the teeth can get into the space between the teeth because it will first hit the "U" shaped plastic.) In this regard, the vibrating electromagnetic transducer-coupling assembly 580 includes a connection apparatus that in turn includes a protective sleeve 544 configured to limit a number of interface regimes of the connection apparatus with the abutment 620. In an exemplary embodiment, this is the case at least with respect to those that would otherwise exist in the absence of the protective sleeve 544 (e.g. in the absence of the sleeve, the wall of the abutment could fit into the space between the teeth of coupling 541—with the sleeve, the wall of the abutment cannot fit into the space between the teeth of coupling 541).

In view of FIG. 22, it can be seen that the connection apparatus 541 is a monolithic component. (It is noted that all connection apparatuses detailed herein with respect to the percutaneous bone conduction device can correspond to connection apparatus 541 of FIG. 22). That is, connection apparatus 641 can correspond to connection apparatus 541.

Figure 24:
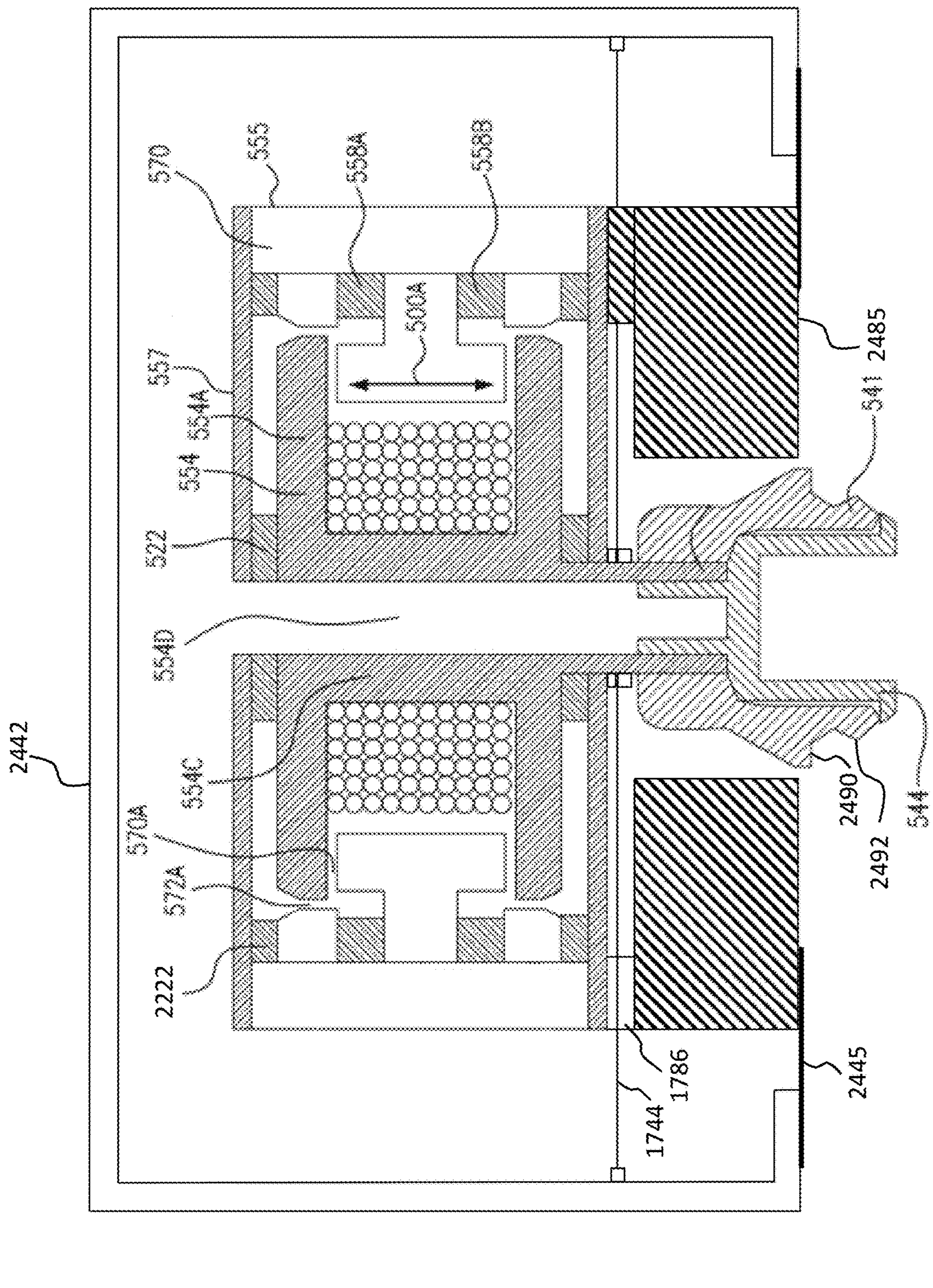
FIG. 24 is a cross-sectional view of another exemplary embodiment.

FIG. 24 depicts an exemplary embodiment of a removable component of a bone conduction device that includes housing 2442 in which the vibrating electromagnetic actuator is housed. As can be seen, spring 1744, which is a lease spring in this embodiment, extends from one side of the housing to the other side of the housing, through opening 1786 in the lower portion of the mass assembly 2485 (FIG. 24 depicts a passage on one side only—this is because the cross-sectional view of FIG. 24 is not a view that lies perfectly on a plane, but instead is taken so as to avoid the passage on the right side—if this were a cross-sectional view taken on the plane/the same plane as that on the left side, the passage on the right side would also be seen). Here, lock nuts are shown clamping the spring 1744 so as to fix the position thereof with respect to the coupling assembly and bobbin. While this embodiment depicts the monolithic extension from the bobbin, in an alternate embodiment, the extension is a separate component from the bobbin, which extension is screwed or otherwise fitted to the bobbin.

Springs 2445 can be seen extending from the housing 2442 to the lower portion of the mass assembly 2485. In this embodiment, the springs are fitted on the outside of the housing/secured to the outside of the housing, as well as the bottom portion of the mass assembly 2485. In this exemplary embodiment, springs 2445 can be screwed or bolted to the housing and to the mass assembly, or can be glued or welded.

Figure 29:
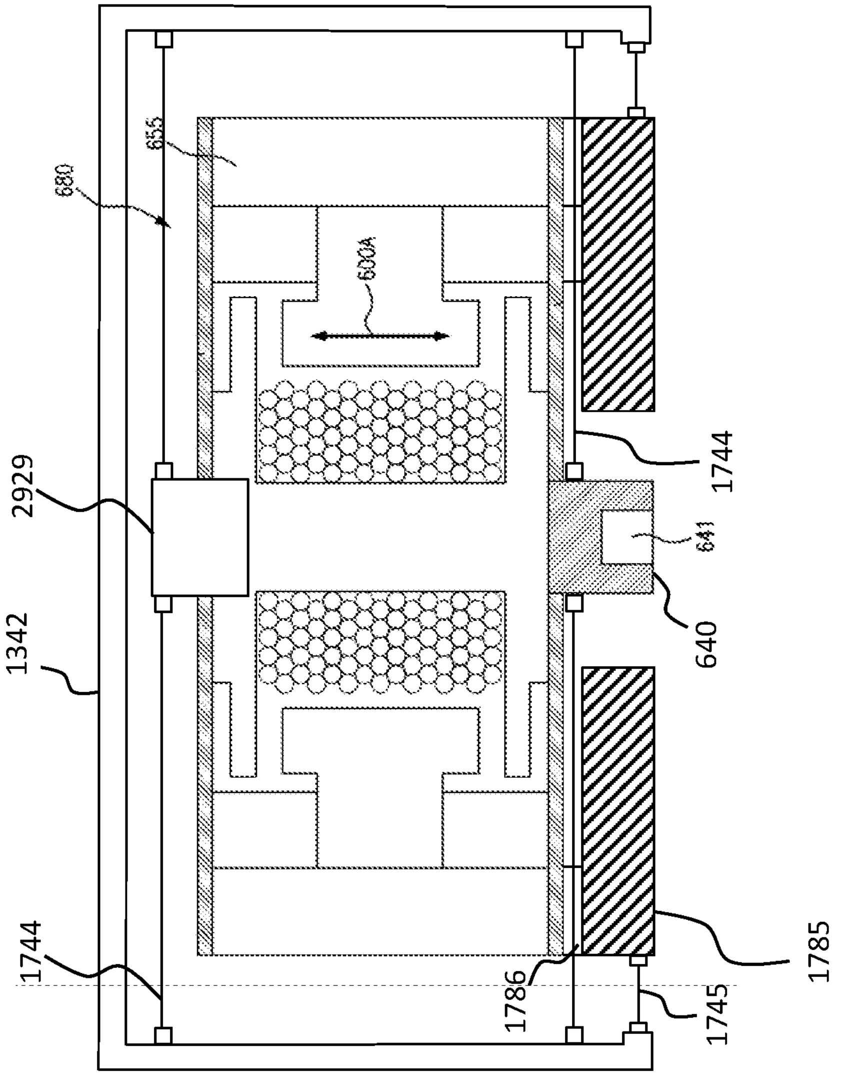

It is noted that while the embodiment of FIG. 24 depicts the spring 1744 being located at the bottom/below the coil, in an exemplary embodiment, the spring can be located above the coil, and in some embodiments, located both below and above (there can be two springs 1744). FIG. 29 depicts an exemplary embodiment where spring 1744 is connected to the rear of the bobbin via an insert 2929 that is threaded into the bobbin body through a hole in the top spring connecting the bobbin to the seismic mass.

As can be seen, the mass assembly 2485, and thus the dynamic component of the bone conduction device, extends to a location almost flush with the top surface 2490 of the snap coupling component of the connection apparatus 541. In an exemplary embodiment, the relative altitude of the lowermost portion of the dynamic component and/or the seismic mass relative to the coupling assembly is less than 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.5, 8, 8.5, 9, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29, or 30 mm (above or below, depending on the embodiment—while the embodiment of FIG. 24 depicts the dynamic component as being above the surface 2490, in some other embodiments, the lowest portion of the dynamic component is below surface 2490, all relative to the longitudinal axis of the bone conduction device/actuator) from the top surface 2490 of the snap coupling of the connector apparatus 541. By "relative altitude," it is meant the length with respect to vertical distance parallel to the longitudinal axis, without any component in the horizontal/lateral direction (by analogy, Denver is 1 mile above the surface of the Atlantic Ocean (sea level) but is over a thousand miles therefrom). In an exemplary embodiment, the top surface 2490 of the snap coupling of the connector apparatus 541 is the component that abuts the top surface of the abutment/and otherwise prevents the coupling apparatus 541 from traveling further down into the female portion of the abutment (or down around the abutment in the embodiment where the snap coupling of the removable component of the bone conduction device is a female component that envelops the outer periphery of the abutment).

While the embodiment just described above has keyed the spatial locations of the dynamic component to the stop surface 2490, in some other embodiments, the lowest most portion of the dynamic component can be keyed off of the outermost portion of the teeth of the connection apparatus 541, which is indicated in FIG. 24 via reference 2492. In an exemplary embodiment, the relative altitude of the lowermost portion of the dynamic component and/or the seismic mass relative to the coupling assembly is less than 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.5, 8, 8.5, 9, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29, or 30 mm from the outermost portion of the teeth of the connection apparatus 541 (point 2491). Another way of saying this is that the aforementioned distances are the distances between two planes that are normal to the longitudinal axis, where one of the two planes is a plane on the lowermost portion of the mass assembly 2485, and another one of the planes is on the surface 2490.

Figure 25:
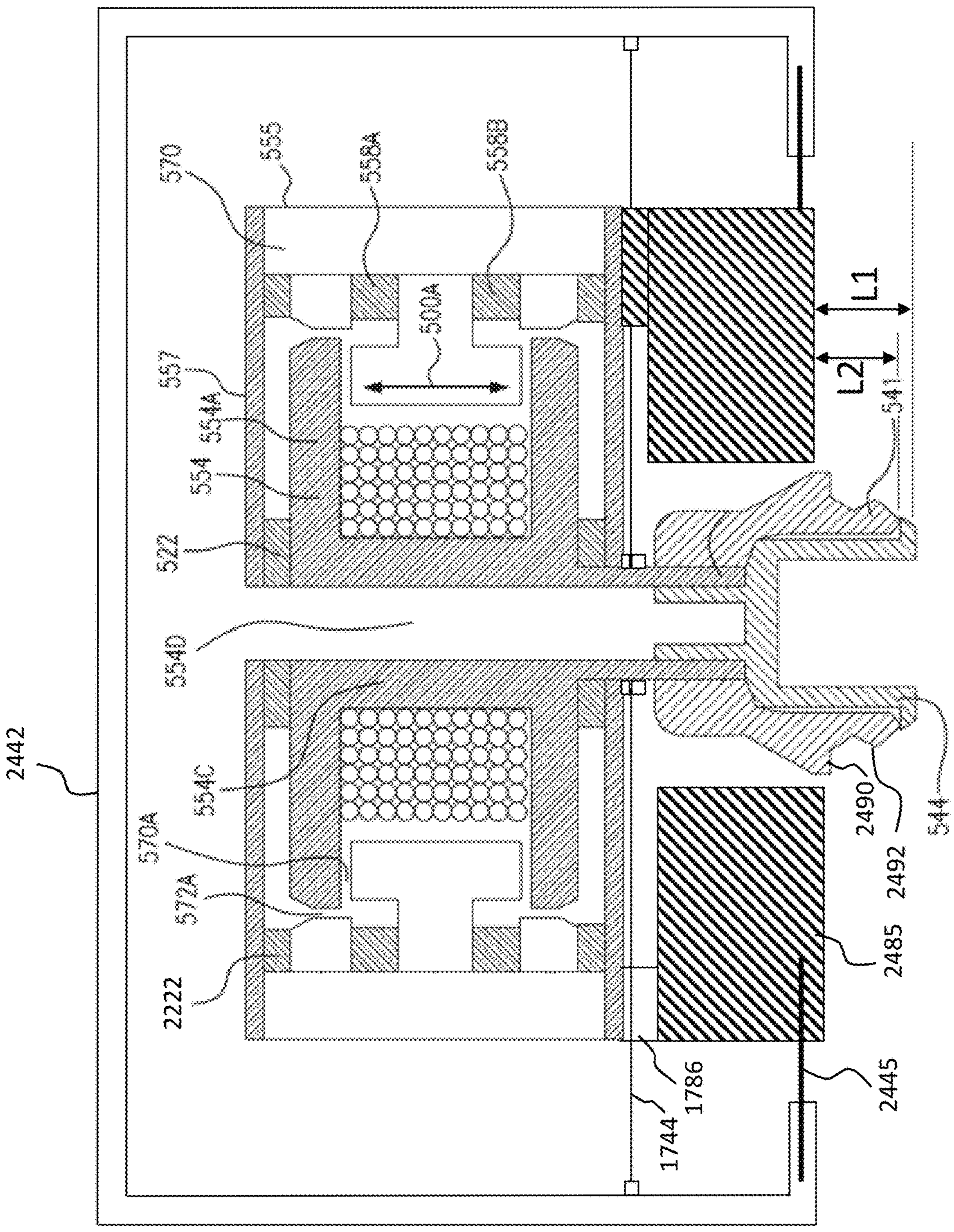
FIGS. 25 and 26 are cross-sectional views of another exemplary embodiment.

FIG. 25 presents additional reference lines which establish reference distances L1 and L2. The distance L1 extends from the bottom most portion of the removable component of the bone conduction device (the bottom most portion of element 544) to the lowermost portion of the mass assembly 2485, and the distance L2 extends from the bottom most portion of the coupling 541 (i.e., the lowermost portion of the coupling assembly if element 544 was removed/not present) to lowermost portion of the mass assembly 2485. In an exemplary embodiment, L1 and/or L2 is less than 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.5, 8, 8.5, 9, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29 or 30 mm. As will be understood, L1 and L2 are relative altitude distances, just as are the distance as detailed above with respect to surface 2490 and point 2492.

FIG. 25 also depicts an exemplary embodiment where spring 2445 is embedded in the housing 2442 and the mass 2485. In an exemplary embodiment, the plastic housing is formed about the spring 2445, and the mass 2485 has been crimped to the spring.

Figure 26:
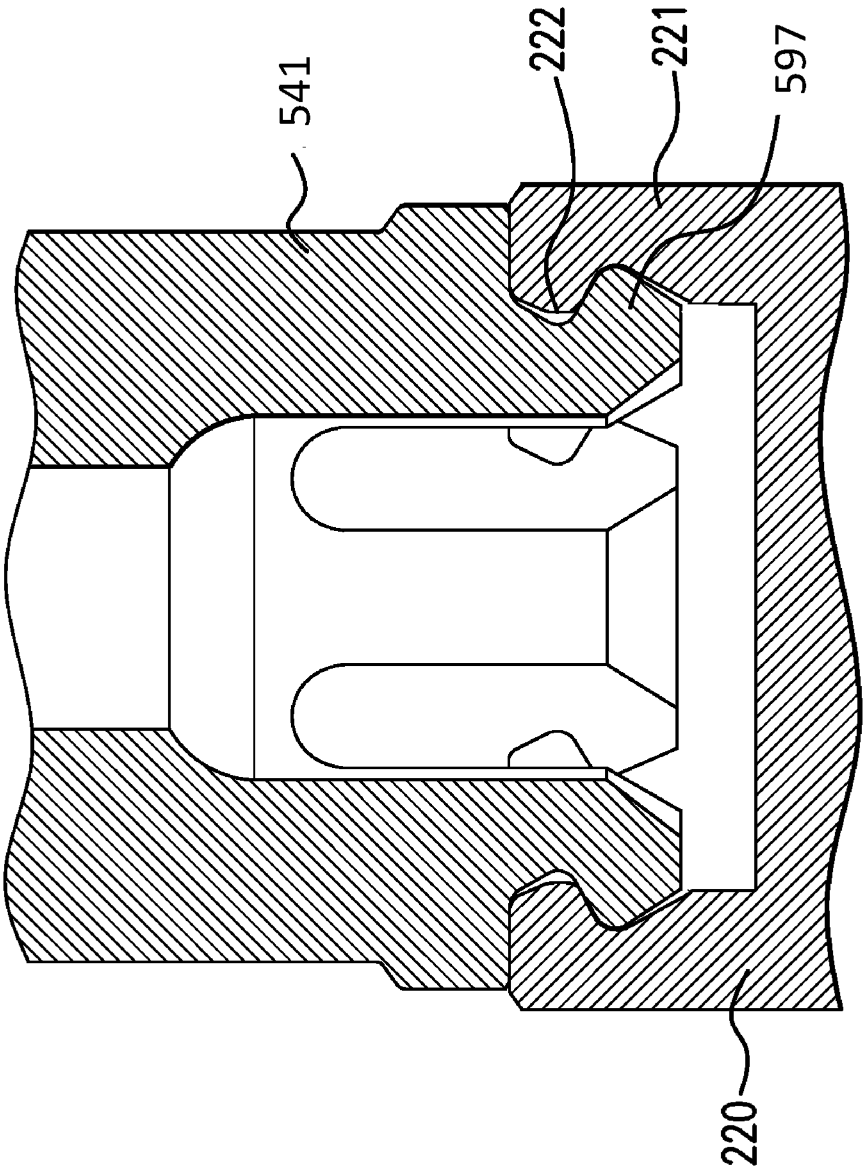

In at least some exemplary embodiments, the connection apparatus 541 is a monolithic component. In this regard, in an exemplary embodiment, the connection apparatus 541 is a plastic toothed structure formed from a single plastic component via injection molding or the like, and is press fit onto the extension 558E. FIG. 26 depicts a snap-coupling arrangement established by the monolithic connection apparatus 541 coupling to an abutment 220, with element 544 removed for clarity. More particularly, FIG. 26 depicts a close-up view of the interface between the abutment 220 and the connection apparatus 541. As may be seen, abutment 220 includes a recess formed by sidewall 221 that has an overhang 222 that interfaces with corresponding teeth 597 of connection apparatus 541. Teeth 597 elastically deform inward upon the application of sufficient removal and/or installation force to the bone conduction device. In an exemplary embodiment, element 220 can correspond to any abutment herein and variations thereof providing that it includes the snap-coupling arrangement and variations thereof.

In an exemplary embodiment, the connection apparatus 541 is completely separate from the bobbin. In an exemplary embodiment, the connection apparatus 541 is the only component that directly contacts the abutment when the removable component of the bone conduction device is secured to the abutment. In an exemplary embodiment, it is the only components of the bone conduction device that is required to snap couple to the abutment. That is, if all of the components were removed, the connection apparatus would snap couple to the abutment.

In an exemplary embodiment, with respect to a longitudinal axis, the dynamic component and the housing extend to a location that has a component on a plane that is normal to the longitudinal axis that bisects the connection apparatus. In an exemplary embodiment, again with respect to a longitudinal axis, the dynamic component extends to a location that has a component on a plane that is normal to the longitudinal axis that bisects the connection apparatus.

In an exemplary embodiment, the relative altitude of the lowermost portion of housing is less than 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.5, 8, 8.5, 9, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29, or 30 mm from the outermost portion of the teeth of the connection apparatus 541 (point 2491) and/or from the surface 2490 and/or from the lowermost portion of the bone conduction device and/or from the lowermost portion of the connection apparatus.

It is noted that in an exemplary embodiment, all of the aforementioned altitude distances can be altitude distances where the features measured from the features associated with the coupling assembly are above the coupling assembly the coupling assembly in other embodiments. Indeed, in an exemplary embodiment, the counterweight is such that the counterweight extends below the lowermost portion of the coupling assembly, and, in this embodiment, would envelop a portion of the abutment when the removable component of the bone conduction device is attached to the abutment.

Figure 27:
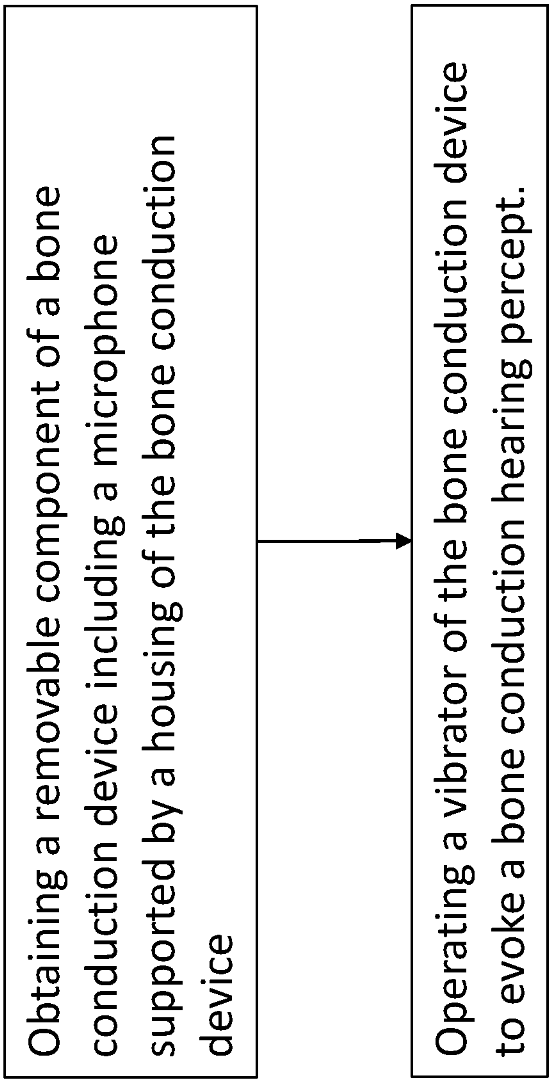
FIG. 27 is a flowchart for an exemplary method.

FIG. 27 presents an exemplary flowchart for an exemplary method according to an exemplary embodiment. This method includes obtaining a removable component of a bone conduction device including a microphone supported by housing of the bone conduction device. This method further includes the action of operating a vibrator of the bone conduction device to evoke a bone conduction hearing percept. In this exemplary method, the vibrator is supported in the housing via a suspension system. Further, in this exemplary method, the operation of the vibrator results in simultaneous opposite forces transmitted to the housing via the suspension system. In this regard, in an exemplary embodiment, such can be achieved via the embodiments detailed above with respect to the embodiments that include a spring directly connecting the housing to the seismic mass in a spring directly connecting the housing to the static component of the vibrator.

In this exemplary embodiment, feedback from the vibrator to the microphone is attenuated by the suspension system, and the attenuation is greater than that which would be the case if the housing was only directly flexibly connected to a static component of the bone conduction device, all other things being equal. In this exemplary embodiment, the attenuation is at least 1 or 5 or 10 dB greater than that which would greater than that which would be the case if the housing was only directly flexibly connected to a static component of the bone conduction device. In an exemplary embodiment, the attenuation is at least 1, 2, 3, 4, 5, 6, 7, 8, 9, 10, 11, 12, 13, 14, 15, 16, 17, 18, 19, or 20 dB greater than that which would otherwise be the case. In an exemplary embodiment, the amount of feedback that is received is less than or equal to 90, 89, 88, 87, 86, 85, 84, 83, 82, 81, 80, 79, 78, 77, 76, 75, 74, 73, 72m 71, 70, 65, 60, 55, 50, 45, 40, 35, 30, 25, 20, 19, 18, 17, 16, 15, 14, 13, 12, 11, 10, 9, 8, 7, 6, or 5% (or any range of values therebetween inclusive of the boundaries in 1% increments) of that which would be the case if the housing was only directly flexibly connected to a static component of the bone conduction device, all other things being equal. In an exemplary embodiment, the amount of feedback received is less than 25% of that which would have been received if the housing was only directly flexibly connected to a static component of the bone conduction device.

In an exemplary embodiment, the vibrator includes a seismic mass, the housing is directly connected to the seismic mass, operation of the vibrator causes the housing to variously move in a first direction and a second direction opposite the first direction (e.g., up and down with respect to the frame of references of the figures), operation of the vibrator causes the seismic mass to variously move in the first direction and the second direction (again, up and down, for example), and operation of the vibrator causes the seismic mass to variously move in a same direction of movement of the housing at temporally simultaneous locations and in a different direction of movement of the hosing at other temporally simultaneous locations. In this regard, the housing can move upwards while the seismic mass is moving upwards, and in some embodiments the housing can move upwards while the seismic mass is moving downwards, and vice versa. In an exemplary embodiment, the distance that the housing moves from a static location with the vibrator not operating is 90, 85, 80, 75, 70, 65, 60, 55, 50, 45, 40, 35, 30, 25, 20, 19, 18, 17, 16, 15, 14, 13, 12, 11, 10, 9, 8, 7, 5, or 5% of that which it would otherwise move if the housing was only directly flexibly connected to a static component of the bone conduction device, all other things being equal and/or if the housing was not directly connected to the seismic mass.

Consistent with some of the embodiments above, the housing is directly flexibly connected to a static component of the vibrator when the methods are executed.

In an exemplary embodiment, the method further comprises removing the bone conduction device from an abutment percutaneously extending through skin of a recipient by gripping the housing and pulling the housing away from the abutment, wherein a force from the housing resulting from the pulling is simultaneously directly transmitted to both a seismic mass and a static component of the vibrator.

In an exemplary embodiment, this is due to the fact that the housing is directly connected to the seismic mass and directly connected to the static component.

In an exemplary embodiment of the above methods, again where the vibrator includes a seismic mass, a spring extends from the housing from one side of the seismic mass to another side of the seismic mass through the seismic mass and in physical isolation from the seismic mass.

Figure 28:
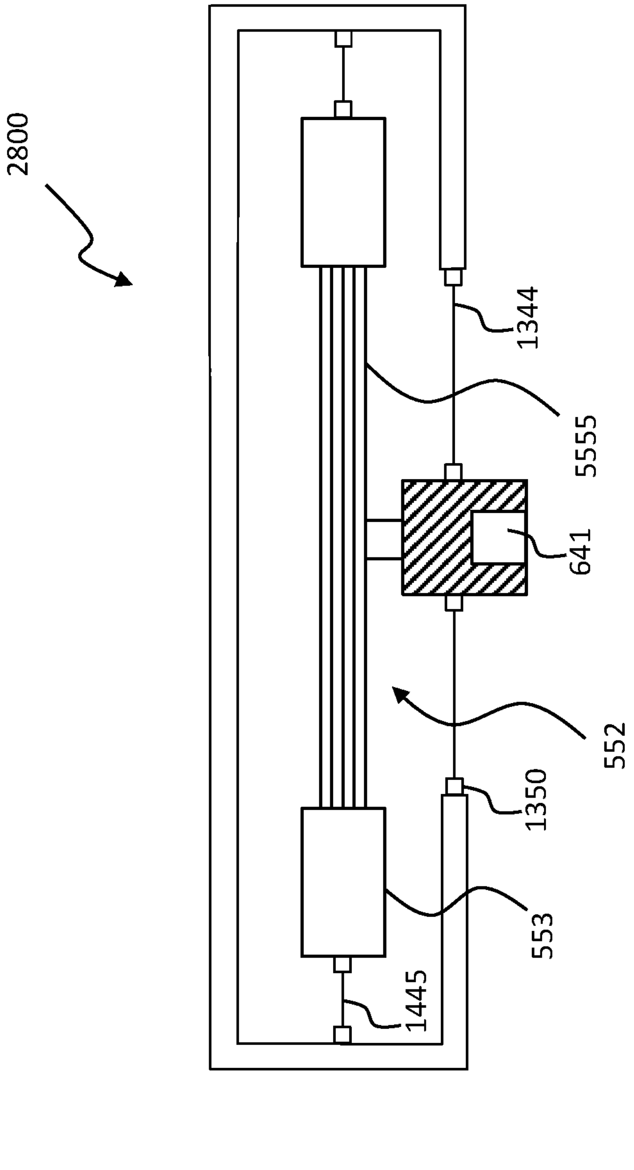
FIGS. 28 and 29 are cross-sectional views of another exemplary embodiment.

While the embodiments above have been explained in terms of an electromagnetic vibrator, it is noted that the vibratory device for actuator can be another type of actuator, such as by way of example only and not by way of limitation, a piezoelectric actuator. In this regard, FIG. 28 depicts an exemplary embodiment of a removable component of a bone conduction device 2800 which includes a vibrating actuator 552 that includes a counterweight/mass 553 that is supported by piezoelectric components 5555. In the exemplary embodiment of FIG. 285, the piezoelectric components 5555 flex upon the exposure of an electrical current thereto, thus moving the counterweight 553. In an exemplary embodiment, this movement creates vibrations that are ultimately transferred to the recipient to evoke a hearing percept, consistent with the teachings detailed above vis-à-vis the electromagnetic vibrator.

It is noted that spring 1744 can be connected to any part of the static component of the vibratory actuator-coupling assembly. In this regard, the spring can be directly connected to the bobbin (via a spring support or with spring to bobbin contact), the spring can be directly connected to the spacer between the bobbin and spring 656 (via a spring support or with spring to spacer contact), the extender that extends from the bobbin and/or spacer and/or spring 656 (via a spring support or with spring to spacer contact), or any other component that is in static relationship to the bobbin (e.g., spacer 522, the spring 657, etc.). In an exemplary embodiment, the spring 1744 is connected to any of the aforementioned components, is connected to a component that is connected to any of the aforementioned components, is connected to a component that is connected to a component that is connected to any of the aforementioned components, all such connections being direct connections, irrespective of whether or not a spring support is utilized.

One other possible example from the plethora of examples is to utilize spring 557/657 which is connected to the bobbin via spacer 522, and eliminate the spacer 2222 and adjust the mass 570 (added to the seismic mass of the embodiment of FIG. 25) so that it does not protrude as high as it does as shown in the figures, and then extended the spring 557, which now the longer contacts any portions of the seismic mass, to the housing 2442, and secure the spring 557 to the interior of the housing 2442. This in lieu of spring 1744 as shown in FIG. 24 or 25 (and the associated spacers).

In an exemplary embodiment, there is a bone conduction device, comprising a transducer; and a housing, wherein the housing is directly flexibly connected to the transducer at a dynamic component of the bone conduction device and directly flexibly connected to a static component of the bone conduction device. In an exemplary embodiment of the bone conduction device described above and/or below, wherein the transducer is an electromagnetic transducer. In an exemplary embodiment of the bone conduction device described above and/or below, wherein the transducer is a piezoelectric transducer.

In an exemplary embodiment, there is a bone conduction device, comprising a vibrator; and a housing encompassing the vibrator, wherein the housing is flexibly supported by at least a first suspension system and a second suspension system, wherein the first system has a resonant frequency that is different than the second system.

In an exemplary embodiment of the bone conduction device described above and/or below, wherein the vibrator includes a seismic mass, the second system is established by a spring extending from the housing directly to a static component of the bone conduction device, and the spring extends through the seismic mass and the seismic mass is spaced away from the spring.

In an exemplary embodiment, there is a method, comprising operating a vibrator of a bone conduction device including a microphone supported by a housing of the bone conduction device to evoke a bone conduction hearing percept, wherein the vibrator is supported in the housing via a suspension system, and the operation of the vibrator results in simultaneous opposite forces transmitted to the housing via the suspension system. In an exemplary embodiment of this method, the vibrator includes a seismic mass, and wherein a spring extends from the housing from one side of the seismic mass to another side of the seismic mass through the seismic mass and in physical isolation from the seismic mass.

Any feature of any embodiment herein can be combined with or otherwise be present in any other feature of any other embodiment unless otherwise noted or unless otherwise not enabled. Any feature disclosed herein can be explicitly excluded from any embodiment and excluded from combination with any other embodiment unless otherwise specified or unless otherwise not enabled. Any disclosure of any manufacturing process herein corresponds to a disclosure of the resulting apparatus made from that manufacturing process. Any disclosure herein of an apparatus or device corresponds to a disclosure of making that apparatus or device. Any disclosure herein of a method corresponds to a disclosure of an apparatus and/or system for executing that method. Any disclosure herein of an apparatus and/or a system disclosed herein corresponds to a disclosure of a method of utilizing that system to achieve its functionality.

Any teachings herein of the suspension systems and associated features (e.g., opening through the seismic mass, spring supports, connections with the housing, etc.) can be applicable to percutaneous bone conduction devices or transcutaneous bone conduction devices. In this regard, in an exemplary embodiment, the teachings detailed herein can be applicable to any of the embodiments of FIGS. 2, 3, and/or 4. Indeed, in an exemplary embodiment, there is a passive transcutaneous bone conduction device to which the coupling assembly is attached to a plate that interfaces with skin of the recipient. In an exemplary embodiment, the coupling assembly couples to a component of the plate just as the percutaneous bone conduction device snap couples to the abutment. In an alternate embodiment, the coupling assembly entails a shaft that extends from, for example, the bobbin, to the plate, and one of the springs can be connected to the shaft (or to any other static component). In an exemplary embodiment, the plate forms a side of the overall housing/enclosure in which the vibrator is located. In an exemplary embodiment, the teachings herein are applied to an active transcutaneous bone conduction device.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:

operating a vibrator of a bone conduction device including a microphone supported by a housing of the bone conduction device to evoke a bone conduction hearing percept, wherein the vibrator is supported in the housing via a suspension system, and the operation of the vibrator results in simultaneous opposite forces transmitted to the housing via the suspension system.

2. The method of claim 1, wherein:

feedback from the vibrator to the microphone is attenuated by the suspension system; and the attenuation is greater than that which would be the case if the housing was only directly flexibly connected to a static component of the bone conduction device, all other things being equal.

3. The method of claim 2, wherein:

the attenuation is at least 15 dB greater than that which would be the case if the housing was only directly flexibly connected to a static component of the bone conduction device, all other things being equal.

4. The method of claim 1, wherein:

the vibrator includes a seismic mass;

the housing is directly connected to the seismic mass;

operation of the vibrator causes the housing to variously move in a first direction and a second direction opposite the first direction;

operation of the vibrator causes the seismic mass to variously move in the first direction and the second direction; and operation of the vibrator causes the seismic mass to variously move in a same direction of movement of the housing at temporally simultaneous locations and in a different direction of movement of the hosing at other temporally simultaneous locations.

5. The method of claim 4, wherein:

the vibrator includes a piezoelectric actuator that supports the seismic mass.

6. The method of claim 1, wherein:

the housing is directly flexibly connected to a static component of the vibrator.

7. The method of claim 1, further comprising:

removing the bone conduction device from an abutment percutaneously extending through skin of a recipient by gripping the housing and pulling the housing away from the abutment, wherein a force from the housing resulting from the pulling is simultaneously directly transmitted to both a seismic mass and a static component of the vibrator.

8. The method of claim 1, wherein:

the vibrator includes a piezoelectric actuator that generates vibrations.

9. The method of claim 1, wherein:

the suspension system is configured so that the housing is directly springy connected to the vibrator at a dynamic component of the bone conduction device and directly springy connected to a static component of the bone conduction device.

10. The method of claim 1, wherein:

feedback from the vibrator to the microphone is attenuated by the suspension system; and the attenuation is greater than that which would be the case if the housing was only directly elastically connected to a static component of the bone conduction device, all other things being equal.

11. The method of claim 1, wherein:

the housing is directly connected by a spring of the suspension system to a static component of the vibrator.

12. The method of claim 11, wherein:

the housing is directly connected by a second spring of the suspension system to a dynamic component of the vibrator.

13. A bone conduction device, comprising:

a vibrator;

a housing encompassing the vibrator; and a microphone supported by the housing, wherein the vibrator is supported in the housing via a suspension system, and the bone conduction device is configured so that operation of the vibrator results in simultaneous opposite forces transmitted to the housing via the suspension system.

14. The bone conduction device of claim 13, wherein:

the bone conduction device is configured so that feedback from the vibrator to the microphone is attenuated by the suspension system; and the bone conduction device is configured so that the attenuation is greater than that which would be the case if the housing was only directly connected to a static component of the bone conduction device by a spring, all other things being equal.

15. The bone conduction device of claim 14, wherein:

the bone conduction device is configured so that the attenuation is at least 15 dB greater than that which would be the case if the housing was only directly connected to a static component of the bone conduction device by a spring, all other things being equal.

16. The bone conduction device of claim 13, wherein:

the vibrator includes a seismic mass;

the housing is directly connected to the seismic mass;

the bone conduction device is configured so that operation of the vibrator causes the housing to variously move in a first direction and a second direction opposite the first direction;

the bone conduction device is configured so that operation of the vibrator causes the seismic mass to variously move in the first direction and the second direction; and the bone conduction device is configured so that operation of the vibrator causes the seismic mass to variously move in a same direction of movement of the housing at temporally simultaneous locations and in a different direction of movement of the hosing at other temporally simultaneous locations.

17. The bone conduction device of claim 16, wherein:

the vibrator includes a piezoelectric actuator that supports the seismic mass.

18. The bone conduction device of claim 13, wherein:

the housing is directly springy connected to a static component of the vibrator.

19. The bone conduction device of claim 13, wherein:

the vibrator includes a piezoelectric actuator that generates vibrations.

20. The bone conduction device of claim 13, wherein:

the bone conduction device is configured so that feedback from the vibrator to the microphone is attenuated by the suspension system; and the bone conduction device is configured so that the attenuation is greater than that which would be the case if the housing was only directly flexibly connected to a static component of the bone conduction device, all other things being equal.

21. The bone conduction device of claim 13, wherein: the bone conduction device is a removable component of a percutaneous bone conduction device.

* * * * *